United States Patent
Kaufthal et al.

(10) Patent No.: US 10,209,849 B2
(45) Date of Patent: Feb. 19, 2019

(54) ADAPTIVE USER INTERFACE PANE OBJECTS

(71) Applicant: Microsoft Technology Licensing, LLC., Redmond, WA (US)

(72) Inventors: Jonathan S. Kaufthal, Seattle, WA (US); Charles Scott Walker, Sammamish, WA (US); Travis Spomer, Redmond, WA (US); Edward Augustus Layne, Jr., Seattle, WA (US); Taili Feng, Bellevue, WA (US); Julie Christa Seto, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 189 days.

(21) Appl. No.: 14/755,794

(22) Filed: Jun. 30, 2015

(65) Prior Publication Data

US 2016/0209987 A1     Jul. 21, 2016

Related U.S. Application Data

(60) Provisional application No. 62/105,775, filed on Jan. 21, 2015.

(51) Int. Cl.
*G06F 3/048* (2013.01)
*G06F 3/0481* (2013.01)
(Continued)

(52) U.S. Cl.
CPC .......... *G06F 3/0481* (2013.01); *G06F 3/017* (2013.01); *G06F 3/03547* (2013.01);
(Continued)

(58) Field of Classification Search
CPC ....................................... G06F 3/048
See application file for complete search history.

(56) References Cited

U.S. PATENT DOCUMENTS

| 5,060,170 A | 10/1991 | Bourgeois et al. |
| 5,142,618 A | 8/1992 | Fujiwara et al. |

(Continued)

FOREIGN PATENT DOCUMENTS

| EP | 955580 A1 | 11/1999 |
| EP | 820002 A1 | 10/2002 |

(Continued)

OTHER PUBLICATIONS

PCT International Search Report and Written Opinion for Application PCT/US2016/014201, dated Apr. 26, 2016, 12 pages.
(Continued)

*Primary Examiner* — Xuyang Xia
(74) *Attorney, Agent, or Firm* — Merchant & Gould P.C.

(57) ABSTRACT

Aspects of a system for automatically managing a pane in a user interface on a small form factor computing device include an adaptive pane module for determining when an event that affects the canvas size occurs, such as changing the display configuration or reorienting the display, which in turn affects pane management, or the opening or closing of a pane. The adaptive pane module manages the pane. After managing the pane, the system resizes the canvas and reflows the content as appropriate for a small form factor computing device.

19 Claims, 64 Drawing Sheets

(51) Int. Cl.
| | | |
|---|---|---|
| *G06F 3/0482* | (2013.01) | |
| *G06F 3/0485* | (2013.01) | |
| *G06F 3/0484* | (2013.01) | |
| *G06F 17/24* | (2006.01) | |
| *G06F 3/01* | (2006.01) | |
| *G06F 3/0488* | (2013.01) | |
| *G06F 3/0354* | (2013.01) | |
| *G06F 17/22* | (2006.01) | |

(52) U.S. Cl.
CPC .......... *G06F 3/0482* (2013.01); *G06F 3/0485* (2013.01); *G06F 3/04842* (2013.01); *G06F 3/04845* (2013.01); *G06F 3/04886* (2013.01); *G06F 17/246* (2013.01); *G06F 17/2235* (2013.01); *G06F 2200/1637* (2013.01); *G06F 2203/04803* (2013.01)

(56) References Cited

U.S. PATENT DOCUMENTS

| | | |
|---|---|---|
| 5,390,295 A | 2/1995 | Bates et al. |
| 5,408,602 A | 4/1995 | Giokas et al. |
| 5,712,995 A | 1/1998 | Cohn |
| 5,726,669 A | 3/1998 | Obata et al. |
| 5,757,371 A | 5/1998 | Oran et al. |
| 5,825,360 A | 10/1998 | Odam |
| 5,999,177 A | 12/1999 | Martinez et al. |
| 6,356,279 B1 | 3/2002 | Halstead, Jr. et al. |
| 6,414,698 B1 | 7/2002 | Lovell |
| 6,603,493 B1 | 8/2003 | Lovell |
| 7,080,326 B2 | 7/2006 | Molander et al. |
| 7,496,844 B2 | 2/2009 | Andrew |
| 7,577,922 B2 | 8/2009 | Mann et al. |
| 7,620,908 B2 | 11/2009 | Klevenz et al. |
| 7,681,143 B2 | 3/2010 | Lindsay et al. |
| 7,692,658 B2 | 4/2010 | Moore |
| 7,730,422 B2 | 6/2010 | Russo |
| 7,873,622 B1 | 1/2011 | Karls et al. |
| 8,245,143 B2 | 8/2012 | Yach et al. |
| 8,341,143 B1 | 12/2012 | Karls et al. |
| 8,381,127 B2 | 2/2013 | Singh et al. |
| 8,464,177 B2 | 6/2013 | Ben-Yoseph et al. |
| 8,484,574 B2 | 7/2013 | Burroughs et al. |
| 8,490,014 B2 | 7/2013 | Colussi et al. |
| 8,527,907 B2 | 9/2013 | Goshey |
| 8,543,904 B1 | 9/2013 | Karls et al. |
| 8,635,553 B2 | 1/2014 | Dhawan |
| 8,705,119 B2 | 4/2014 | Bonikowski et al. |
| 8,707,199 B2 | 4/2014 | Smith |
| 8,736,561 B2 | 5/2014 | Anzures et al. |
| 8,930,845 B2 | 1/2015 | Ma et al. |
| 9,026,928 B2 | 5/2015 | Ferry et al. |
| 9,223,591 B2 | 12/2015 | Hayes et al. |
| 9,411,487 B2 | 8/2016 | Ording |
| 9,513,783 B1 | 12/2016 | Vaidya |
| 10,042,655 B2 | 8/2018 | Kaufthal et al. |
| 2002/0089546 A1 | 7/2002 | Kanevsky et al. |
| 2002/0191028 A1 | 12/2002 | Senechalle et al. |
| 2003/0025737 A1 | 2/2003 | Breinberg |
| 2003/0137539 A1 | 7/2003 | Dees |
| 2004/0189710 A1 | 9/2004 | Goulden et al. |
| 2004/0268212 A1* | 12/2004 | Malik .................... G06Q 10/10 715/262 |
| 2004/0268269 A1 | 12/2004 | Breinberg |
| 2005/0005236 A1 | 1/2005 | Brown et al. |
| 2005/0114788 A1 | 5/2005 | Fabritius |
| 2005/0183017 A1 | 8/2005 | Cain |
| 2005/0188174 A1 | 8/2005 | Guzak et al. |
| 2006/0236264 A1 | 10/2006 | Cain et al. |
| 2007/0016875 A1 | 1/2007 | Santos-Gomez |
| 2007/0022389 A1 | 1/2007 | Ording et al. |
| 2007/0168859 A1 | 7/2007 | Fortes |
| 2007/0180401 A1 | 8/2007 | Singh et al. |
| 2007/0250788 A1 | 10/2007 | Rigolet |
| 2007/0288431 A1 | 12/2007 | Reitter et al. |
| 2008/0052637 A1 | 2/2008 | Ben-Yoseph et al. |
| 2008/0094368 A1* | 4/2008 | Ording ................. G06F 3/0488 345/173 |
| 2008/0120569 A1 | 5/2008 | Mann et al. |
| 2008/0204417 A1 | 8/2008 | Pierce et al. |
| 2009/0171920 A1 | 7/2009 | Wade et al. |
| 2009/0196414 A1 | 8/2009 | Mittal et al. |
| 2009/0300542 A1 | 12/2009 | Duarte |
| 2010/0019989 A1 | 1/2010 | Odagawa et al. |
| 2010/0046013 A1 | 2/2010 | Bonikowski et al. |
| 2010/0058220 A1 | 3/2010 | Carpenter |
| 2010/0070876 A1* | 3/2010 | Jain ....................... G06Q 30/02 715/748 |
| 2010/0138767 A1 | 6/2010 | Wang et al. |
| 2010/0229110 A1* | 9/2010 | Rockey ................. G06F 9/4446 715/760 |
| 2011/0252304 A1 | 10/2011 | Lemonik et al. |
| 2011/0260970 A1 | 10/2011 | Kuo et al. |
| 2012/0001914 A1 | 1/2012 | Pan et al. |
| 2012/0081317 A1 | 4/2012 | Sirpal et al. |
| 2012/0096344 A1 | 4/2012 | Ho et al. |
| 2012/0166989 A1 | 6/2012 | Brown et al. |
| 2012/0200586 A1 | 8/2012 | Lima et al. |
| 2013/0014050 A1 | 1/2013 | Queru |
| 2013/0019183 A1 | 1/2013 | Reeves et al. |
| 2013/0047118 A1 | 2/2013 | Hooper et al. |
| 2013/0125041 A1* | 5/2013 | Doan .................... G06F 9/451 715/781 |
| 2013/0125050 A1 | 5/2013 | Goshey |
| 2013/0132885 A1 | 5/2013 | Maynard et al. |
| 2013/0151996 A1 | 6/2013 | Nario et al. |
| 2013/0159941 A1 | 6/2013 | Langlois et al. |
| 2014/0033118 A1 | 1/2014 | Baird |
| 2014/0040819 A1 | 2/2014 | Duffy |
| 2014/0068505 A1 | 3/2014 | Hayes et al. |
| 2014/0168277 A1 | 6/2014 | Ashley et al. |
| 2014/0258924 A1* | 9/2014 | Sekino ................. G06F 3/04845 715/800 |
| 2014/0282232 A1 | 9/2014 | Oh et al. |
| 2014/0344750 A1 | 11/2014 | Takahashi et al. |
| 2015/0212723 A1* | 7/2015 | Lim ........................ G06F 3/14 715/760 |
| 2015/0286344 A1 | 10/2015 | Kaufthal et al. |
| 2016/0028875 A1* | 1/2016 | Brown ................. G06F 3/0481 715/751 |
| 2016/0085387 A1 | 3/2016 | Hayes et al. |
| 2016/0170622 A1 | 6/2016 | Ladd et al. |
| 2016/0209994 A1 | 7/2016 | Kaufthal et al. |

FOREIGN PATENT DOCUMENTS

| | | |
|---|---|---|
| RU | 2336553 C2 | 10/2008 |
| RU | 2493581 C2 | 9/2013 |
| WO | 0109834 A1 | 2/2001 |
| WO | 02/082418 A2 | 10/2002 |
| WO | 2006030002 A1 | 3/2006 |
| WO | 2008030879 A2 | 3/2008 |

OTHER PUBLICATIONS

Lars Erik Holmquist: "The Zoom Browser Showing Simultaneous Detail and Overview in Large Documents", Internet Citation, 1998, XP002462982, Retrieved from the Internet: URL:http.//www.hb.se/bhs/ith/3-98/leh.htm [retrieved on Dec. 17, 2007] 12 pages.

Natasa Milic-Frayling et al: "SmartView: Enhanced Document Viewer for Mobile Devices", Internet Citation, Nov. 15, 2002 (Nov. 15, 2002), XP002462835, Retrieved from the Internet: URL:ftp://ftp.research.microsoftcom/pub/tr/tr-2002-114.pdf [retrieved on Dec. 17, 2007] 10 pages.

Amir Khella et al: "Pocket PhotoMesa: A Zoomable Image Browser for PDAs", International Conference on Mobile and Ubiquitous Multimedia, ACM, US, Oct. 29, 2004 (Oct. 29, 2004), pp. 1-6, XP002462595. 6 pages.

Patrick Rau Disch et al: "Collapse-to-zoom Viewing Web Pages on Small Screen Devices by Interactively Removing Irrelevant Con-

(56) References Cited

OTHER PUBLICATIONS tent", UIST 04. Proceedings of the 17th. Annual ACM Symposium on User Interface Software and Technology. Santa Fe, NM, Oct. 24-27, 2004; [ACM Symposium on User Interface Software and Technolqgyj, New York, NY : ACM Press, US, Oct. 24, 2004 (Oct. 24, 2004), pp. 1-4, XP002462837. ISBN: 978-1-58113-957-0. 4 pages.
Office Action dated Dec. 27, 2016 in U.S. Appl. No. 14/453,445, Examiner Chuang, Jung-Mu T., 49 pages.
PCT Second Written Opinion Issued in PCT Application No. PCT/US2016/014201, Dated: Dec. 14, 2016, 4 Pages.
PCT International Preliminary report Issued in PCT Application No. PCT/US2016/014201, Dated: Mar. 14, 2017, 7 Pages.
"Create Multiple Panes in a Mobile Application", Published on: Jan. 19, 2012 Available at: http://help.adobe.com/en_US/flex/mobileapps/WSa367498dc1175407-5e4576591324aa78a9f-8000.html.
Mitrovic, et al., "Adaptive User Interfaces based on Mobile Agents: Monitoring the Behavior of users in a Wireless Environment", In First Symposium on Ubiquitous Computing and Ambient Intelligence, Sep. 2005, 8 pages.
U.S. Appl. No. 61/974,377, Kaufthal, et al., "Modern Panes", Filed Date: Apr. 2, 2014.
API Guides, App Manifest | <activity> | Android Developers, Published on: Jul. 8, 2012 Available at: http://developer.android.com/guide/topics/manifest/activity-element.html.
"API Guides", Best Practices | Supporting Multiple Screens | Android Developers, Published on: Jul. 8, 2012 Available at: http://developer.android.com/guide/practices/screens_support.html.
Echessa, Joyce, "Building Adaptive User Interfaces for iOS 8", Published on: Nov. 6, 2014 Available at: http://www.sitepoint.com/building-adaptive-user-interfaces-ios-8/.
Holzinger, at el., "Making Apps Useable on Multiple Different Mobile Platforms: On Interoperability for Business Application Development on Smartphones", In Proceedings of International Cross-Domain Conference and Workshop on Availability, Reliability, and Security, Aug. 20, 2012, 3 pages.
Itzkovitch. Avi, "Designing for Device Orientation: From Portrait to Landscape", Published on: Aug. 10, 2012 Available at: http://www.smashingmagazine.com/2012/08/1 Ofdesigning-device-orientation-portrait-landscape/.
LG G2 Review: Beautiful Monster, Published on: Sep. 7, 2013 Available at: http://www.gsmarena.com/lg_g2-review-982p7.php.
Microsoft Office 2010, Retrieved at <<https://en.wikipedia.org/w/index_php?title=Microsoft_Office_2010&oldid=601512204>> Mar. 27, 2014, 12 Pages.
PCT International Preliminary Report on Patentability Issued in PCT Application No. PCT/US2015/022894, Dated: Jun. 16, 2016, 15 Pages.
PCT International Search Report and Written Opinion Issued in PCT Patent Application No. PCT/US2015/022894, Dated: Jun. 25, 2015, 10 Pages.
PCT Second Written Opinion Issued in PCT Application No. PCT/US2015/022894, Dated: Feb. 17, 2016, 6 Pages.
"Qt Project", Published on: Jan. 27, 2015 Available at: http://qt-project.org/doc/qt-4.8/widgets-orientation.html.
Sacco, AI, "BlackBerry Passport Productivity Tips, Tricks and Keyboard Shortcuts", Published on: Oct. 8, 2014 Available at: http://www.cio.com/article/2691208/blackberry-phone/blackberry-passport-productivity-tips-tricks-and-keyboard-shortcuts.html.
Samsung note 1 Internet Snapshots taken from Samsung note 1 Internet Platform: Android, Published on: Feb. 14, 2014 Available at: http://allaboutgalaxynote.com/wp-content/uploads/2013/09/Galaxy_Note_User_Manual_GT-N7000JellybeanEUEnglish 20130124.pdf.
U.S. Appl. No. 14/453,445 Office Action dated Jul. 15, 2016, 45 pages.
Yadav, at el., "Android OS Exploits: The Robust", In International Journal of Innovative Research in Technology, vol. 1, Issue 6, Nov. 2014, pp. 1537-1543.
U.S. Appl. 14/755,590, Office Action dated May 15, 2017, 56 pages.
U.S. Appl. No. 14/453,445, Office Action dated Nov. 16, 2017, 49 pages.
U.S. Appl. No. 14/755,590, Office Action dated Dec. 1, 2017, 63 pages.
"Final Office Action Issued in U.S. Appl. No. 14/453,445", dated: Apr. 30, 2018, 33 Pages.
"Notice of Allowance Issued in U.S. Appl. No. 14/755,590", dated: May 2, 2018, 18 Pages.
"Office Action Issued in European Patent Application No. 16705355.2", Dated: Jun. 28, 2018., 4 Pages.
"Office Action and Search Report Issued in Russian Patent Application No. 2016138572", dated Oct. 31, 2018, 6 Pages. (W/o English Translation).

* cited by examiner

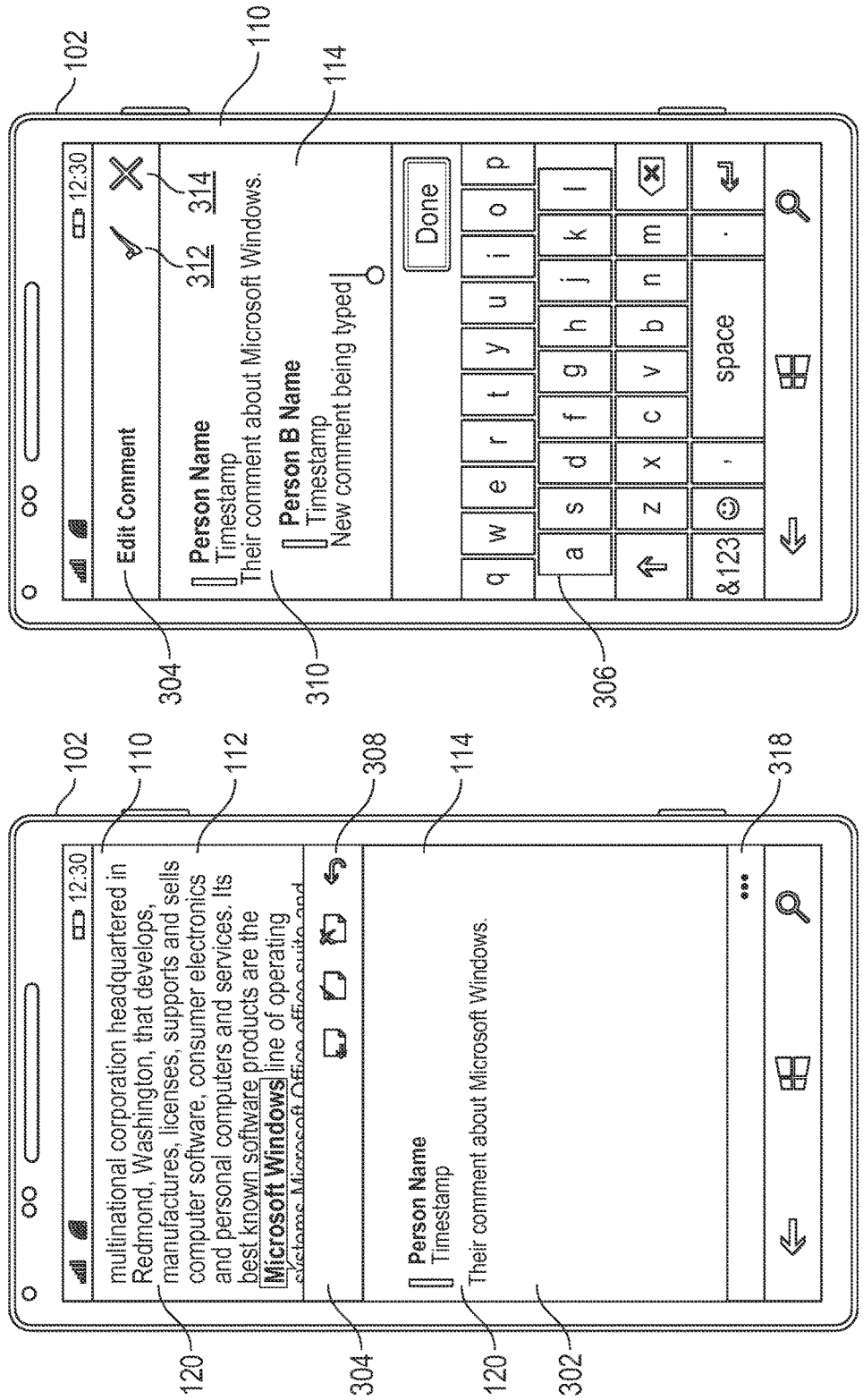

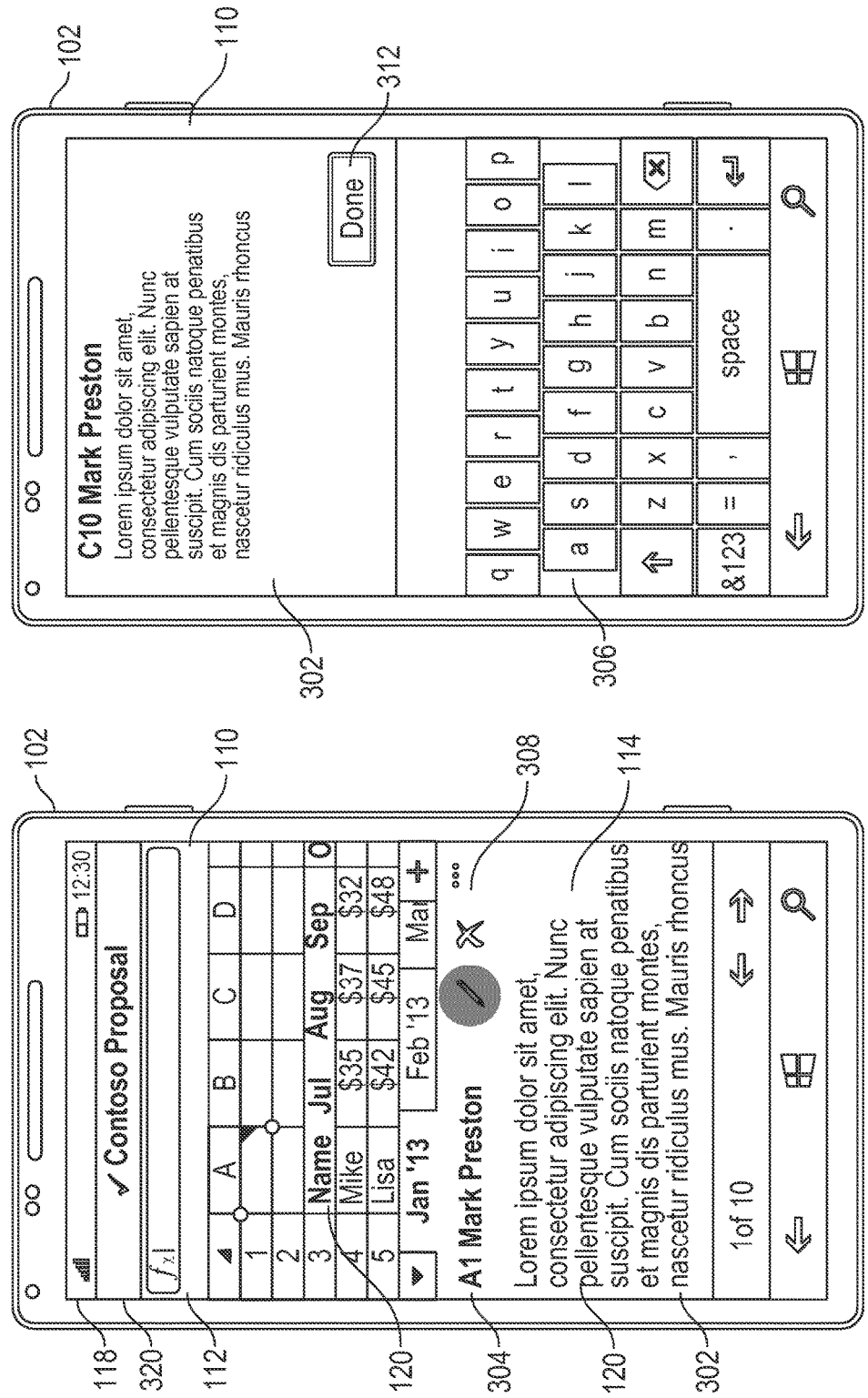

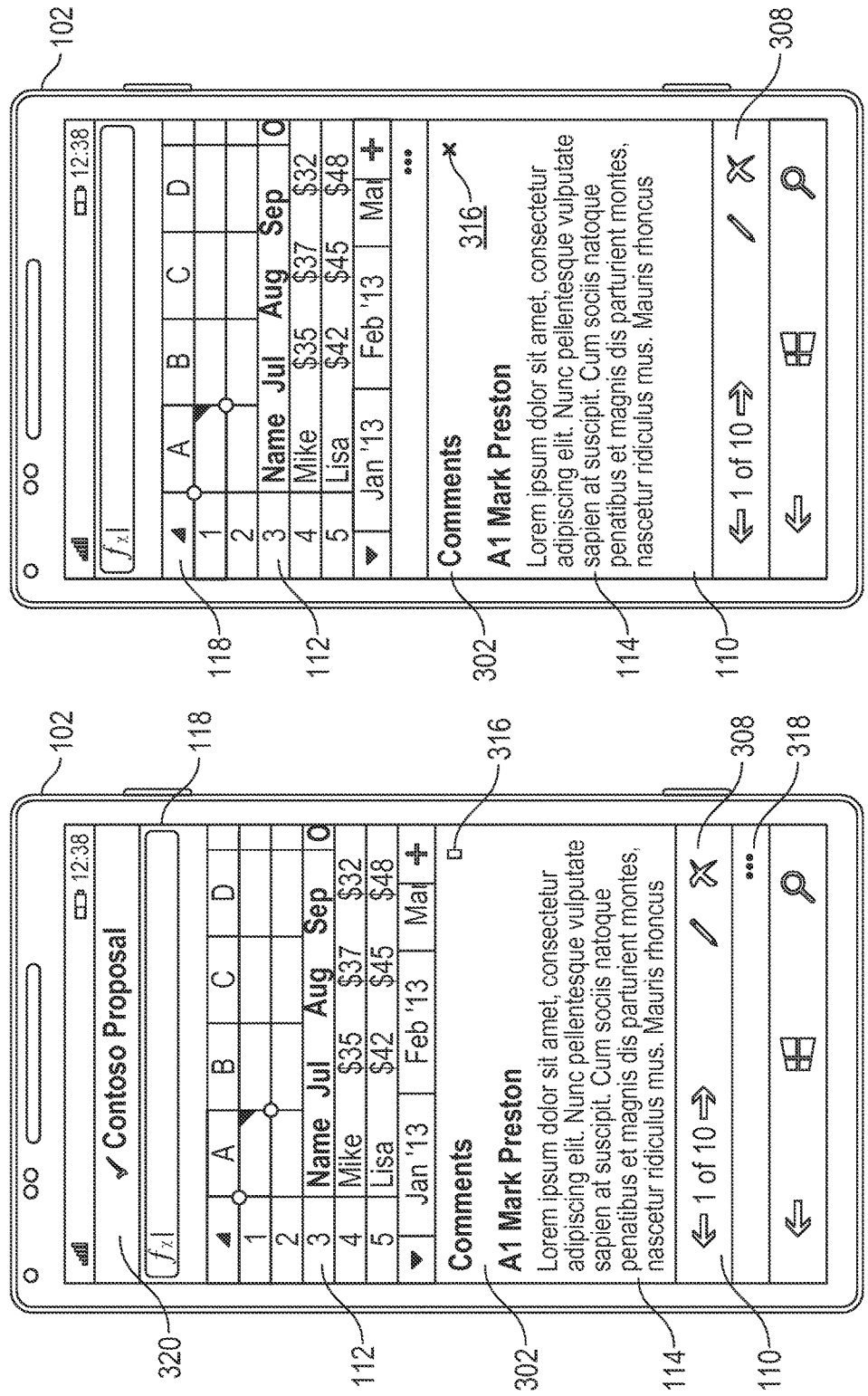

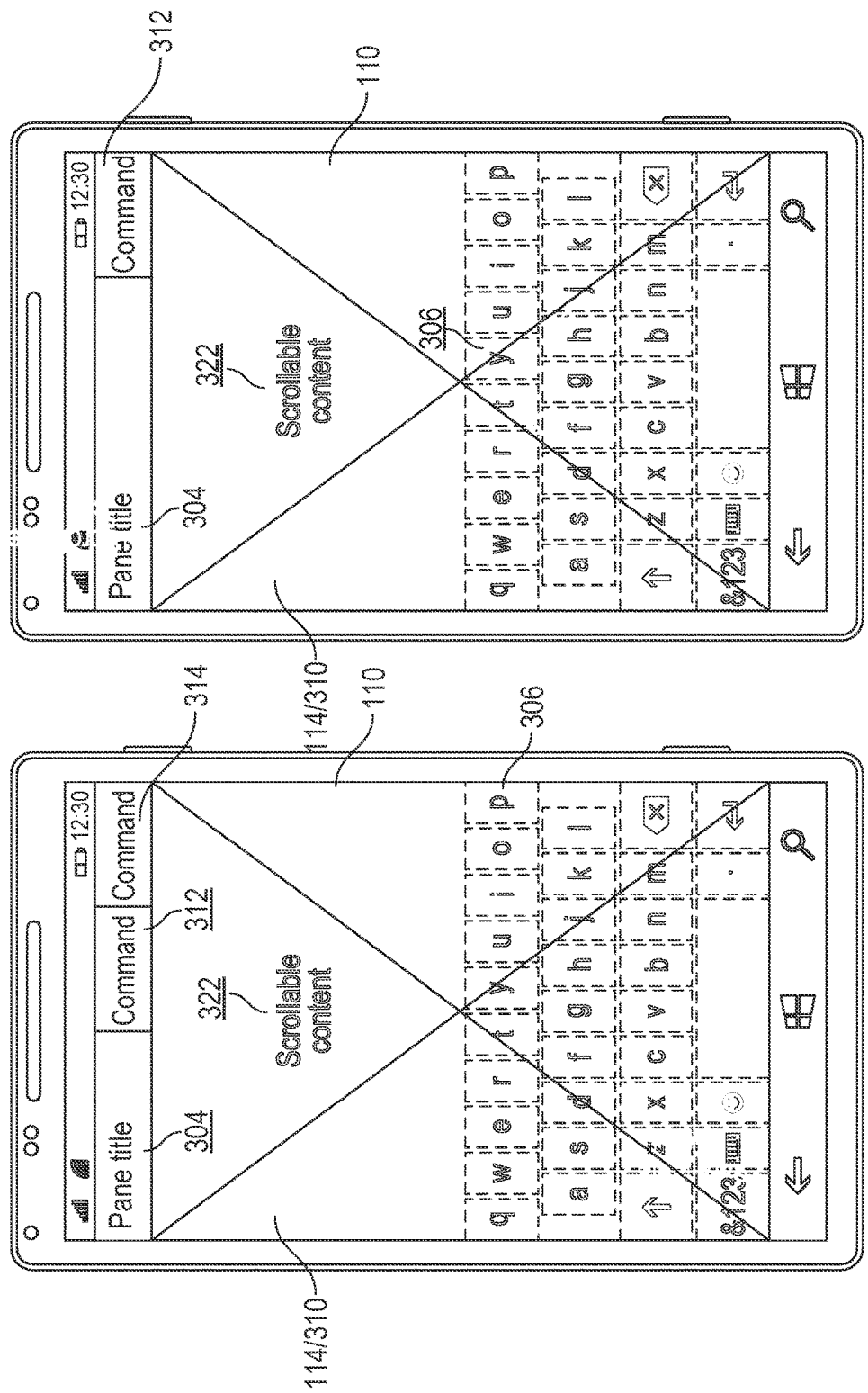

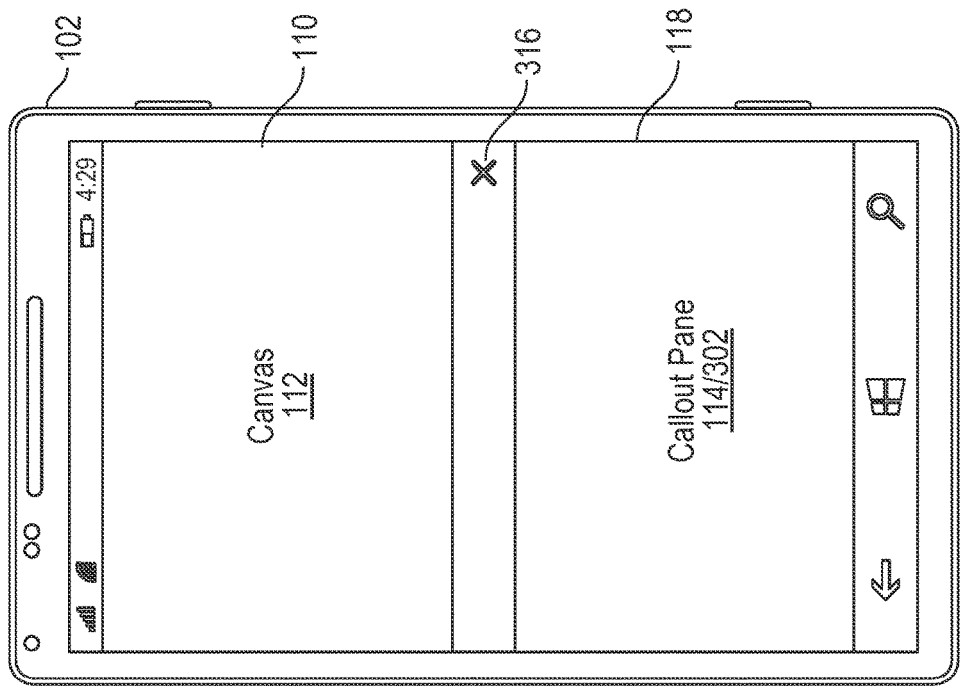
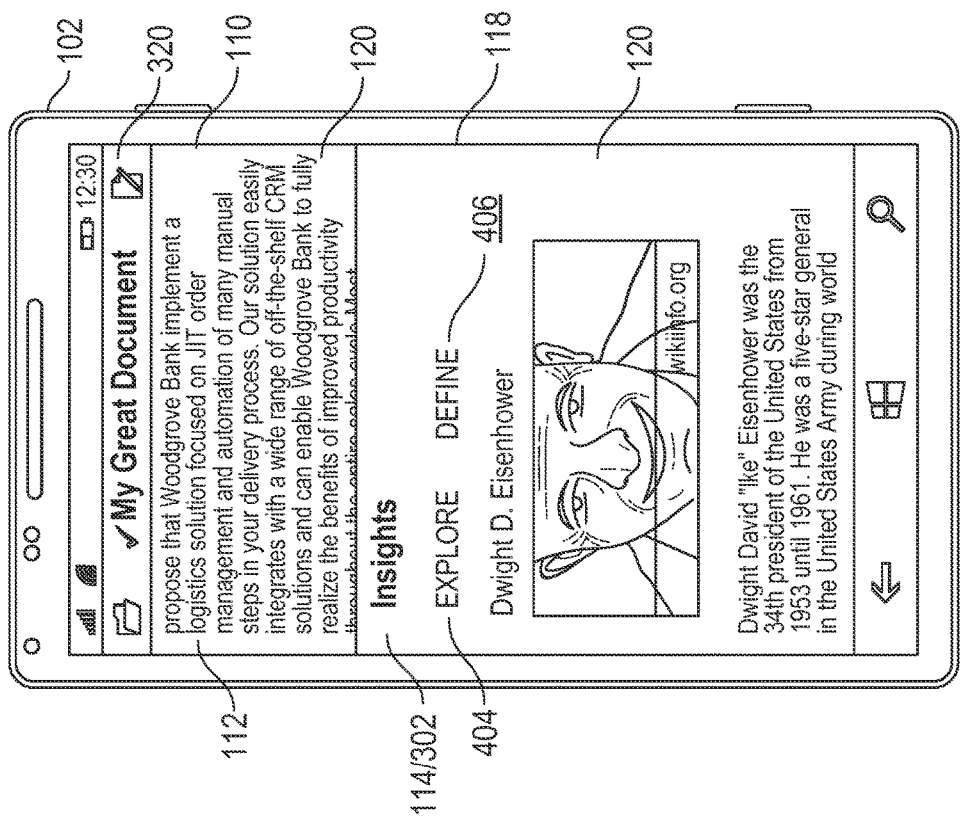
FIG. 4
FIG. 5

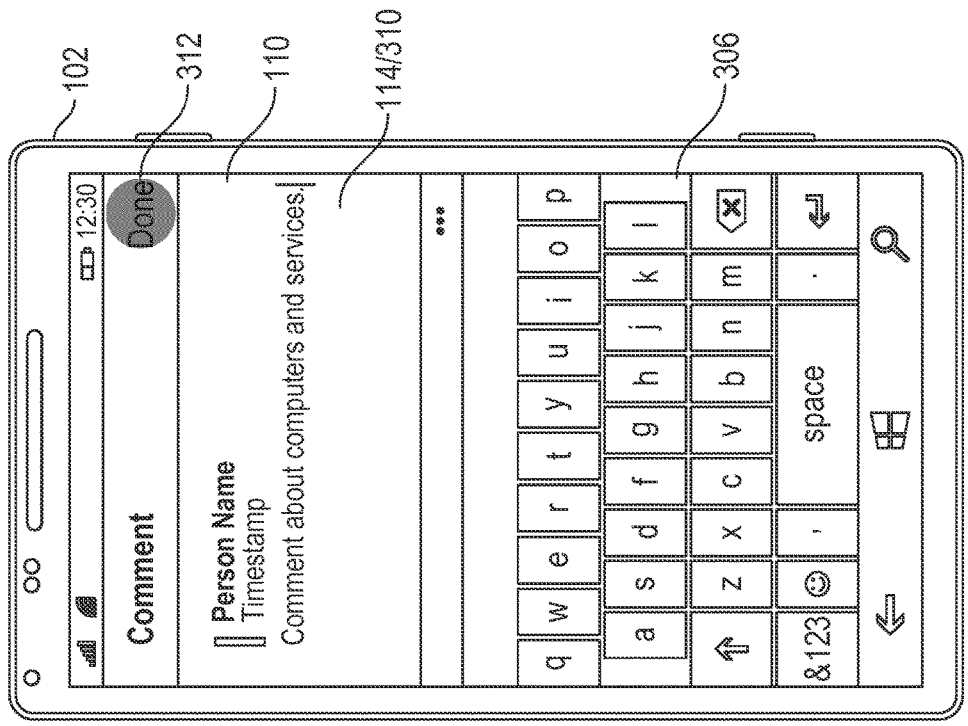
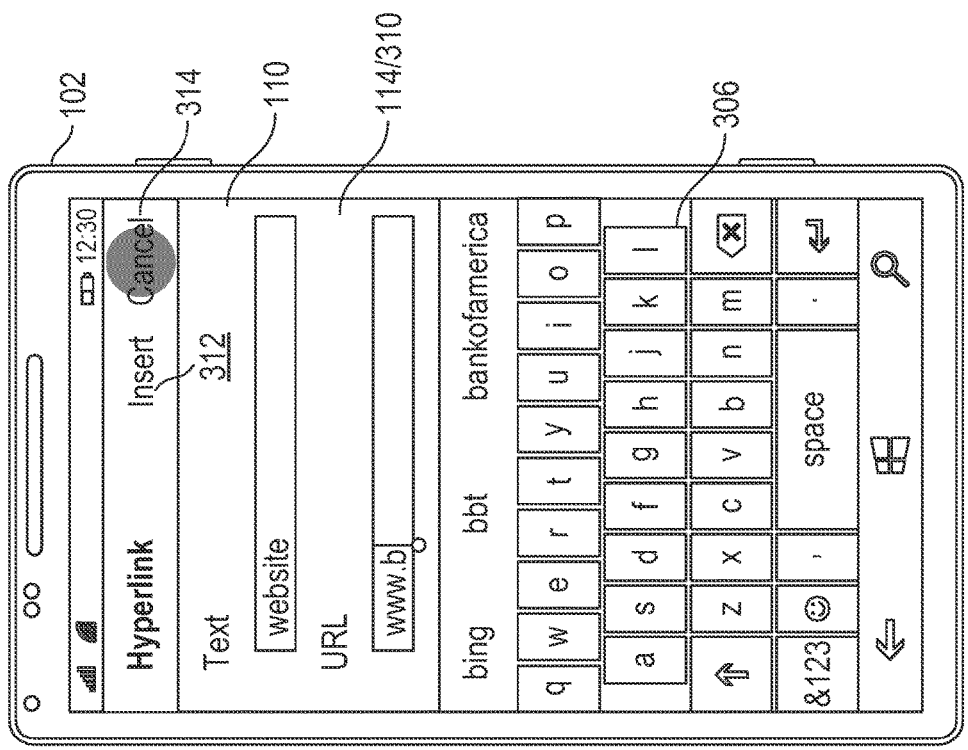
FIG. 8
FIG. 9

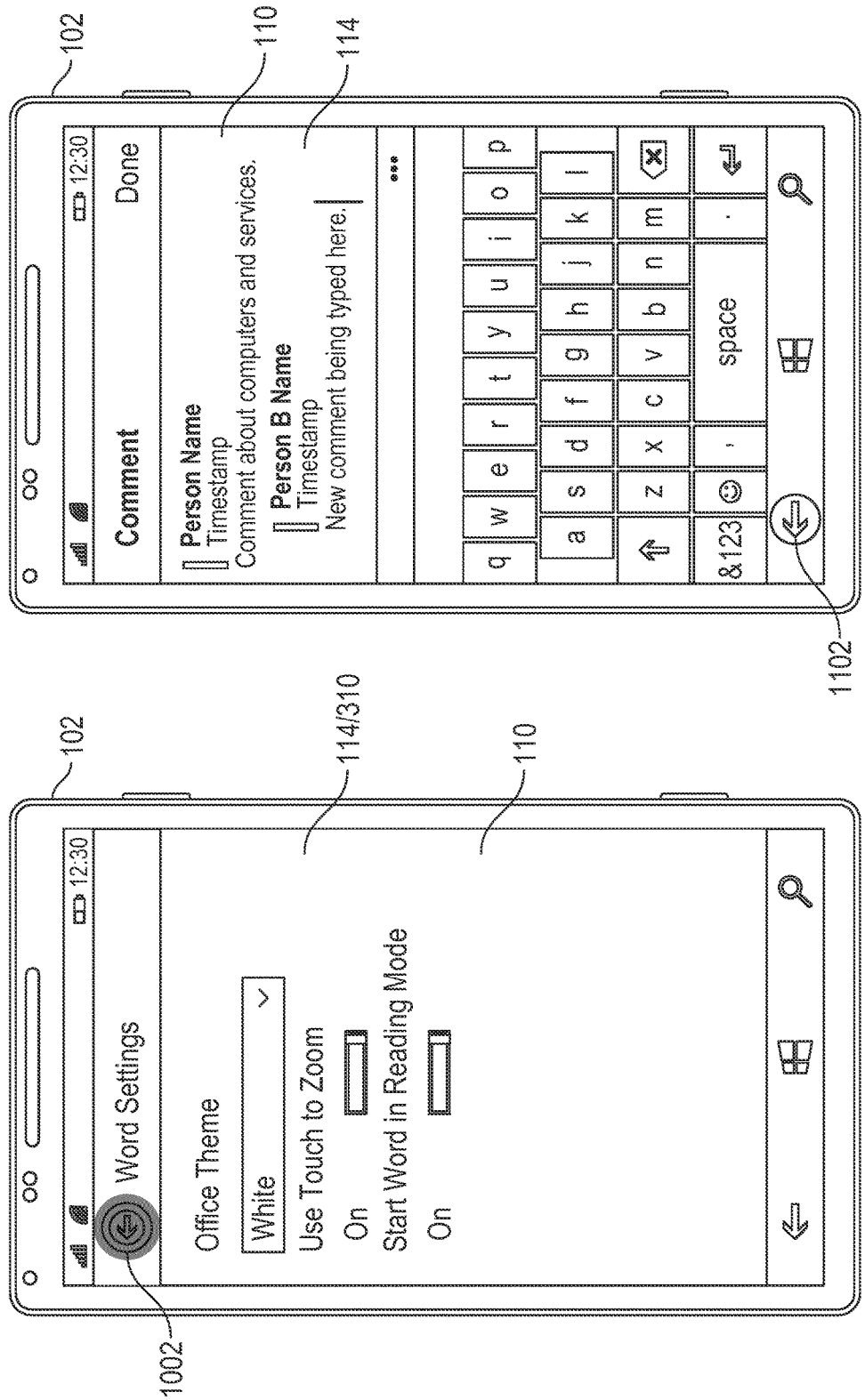

| Pattern | User Goals | When to use Pattern | Scenario |
|---|---|---|---|
| Commit & Cancel<br>312  314 | • User needs to save changes<br>• User able to discard changes | • Scenarios w/ Text Entry, Multi-select<br>• Scenario requires second action to complete flow | • Edit Hyperlink<br>• Alt Text (edit mode)<br>• Split Cells |
| Commit only - Done<br>312 | • User needs to navigate after making changes | • "Insta-commit" changes, particularly text entry | • Comment (edit mode)<br>• Sort/Filter<br>• Shape Size (edit mode) |
| Back/Drill-out<br>1002 | • User needs to navigate after making changes | • "Insta-commit" scenarios after Drilling-in | • Settings |
| Close (X)<br>316 | • User needs to navigate | • Half Pane<br>• Non-editable scenarios | • Comment Half Pane<br>• Insights Half Pane |

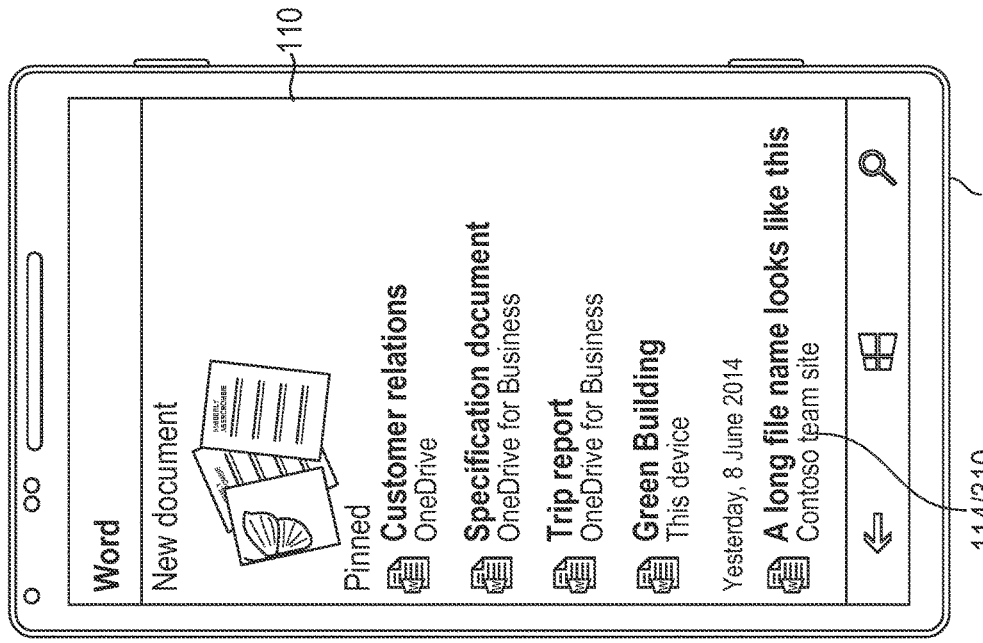
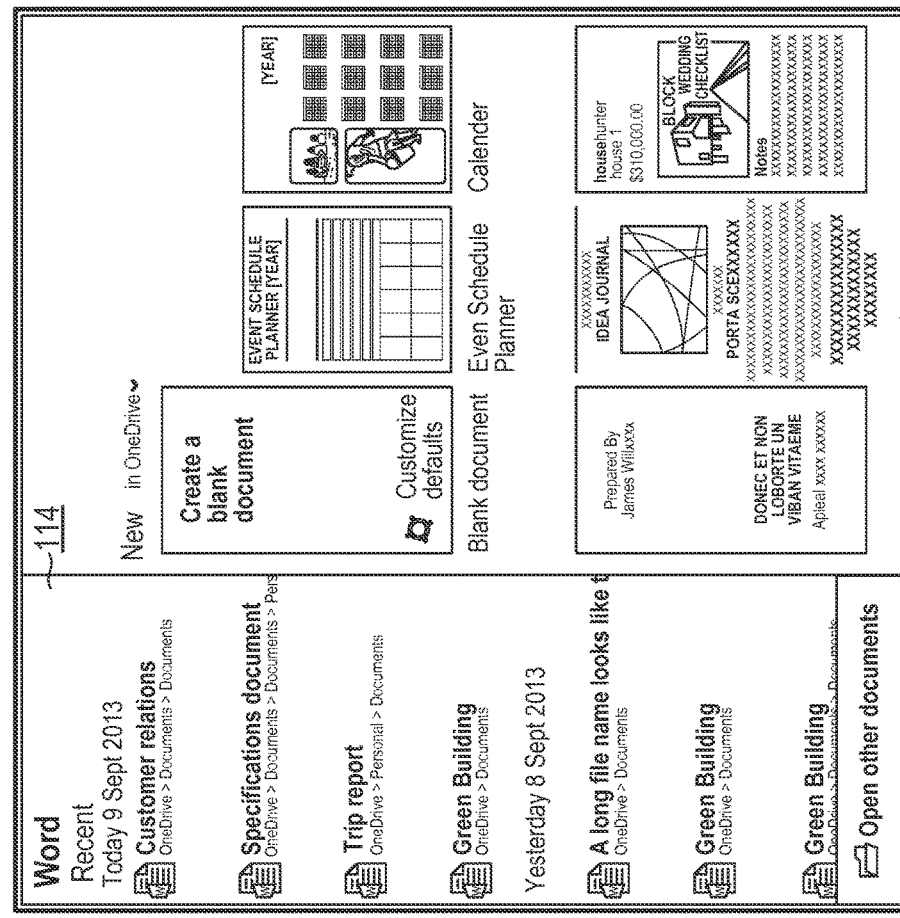
FIG. 13

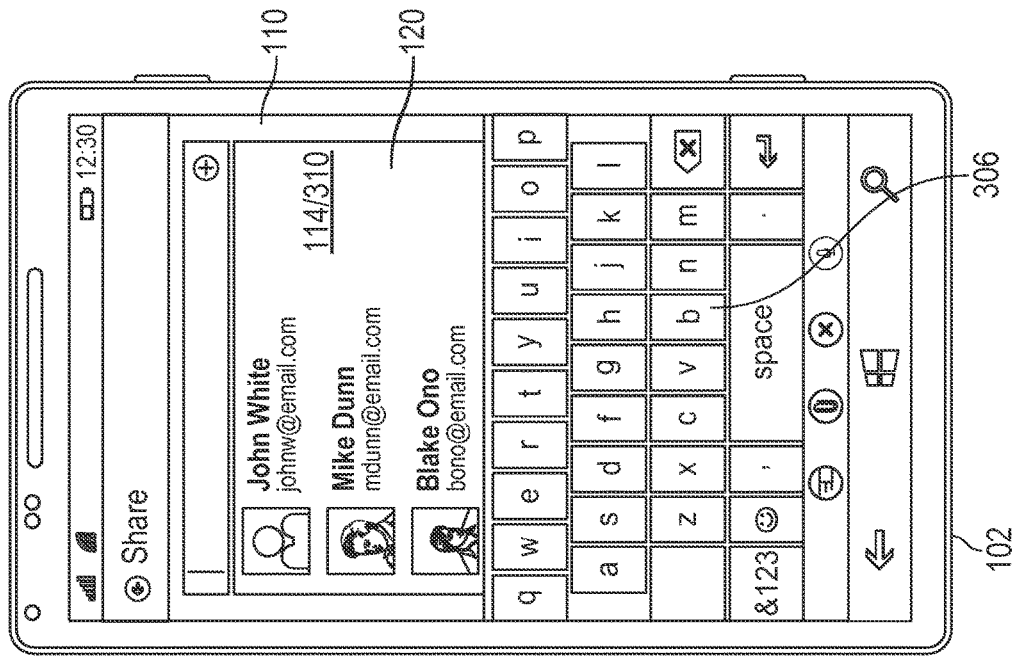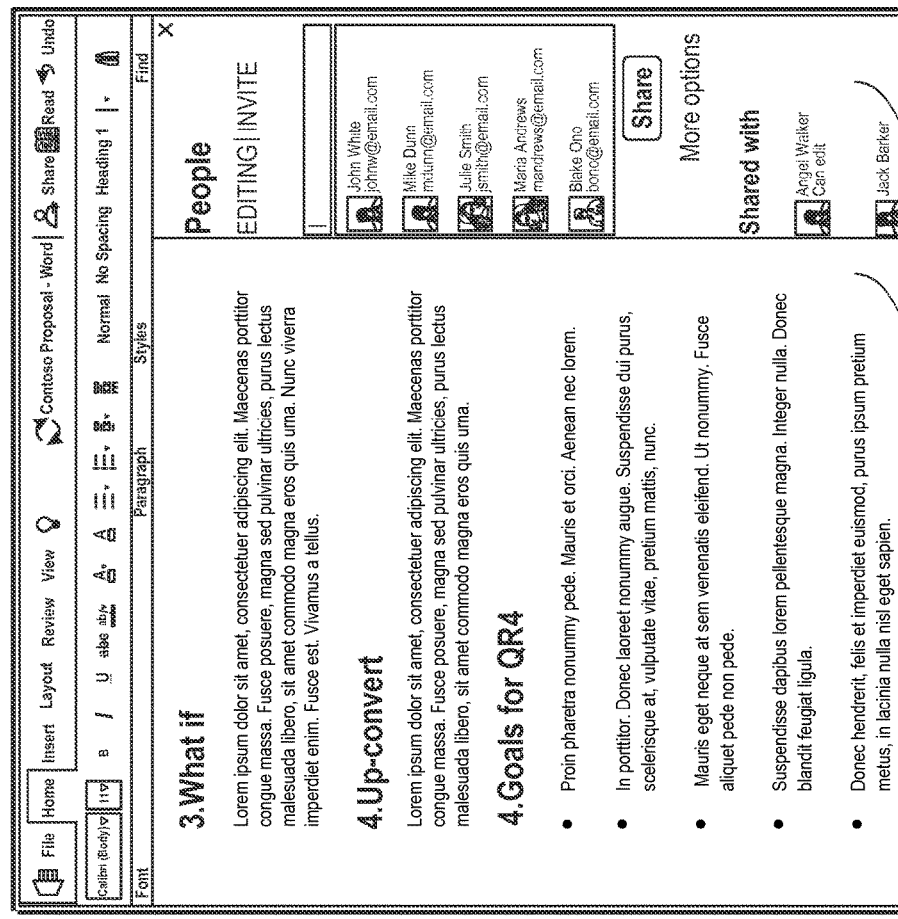
FIG. 17

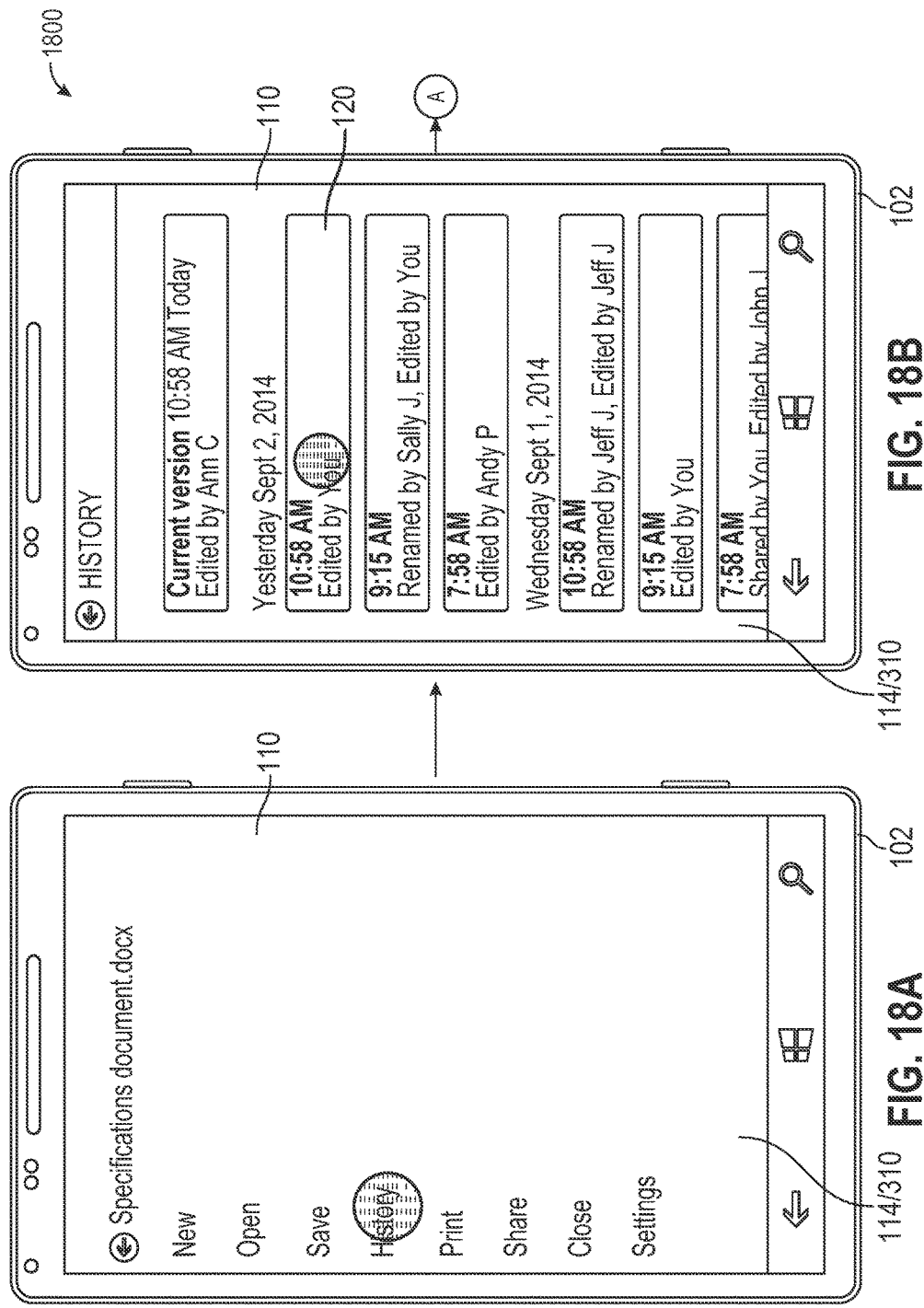

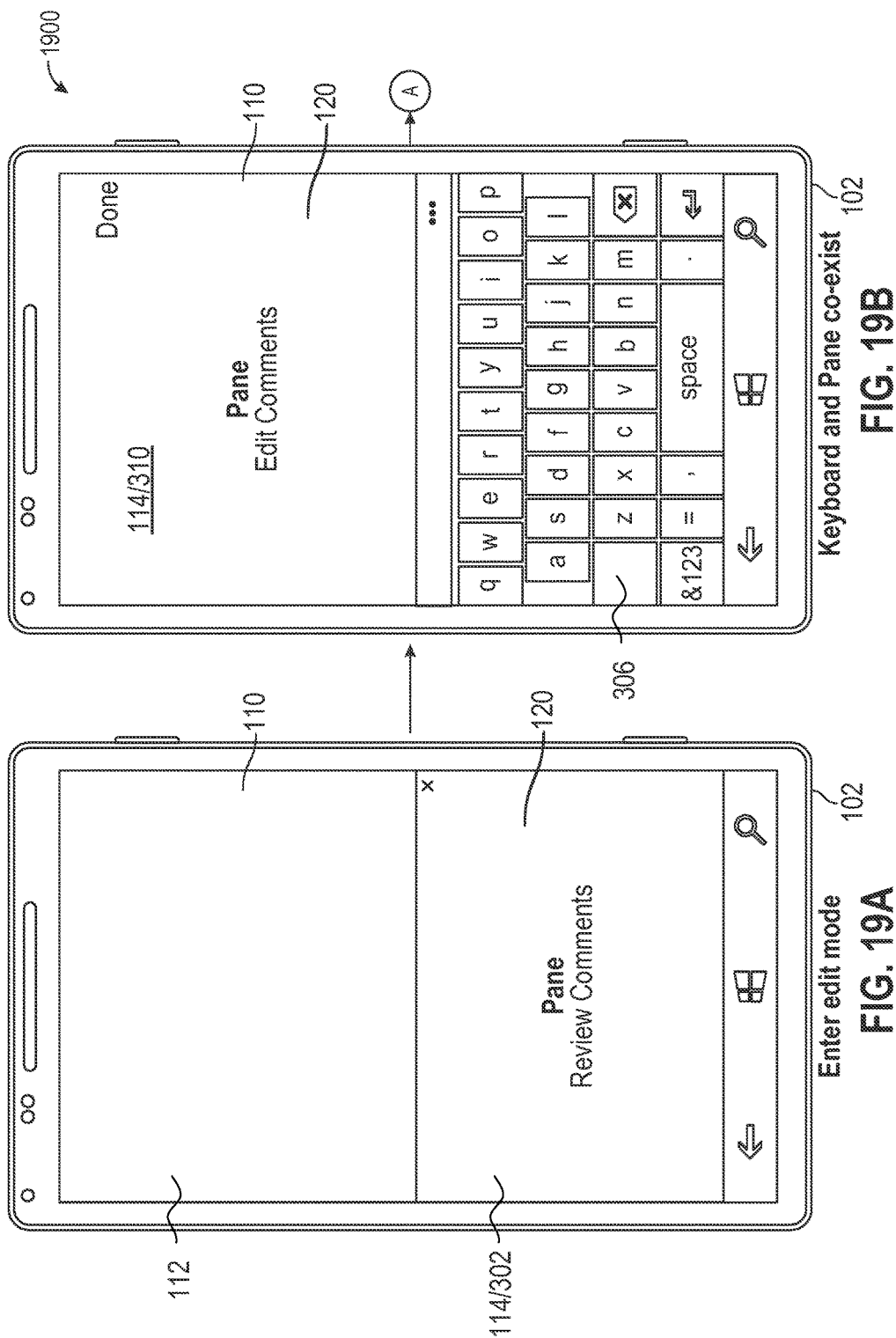

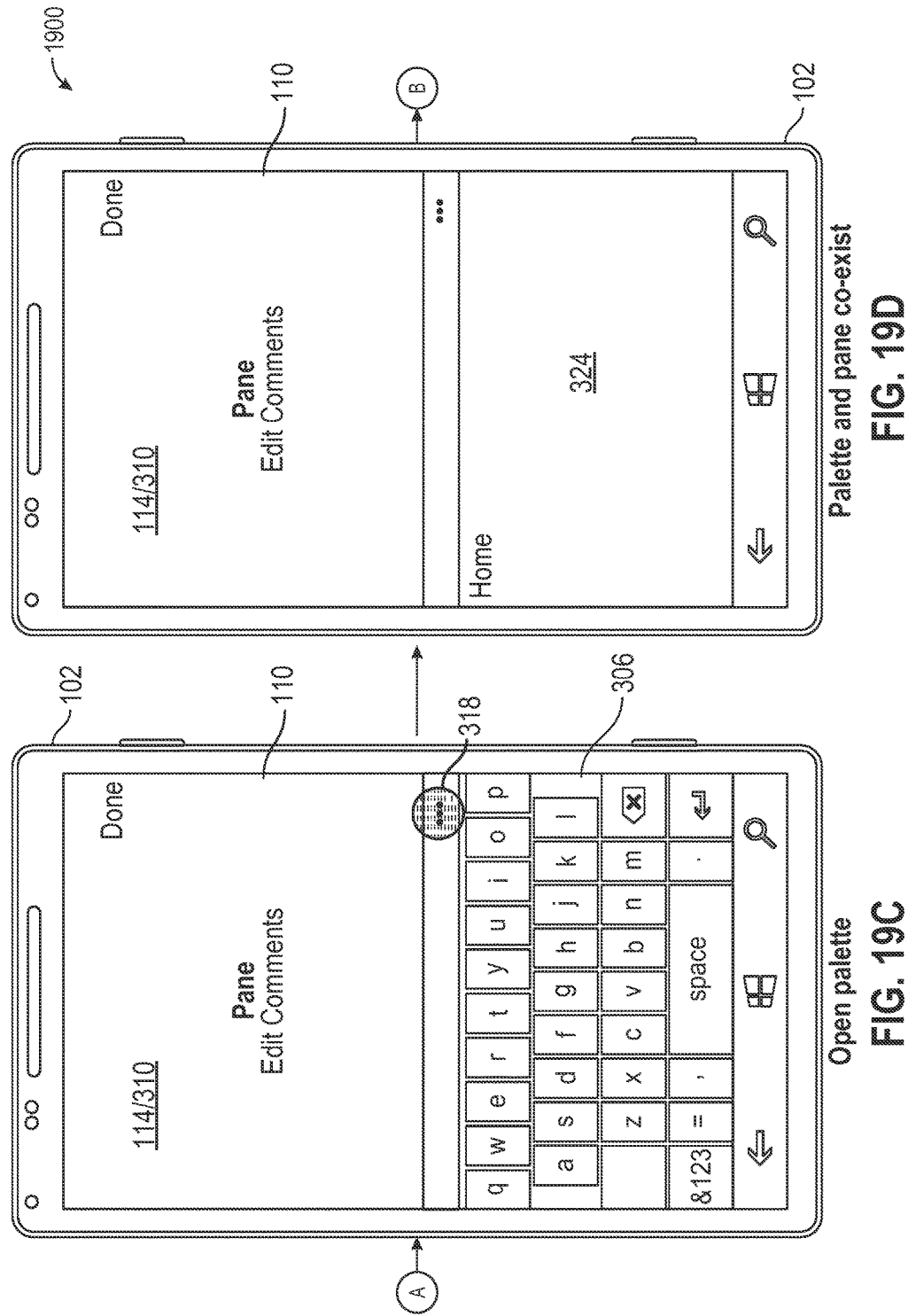

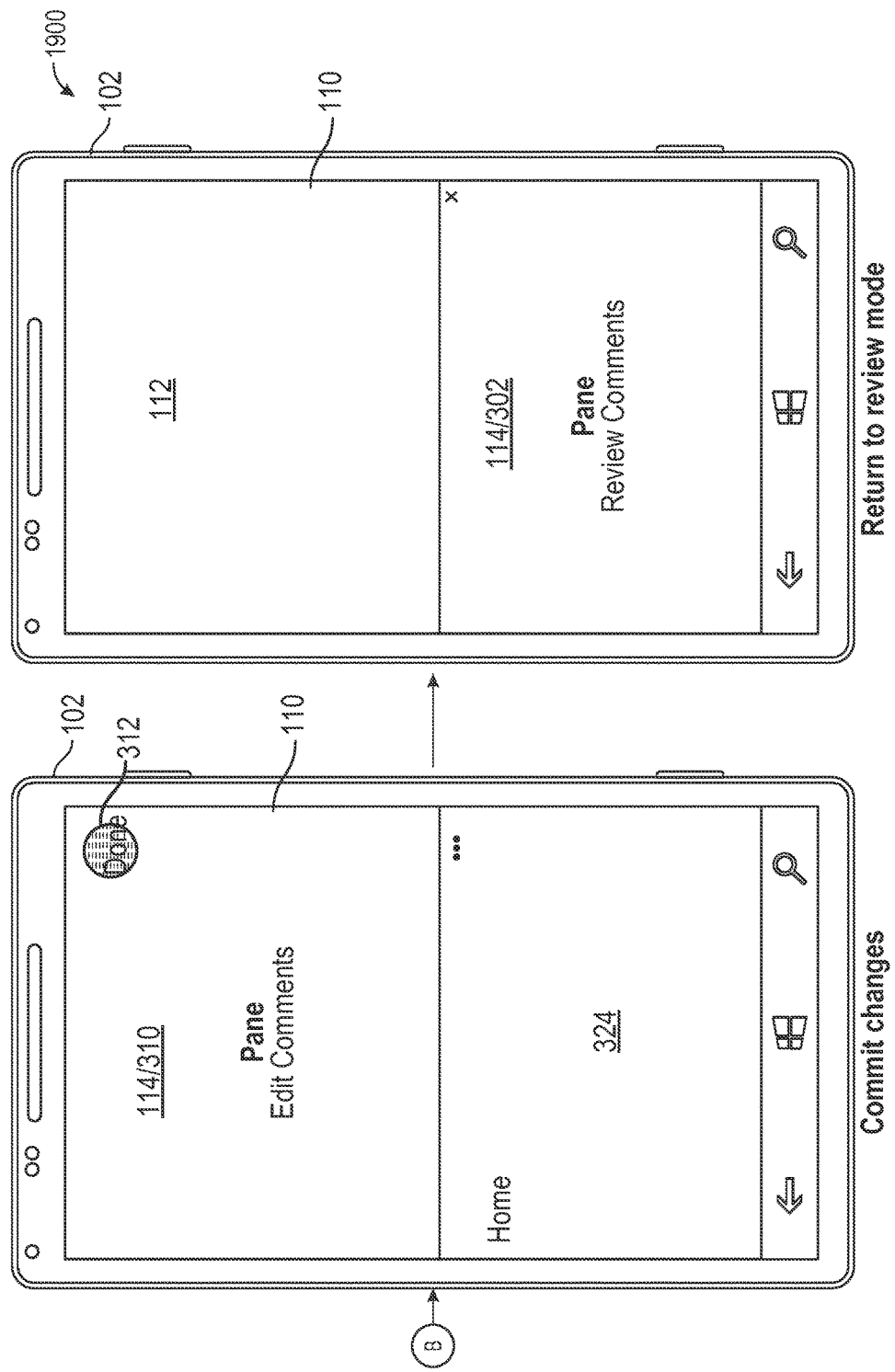

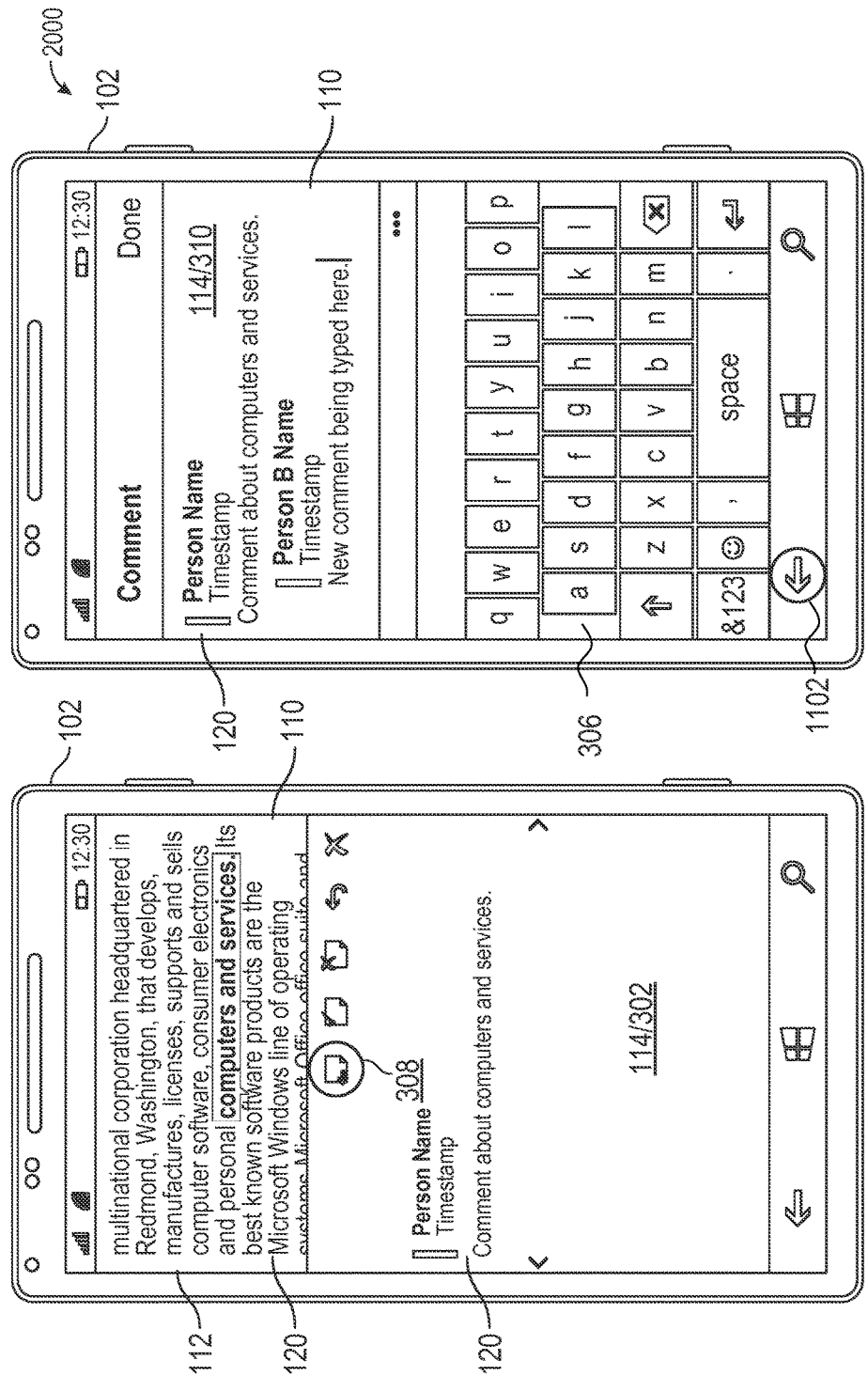

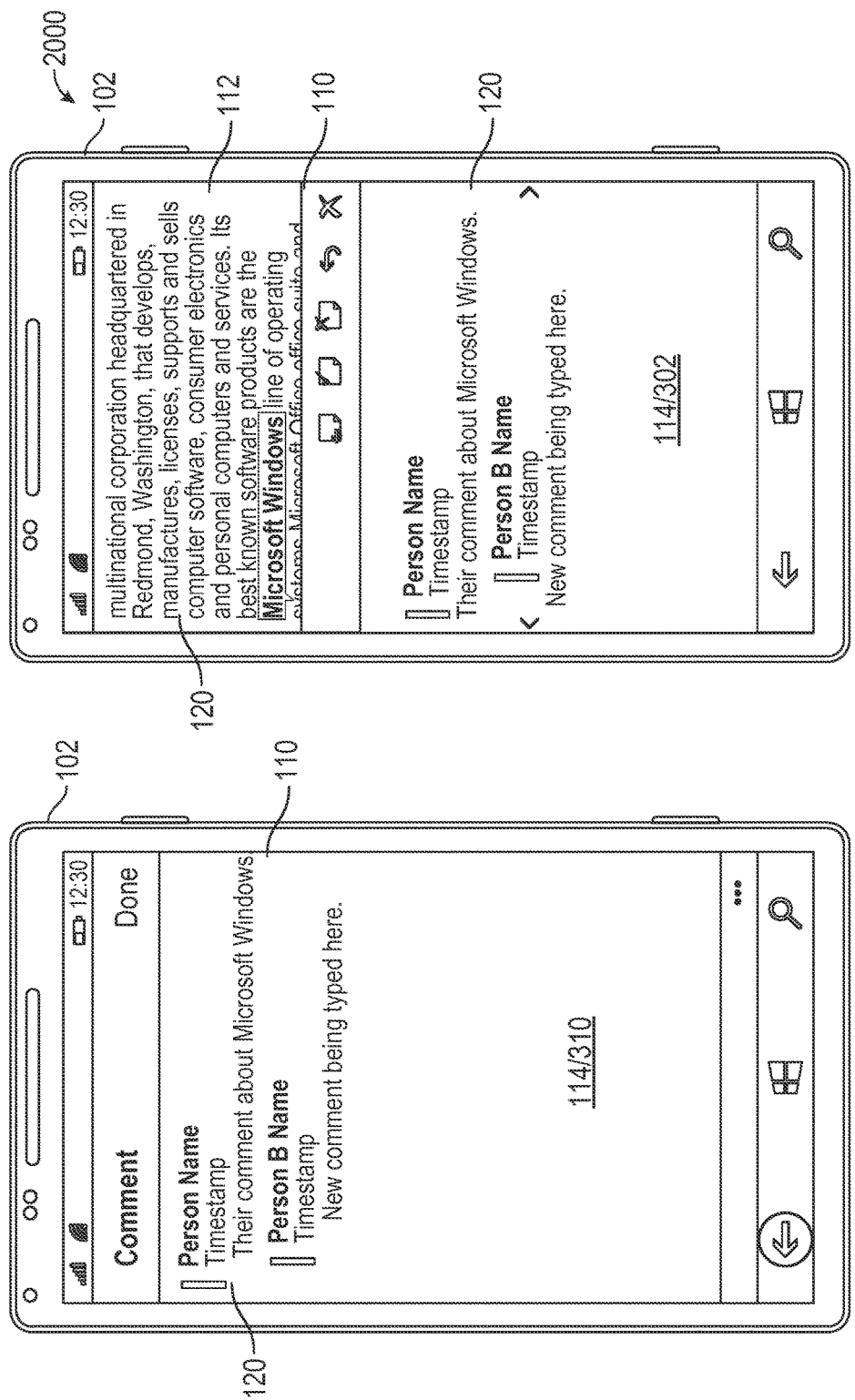

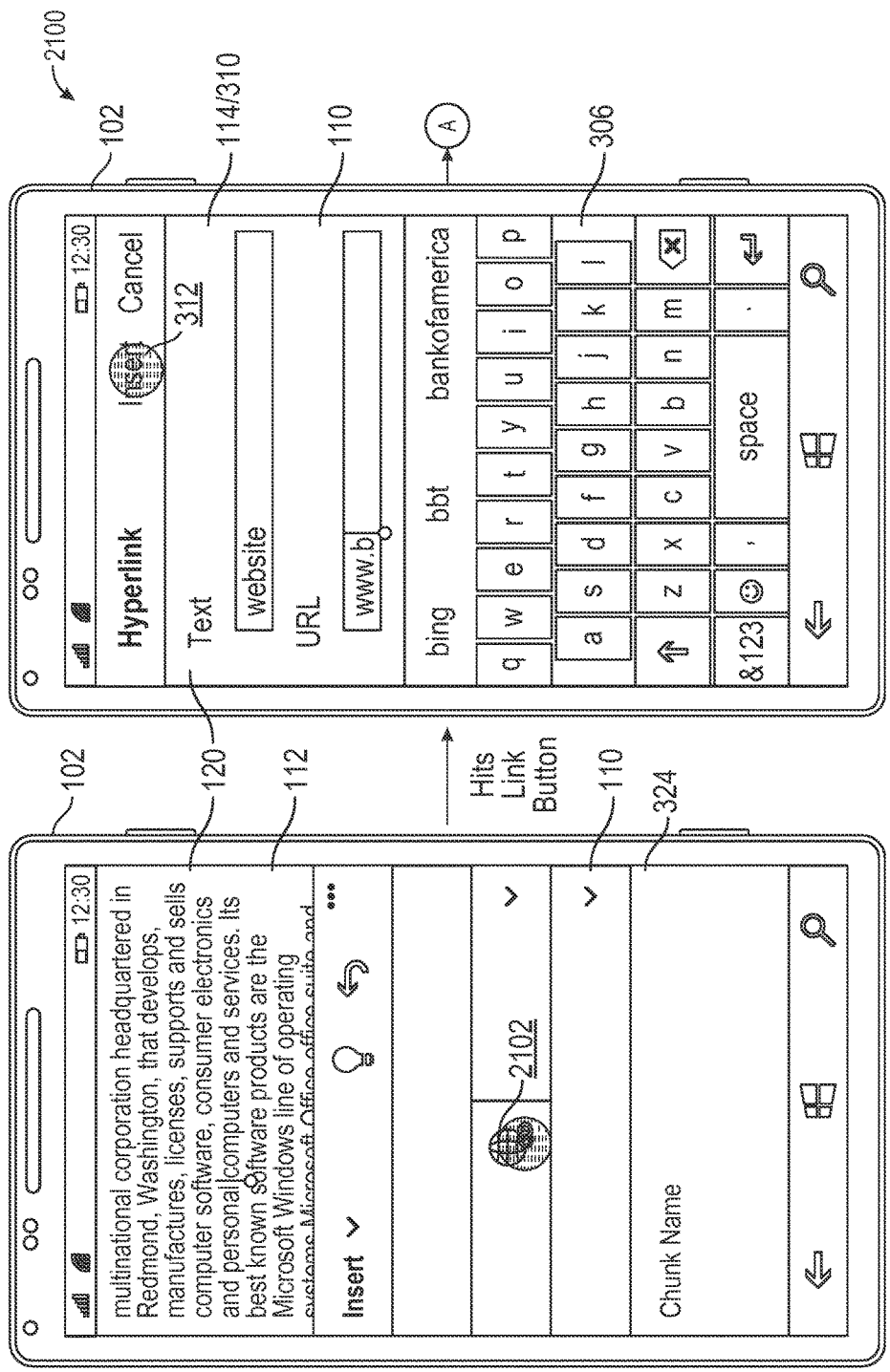

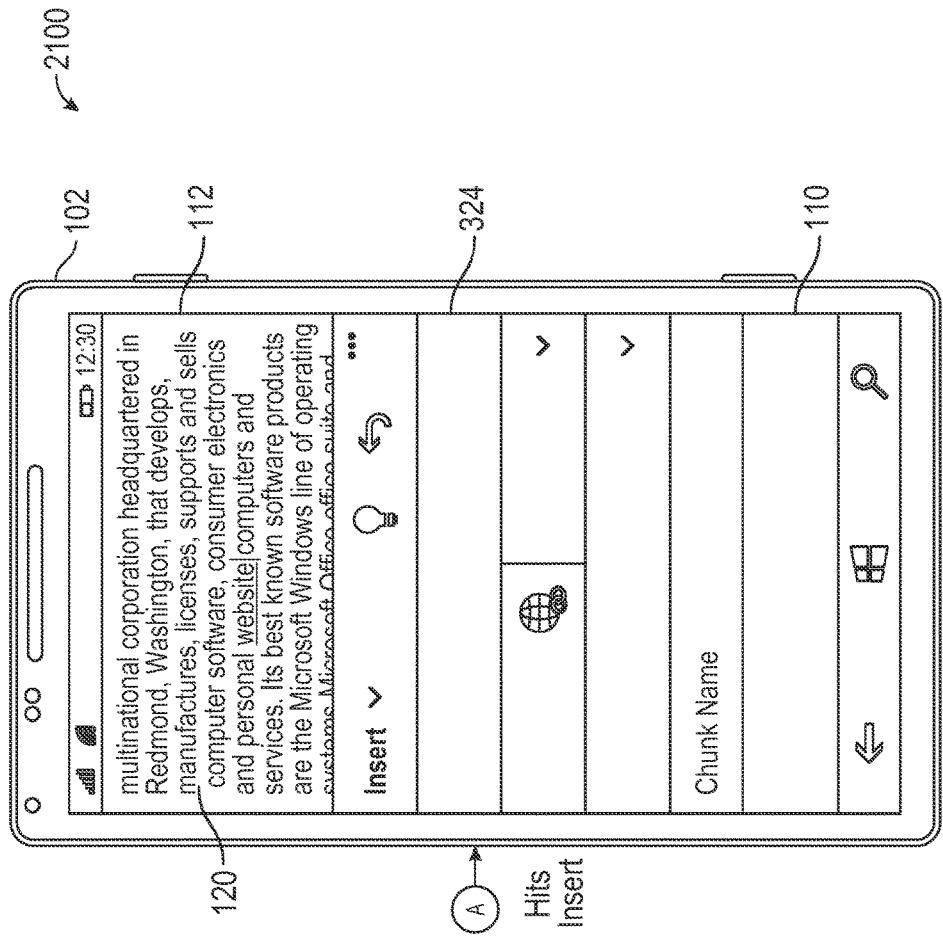
FIG. 21C Link Inserted into Document

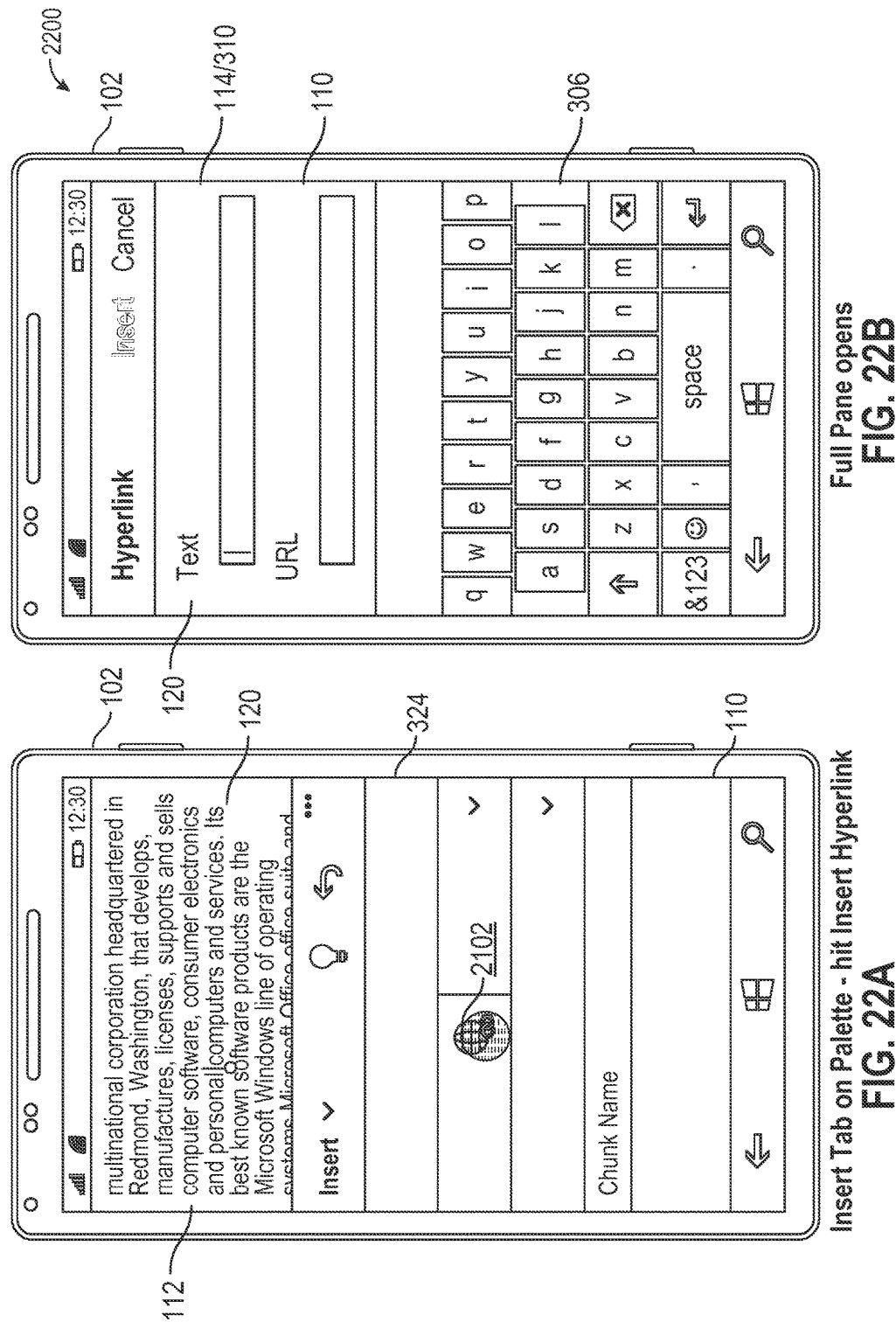

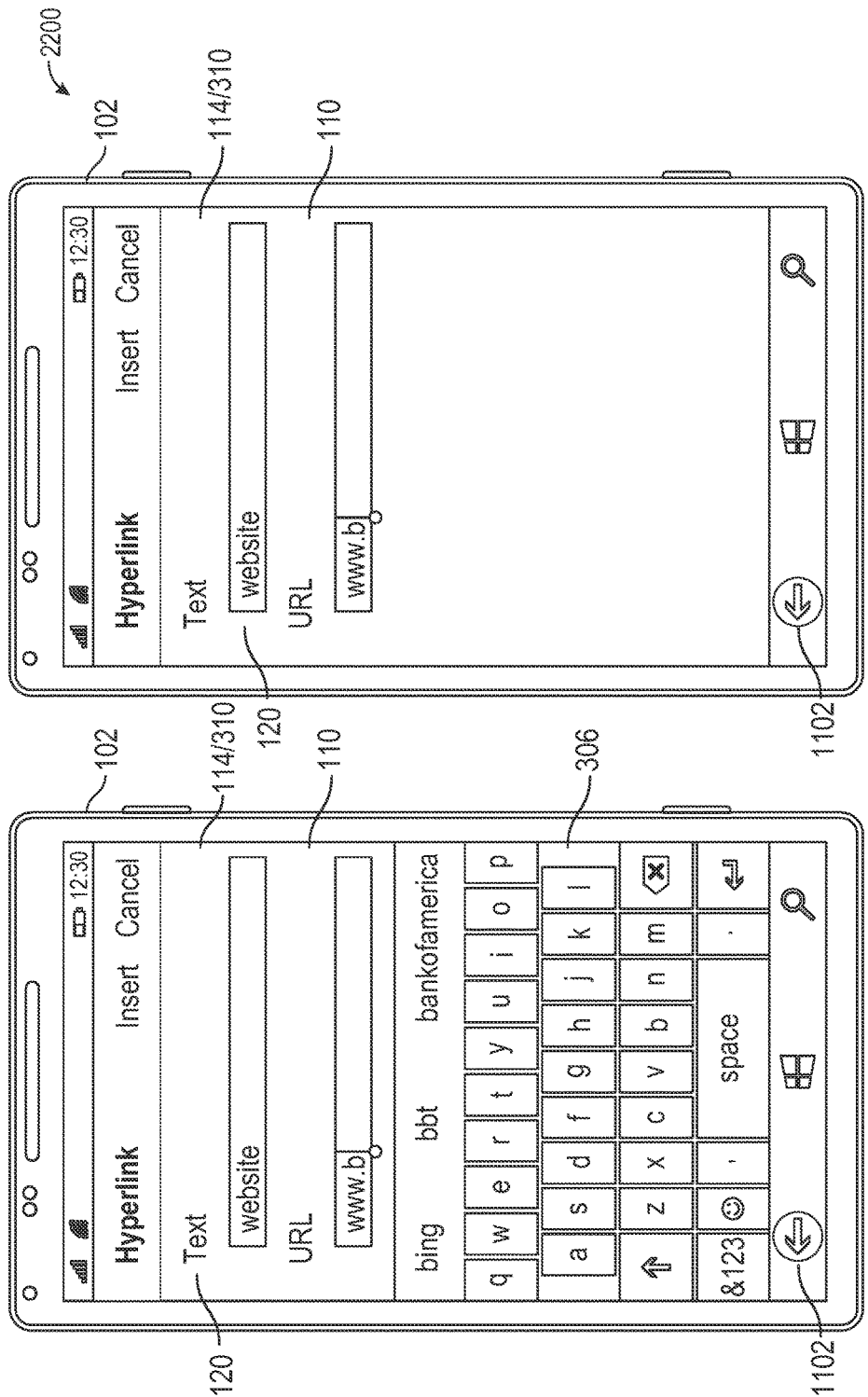

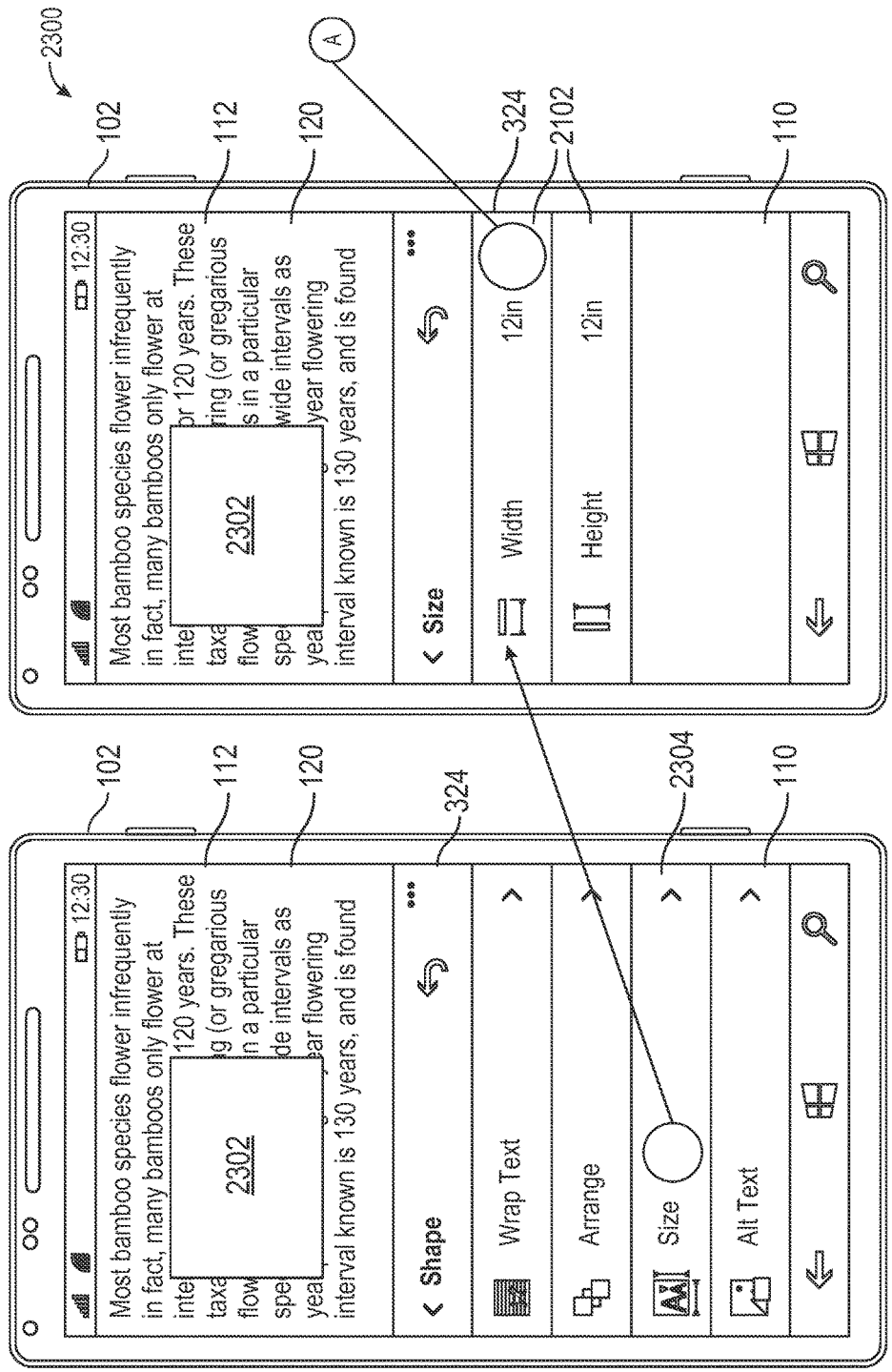

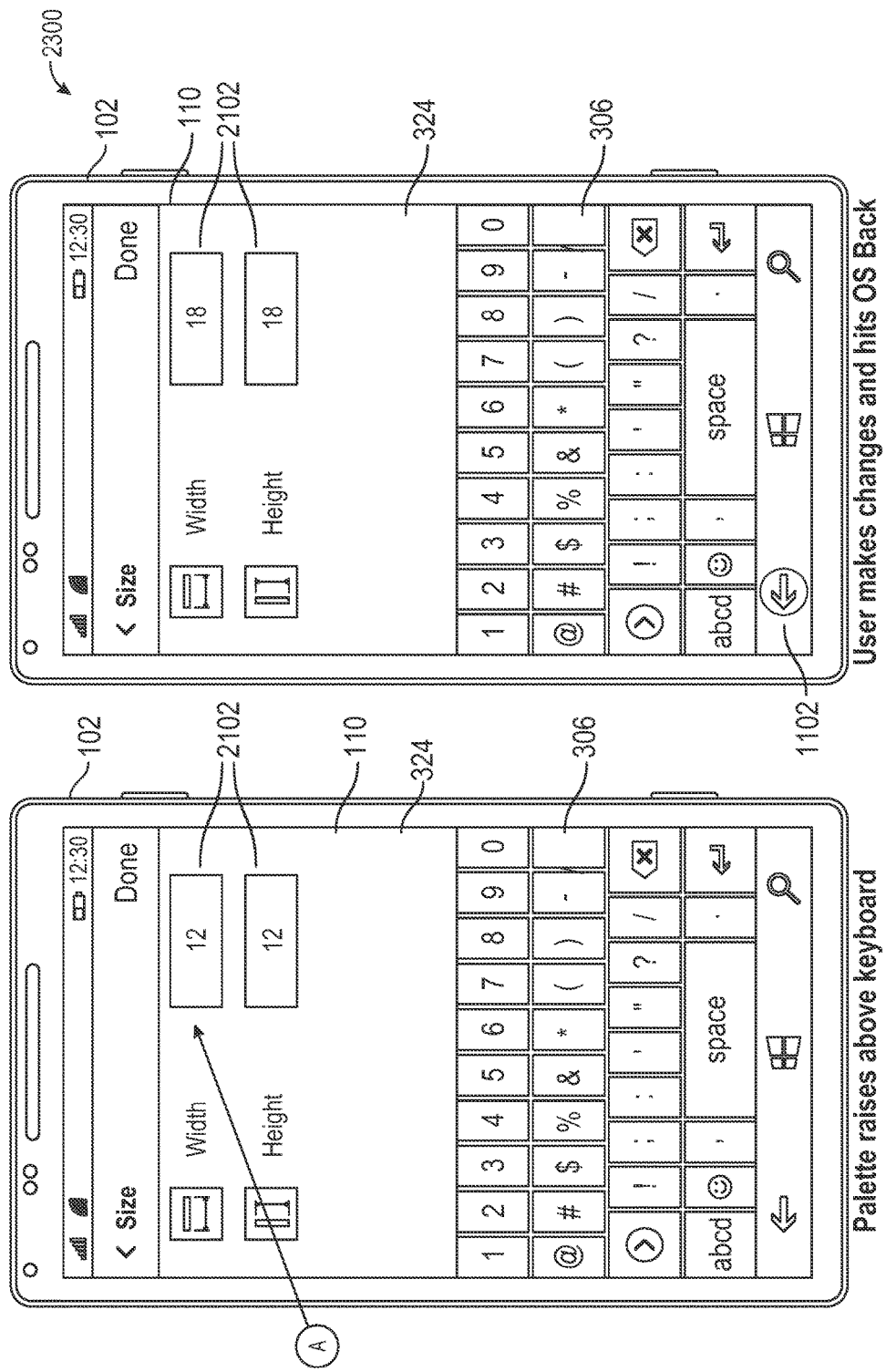

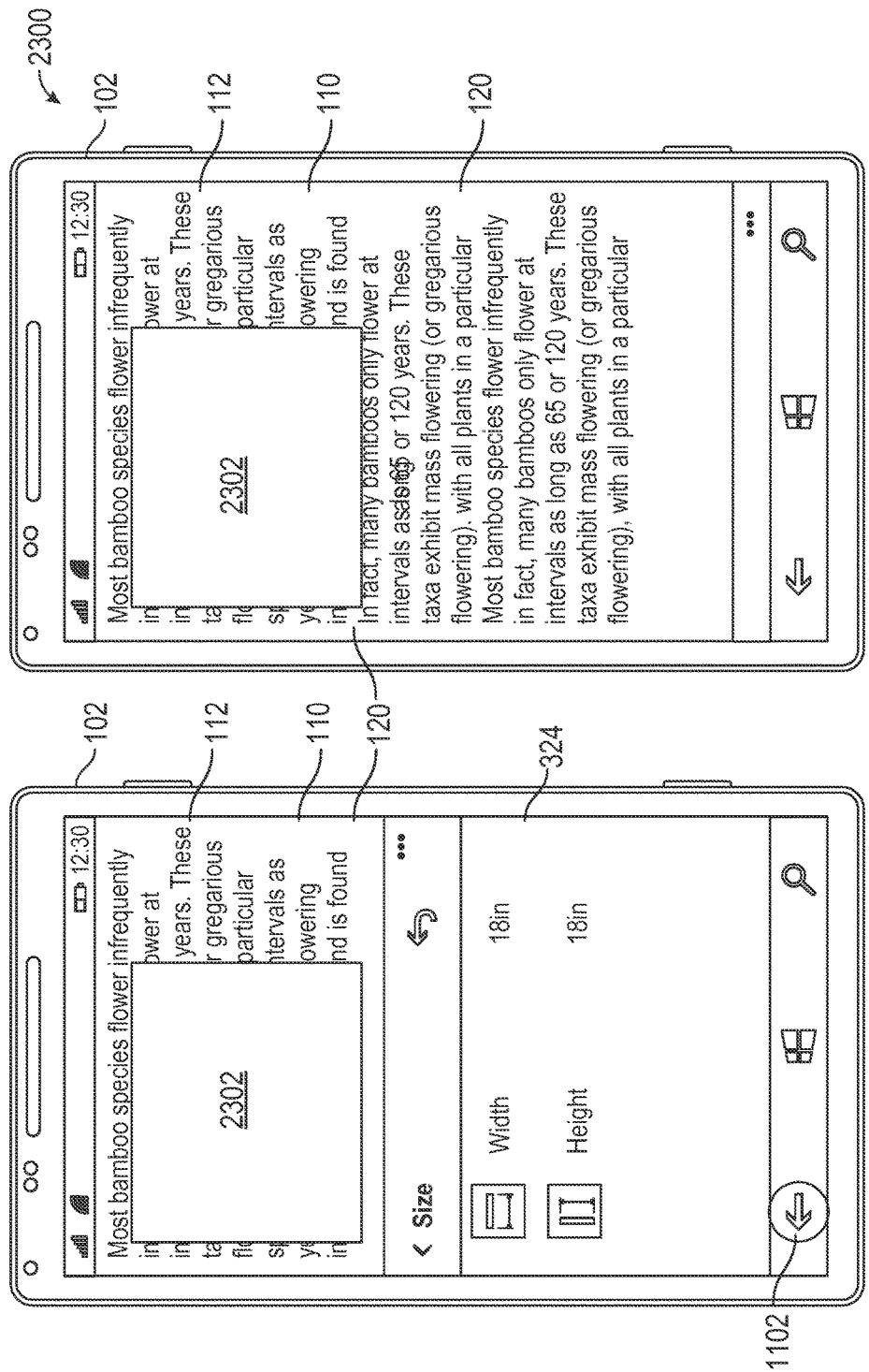
FIG. 23E Keyboard and Palette drop; Changes Saved
FIG. 23F OS back closes the Palette

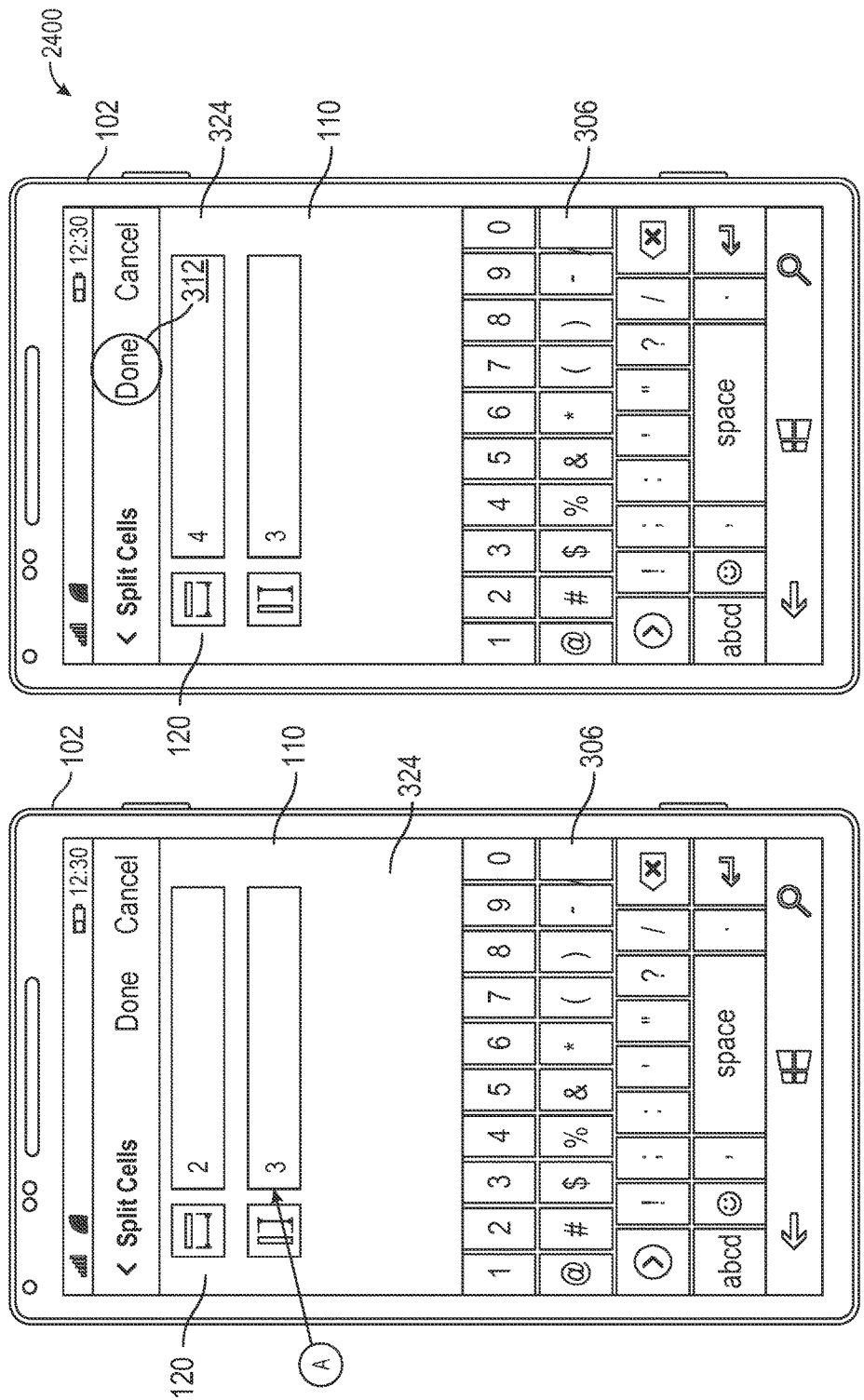

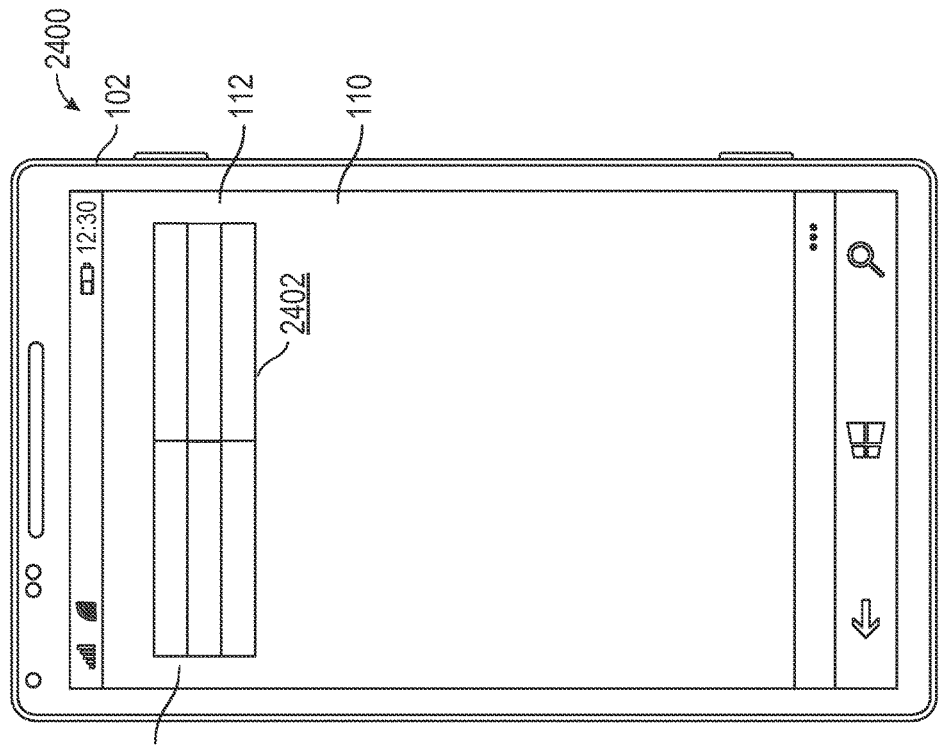
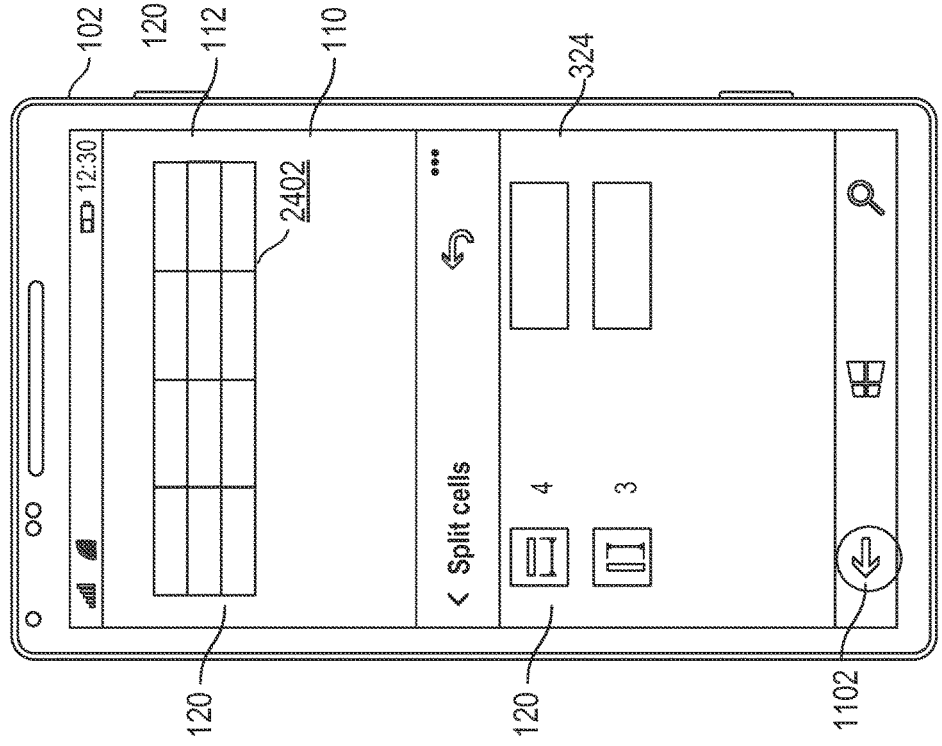

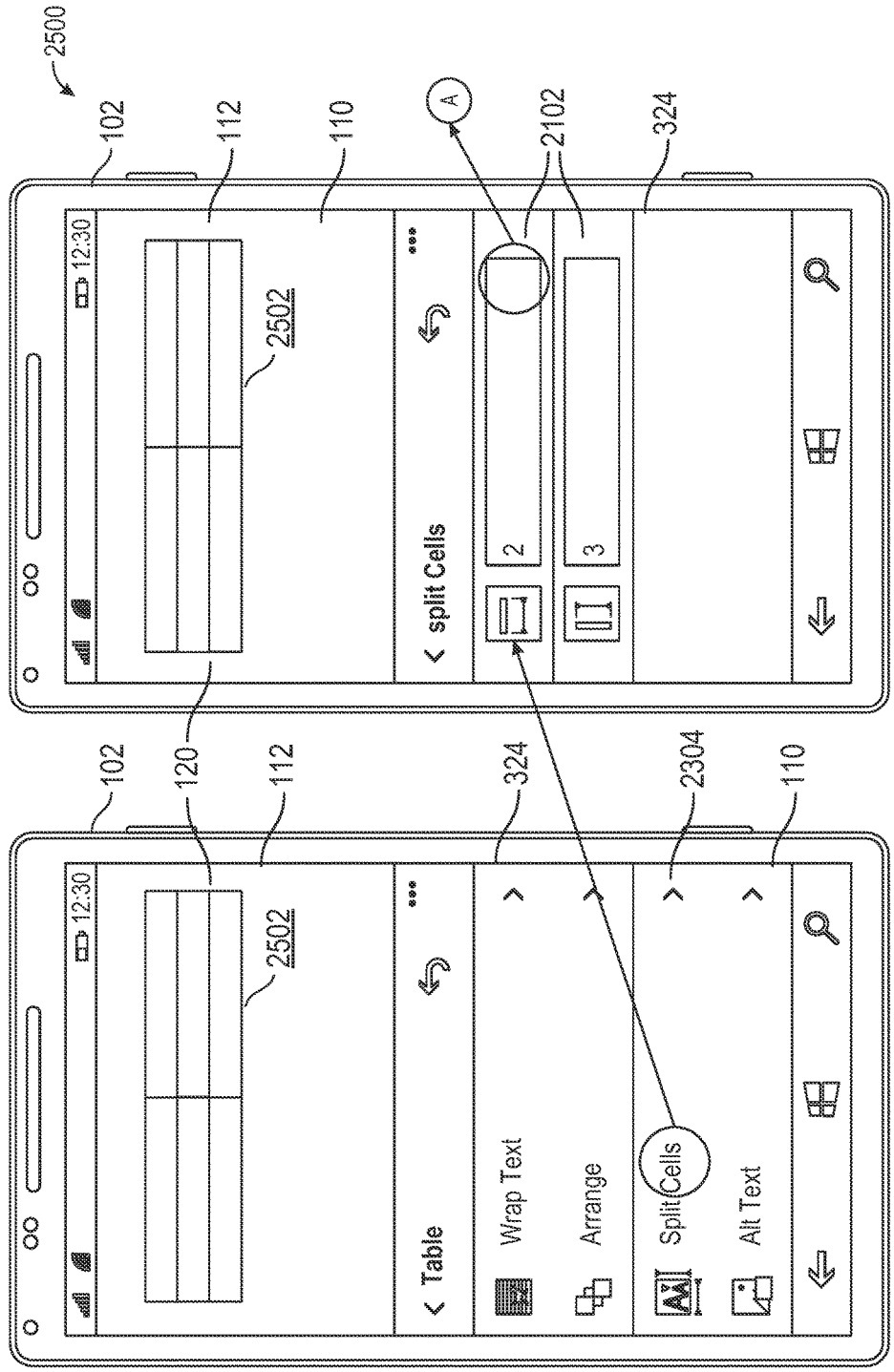

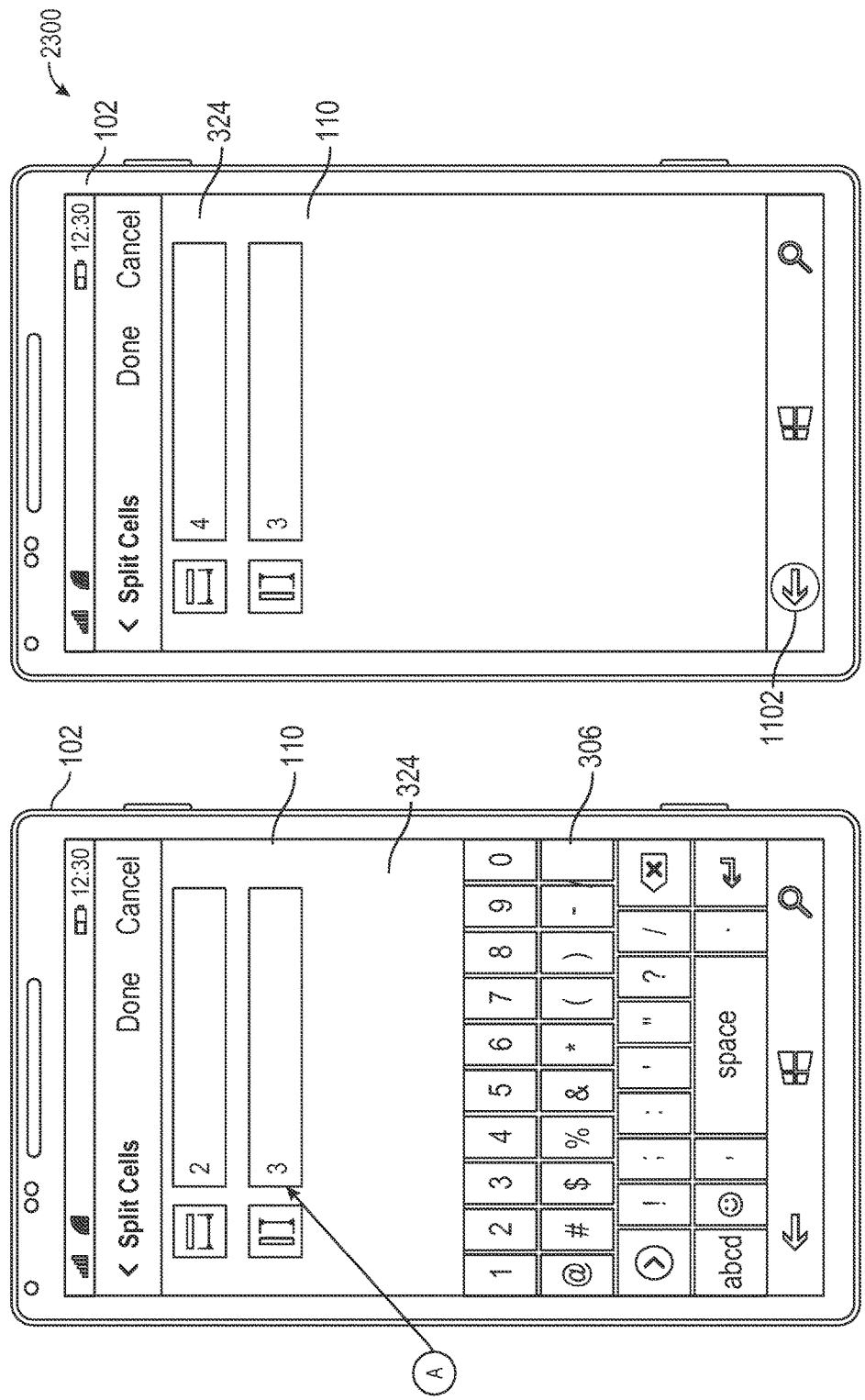

Hits OS Back again, changes discarded

OS back closes the Palette

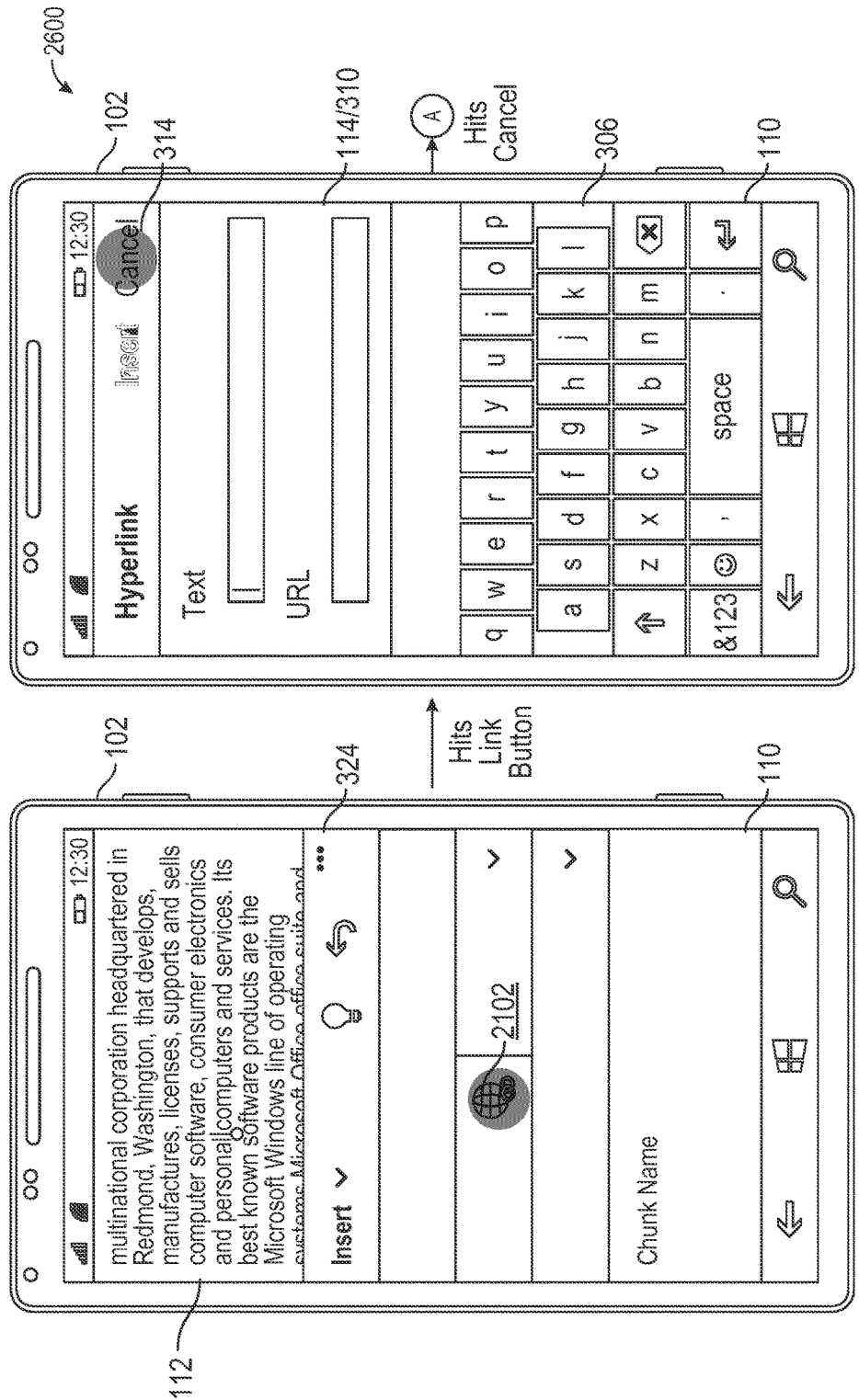

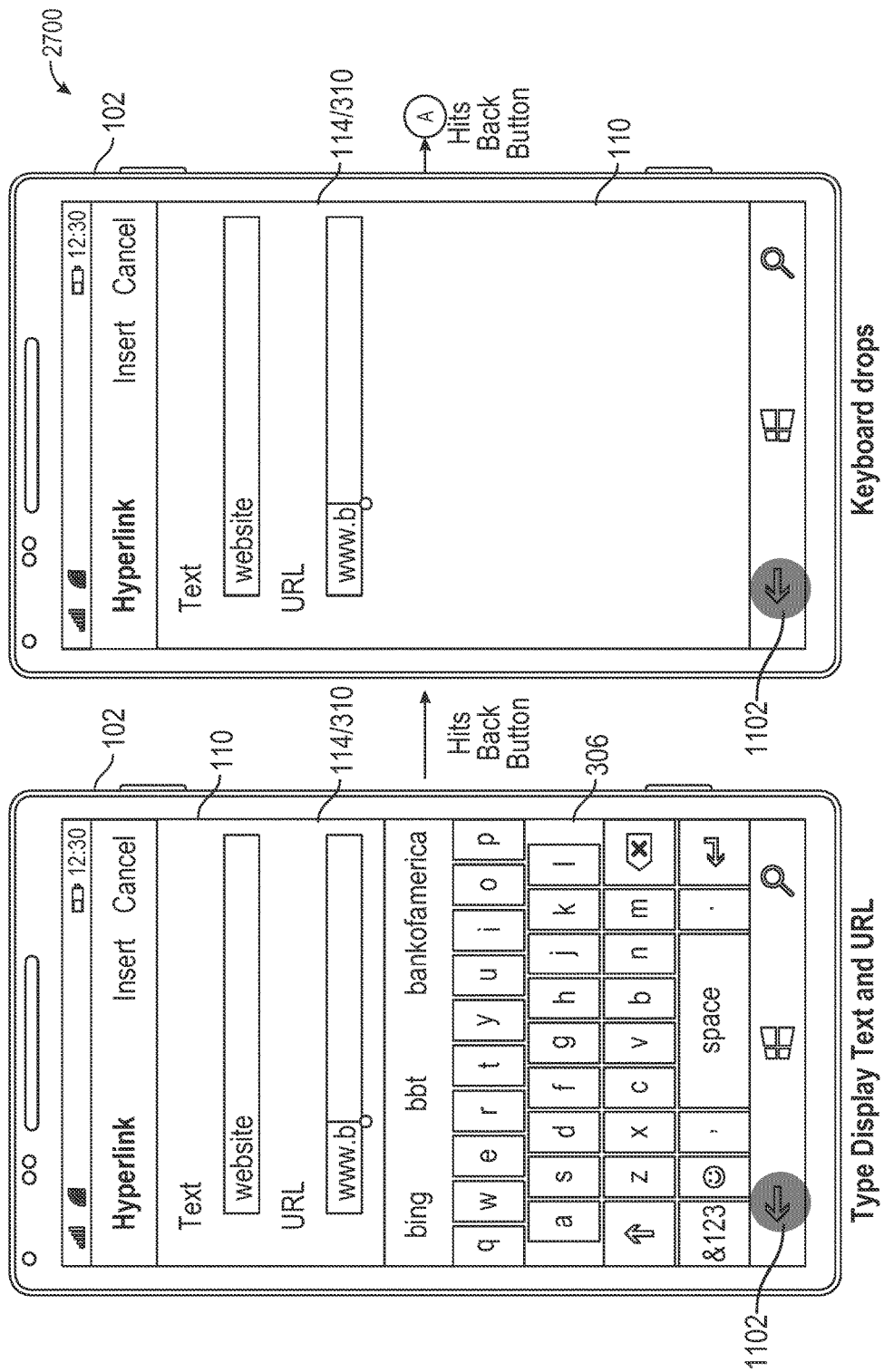

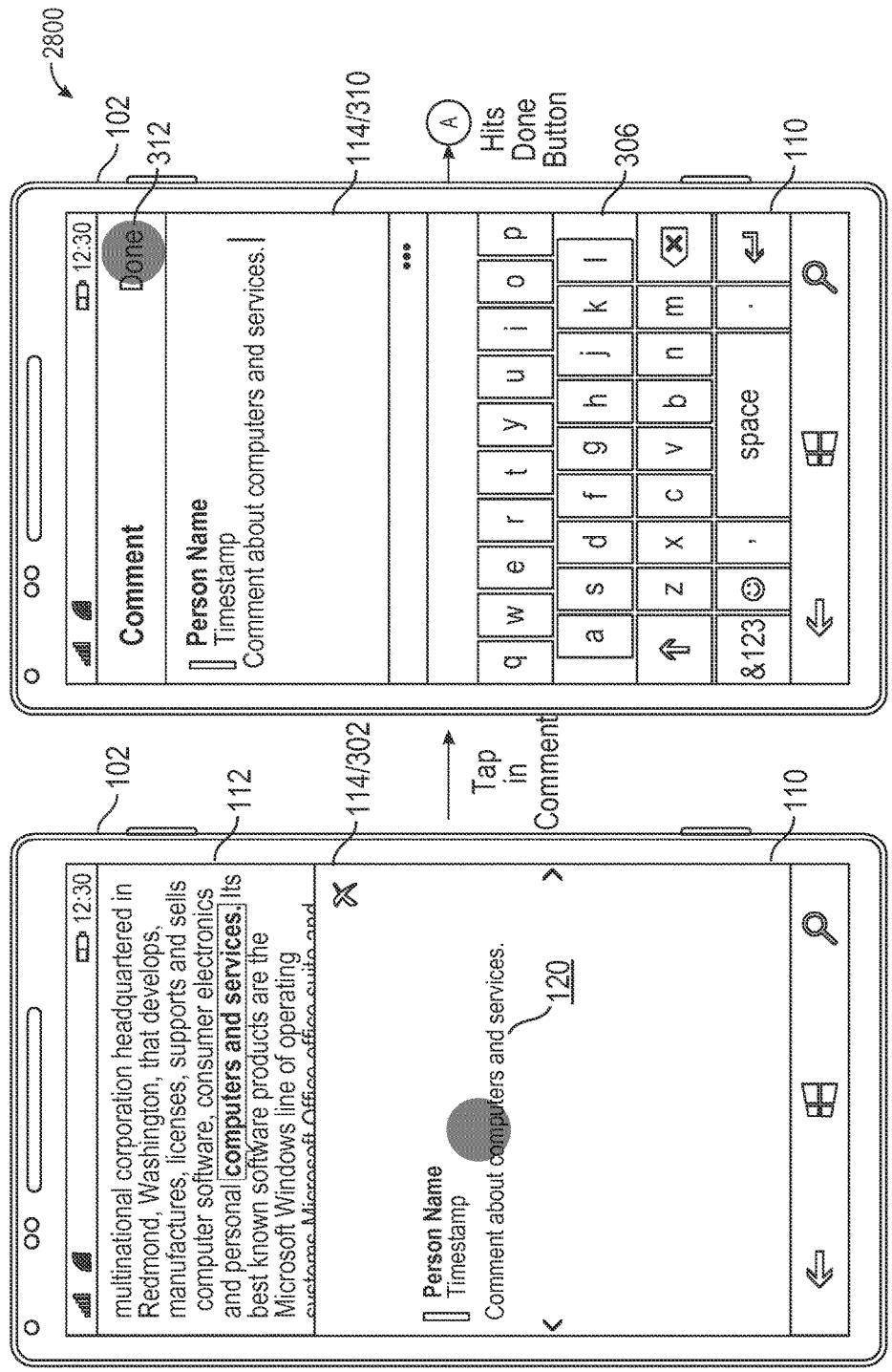

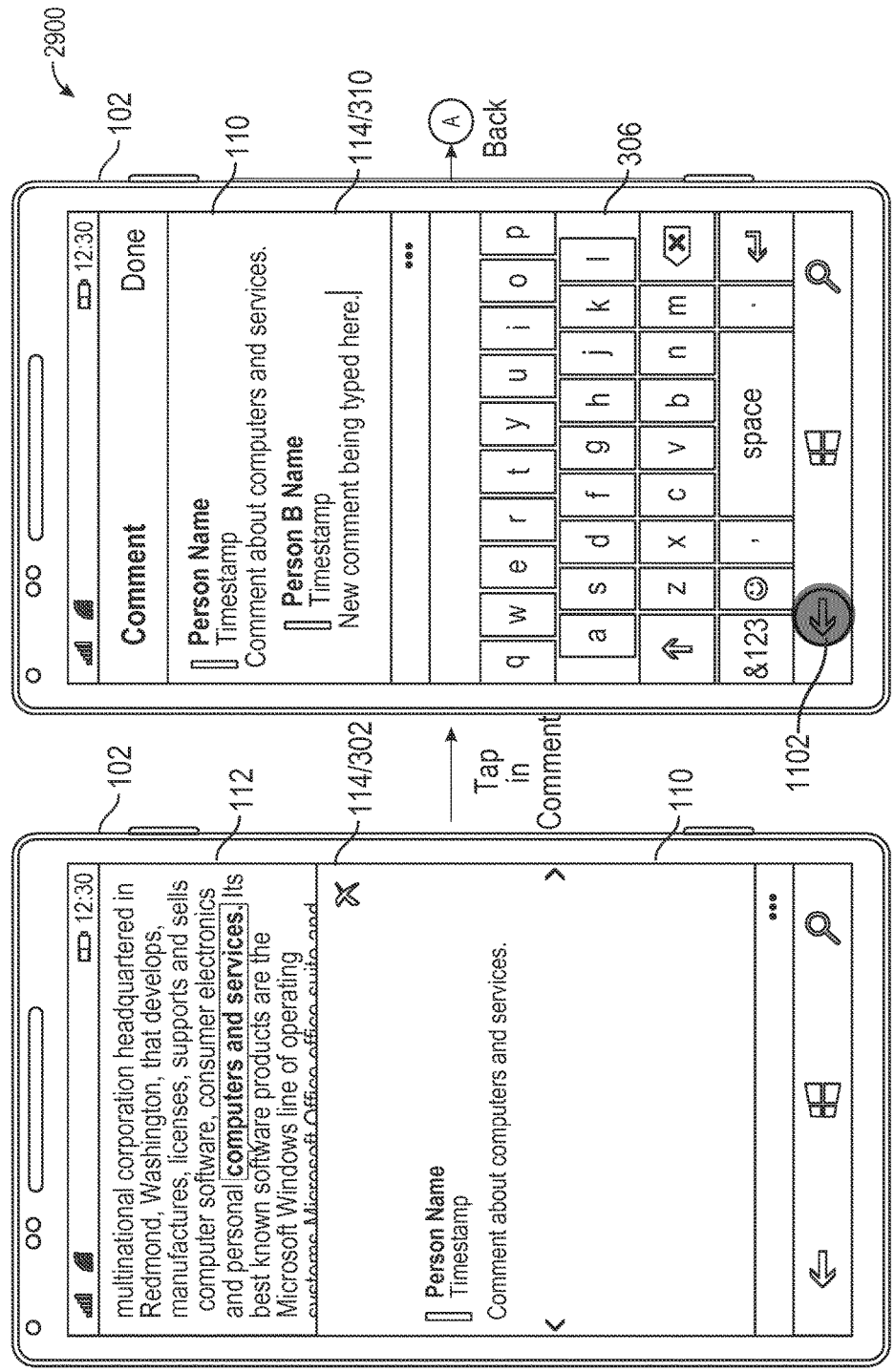
FIG. 29A Enter Commenting Half Pane
FIG. 29B Add Reply to Comment

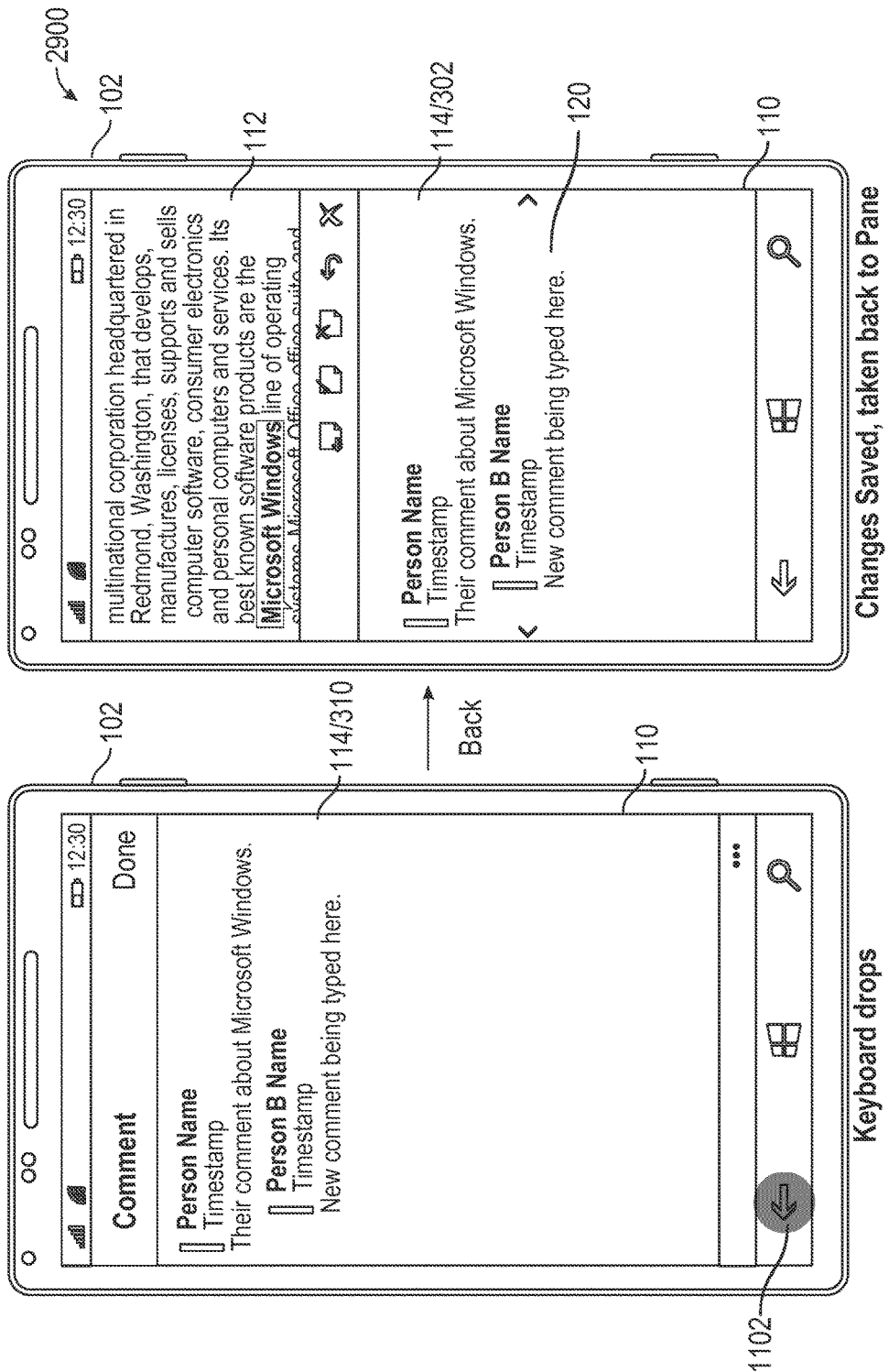
FIG. 29C Keyboard drops
FIG. 29D Changes Saved, taken back to Pane

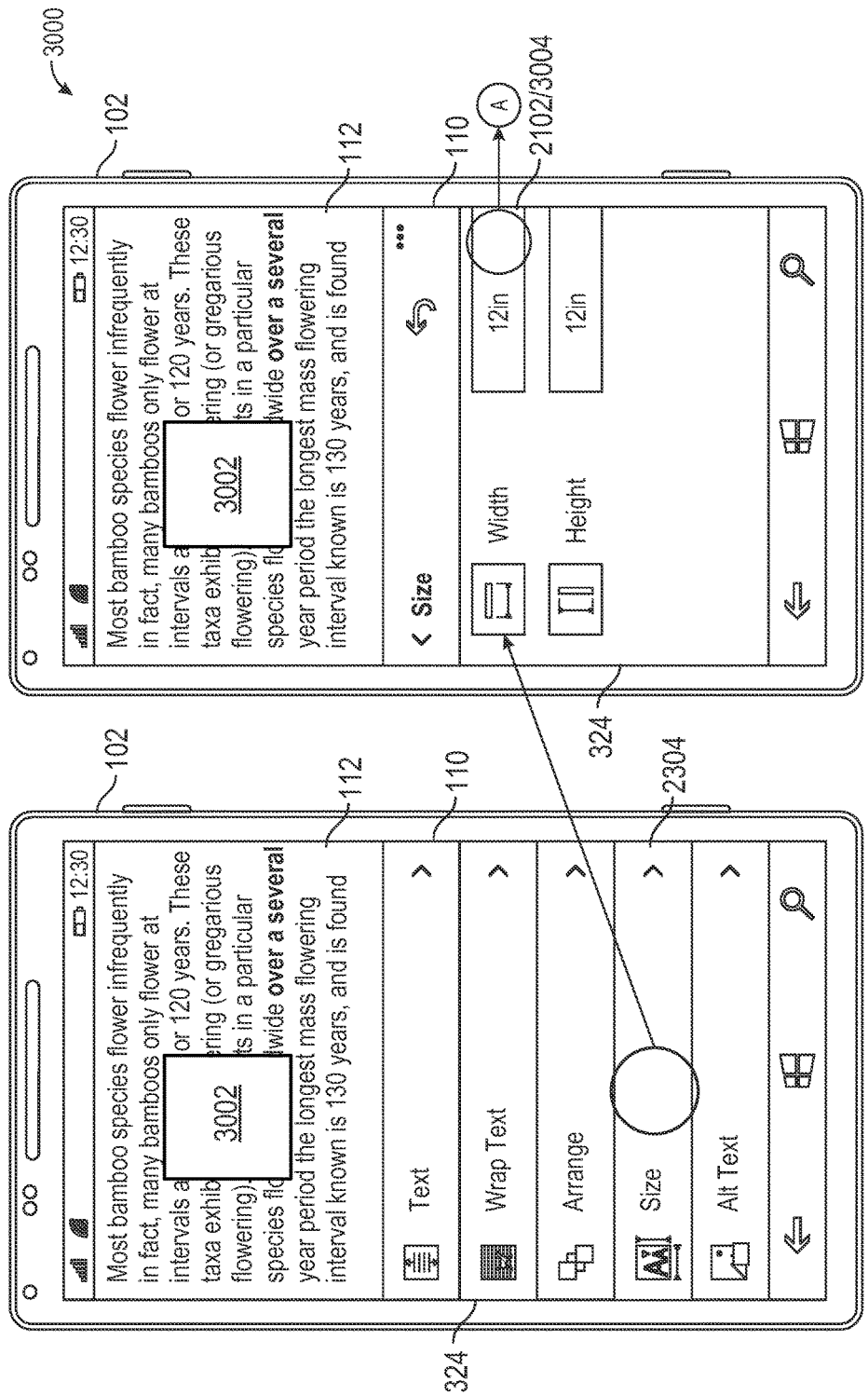

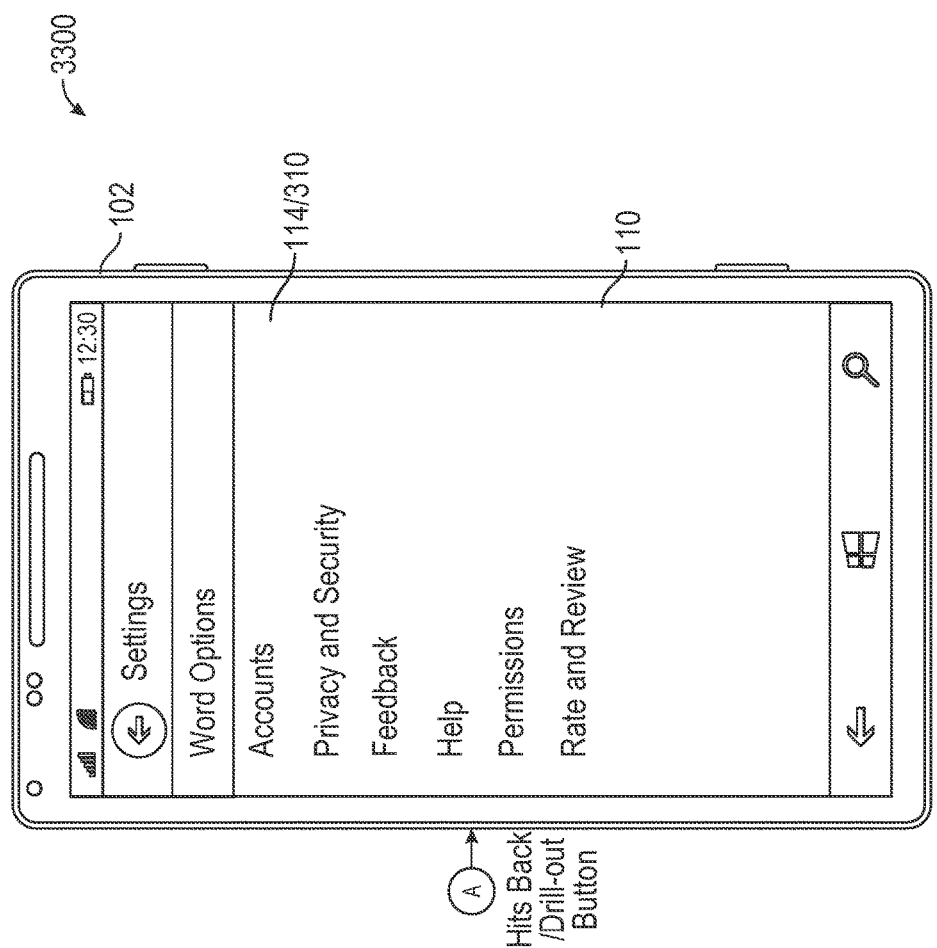

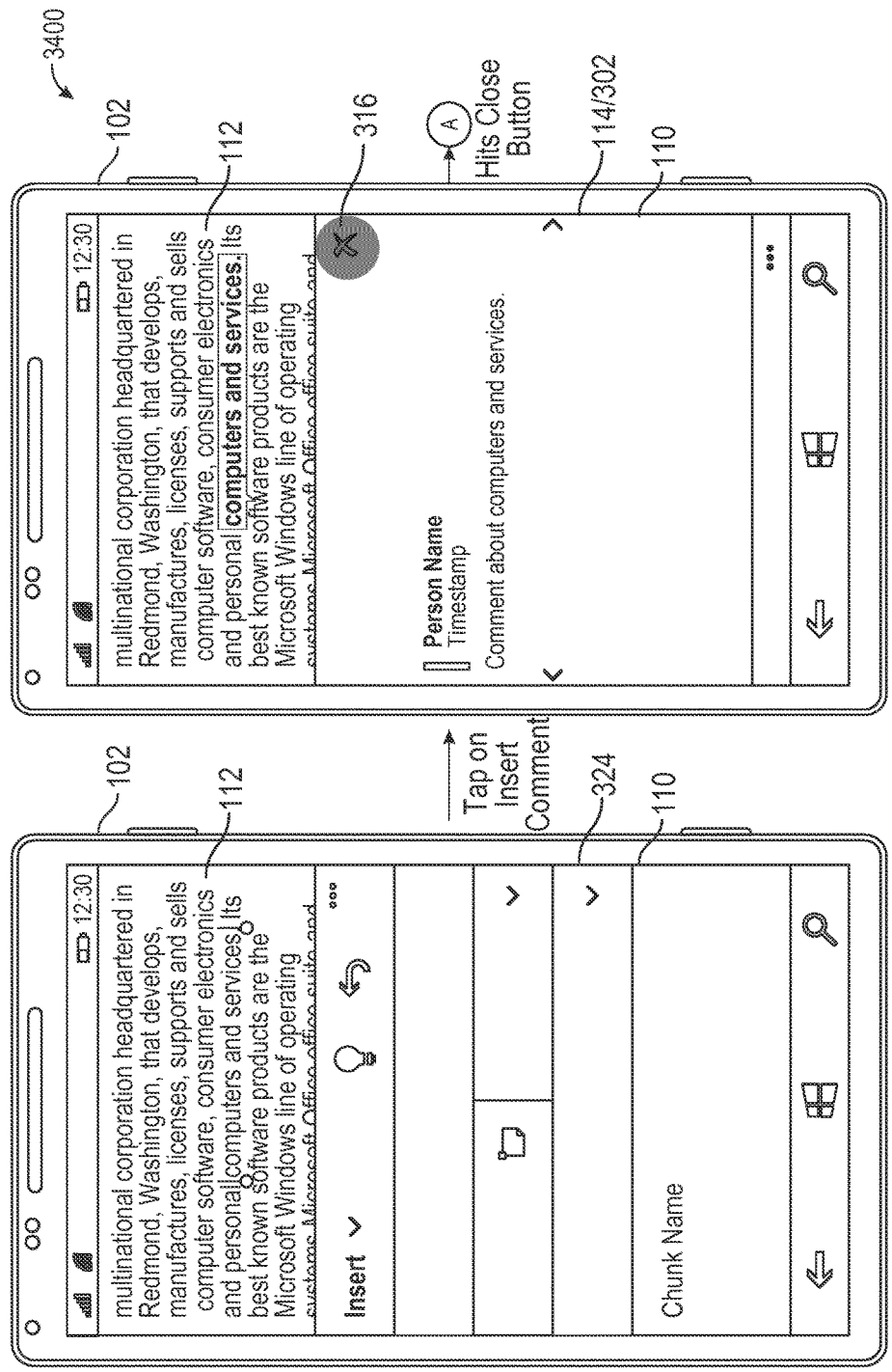

ADAPTIVE USER INTERFACE PANE OBJECTS

CROSS-REFERENCE TO RELATED APPLICATIONS

This application claims the benefit of U.S. Provisional Patent Application No. 62/105,775, titled "Adaptive User Interface Pane Objects" filed Jan. 21, 2015.

BACKGROUND

Users are increasingly using small form factor computing devices, for example, mobile phones, for various computing applications. Small form factor computing devices typically have a screen or display size that is a fraction of the screen size of larger form factor devices, for example, tablet computing devices, laptops, desktop computers, etc. Many user interfaces employ panes to expose application functionality and information to users. Panes are often dedicated to a specific feature or function of an application. When a user performs a task utilizing a feature or function supported by a pane, the pane is added to the user interface. In the user interface, the panes share space with the application canvas, which holds the primary application content. While useful, panes reduce the amount of space available for the application canvas. User interfaces that are designed for larger form factor devices may comprise panes that can dominate the user interface on a small form factor computing device.

BRIEF SUMMARY

This summary is provided to introduce a selection of concepts in a simplified form that are further described below in the Detailed Description section. This summary is not intended to identify key features or essential features, nor is it intended to be used as an aid in determining the scope of the claimed subject matter.

Aspects of a system for automatically managing panes in a user interface on a small form factor computing device include a computing device having at least a processing device, a memory, and a display. The system determines when an event that affects pane management occurs, such as selecting a feature or function supported by a pane, reorienting the display, or closing of a pane. After managing a pane display, the system resizes the canvas and reflows and/or zooms the content as appropriate for a small form factor computing device.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views:

FIG. 3A is a screenshot illustration of an example partial screen pane displayed in a word processing application user interface on a small form factor computing device;

FIG. 3B is a screenshot illustration of an example full screen pane with a keyboard overlay displayed in a word processing application user interface on a small form factor computing device;

FIG. 3C is a screenshot illustration of an example partial screen pane displayed in a spreadsheet application user interface on a small form factor computing device;

FIG. 3D is a screenshot illustration of an example full screen pane with a keyboard overlay displayed in a spreadsheet application user interface on a small form factor computing device;

FIG. 3G is a screenshot illustration of an example partial screen pane displayed in a spreadsheet application user interface on a small form factor computing device;

FIG. 3H is a screenshot illustration of an example partial screen pane displayed in a spreadsheet application user interface on a small form factor computing device, wherein a portion of the application chrome is pushed off the screen to provide maximal room for the application canvas and the pane;

FIG. 3M is an illustration of an example full screen pane with a keyboard overlay displayed on a small form factor computing device in portrait orientation;

FIG. 3N is an illustration of an example full screen pane with a keyboard overlay displayed on a small form factor computing device in portrait orientation;

FIG. 4 is a screenshot illustration of an example partial screen transient pane displayed on a small for factor computing device;

FIG. 5 is an illustration of an example partial screen persistent pane displayed on a small for factor computing device;

FIG. 8 is an illustration of an example pane close event via a selection of a cancel command in a persistent pane;

FIG. 9 is an illustration of an example pane close event via a selection of a commit command in a persistent pane;

FIG. 10 is an illustration of an example pane close event via a selection of a back or drill out command in a full screen persistent pane;

FIG. 11 is an illustration of an example pane close event via a selection of an operating system back command;

FIG. 12 is a table including various close pane event scenarios;

FIG. 13 is an illustration of a document list displayed in a task pane on a tablet computing device versus in a full screen pane on a small form factor computing device;

FIG. 17 is an illustration of the full screen pane of FIG. 16 with a keyboard overlay displayed on a small form factor computing device;

FIGS. 18A-C illustrate an example pane management sequence for an application running on a small form factor computing device;

FIGS. 19A-F illustrate another example pane management sequence for an application running on a small form factor computing device;

FIGS. 20A-D illustrate another example pane management sequence for an application running on a small form factor computing device;

FIGS. 21A-C illustrate another example pane management sequence for an application running on a small form factor computing device;

FIGS. 22A-E illustrate another example pane management sequence for an application running on a small form factor computing device;

FIGS. 23A-F illustrate another example pane management sequence for an application running on a small form factor computing device;

FIGS. 24A-F illustrate another example pane management sequence for an application running on a small form factor computing device;

FIGS. 25A-F illustrate another example pane management sequence for an application running on a small form factor computing device;

FIGS. 26A-C illustrate another example pane management sequence for an application running on a small form factor computing device;

FIGS. 27A-C illustrate another example pane management sequence for an application running on a small form factor computing device;

FIGS. 28A-C illustrate another example pane management sequence for an application running on a small form factor computing device;

FIGS. 29A-D illustrate another example pane management sequence for an application running on a small form factor computing device;

FIGS. 30A-C illustrate another example pane management sequence for an application running on a small form factor computing device;

FIGS. 33A-C illustrate another example pane management sequence for an application running on a small form factor computing device;

FIGS. 34A-C illustrate another example pane management sequence for an application running on a small form factor computing device;

DETAILED DESCRIPTION

Various aspects are described more fully below with reference to the accompanying drawings, which form a part hereof, and which show specific exemplary aspects. However, aspects may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Aspects of a system for automatically managing panes in a user interface on a small form factor computing device are described herein and illustrated in the accompanying figures. Aspects of the disclosure are described in terms of a traditional user interface layout merely to provide a standard frame of reference; however, the disclosure is not limited to traditional user interface layouts. As such, usage of a particular orientation (e.g., horizontal, vertical, landscape, portrait, etc.), direction (e.g., left, right, up down), position (e.g., top, bottom, side, above, below, front, back, etc.), and dimension (e.g., height, width, etc.) should not be construed as limiting to that particular orientation, direction, position, or dimension.

Figure 1:
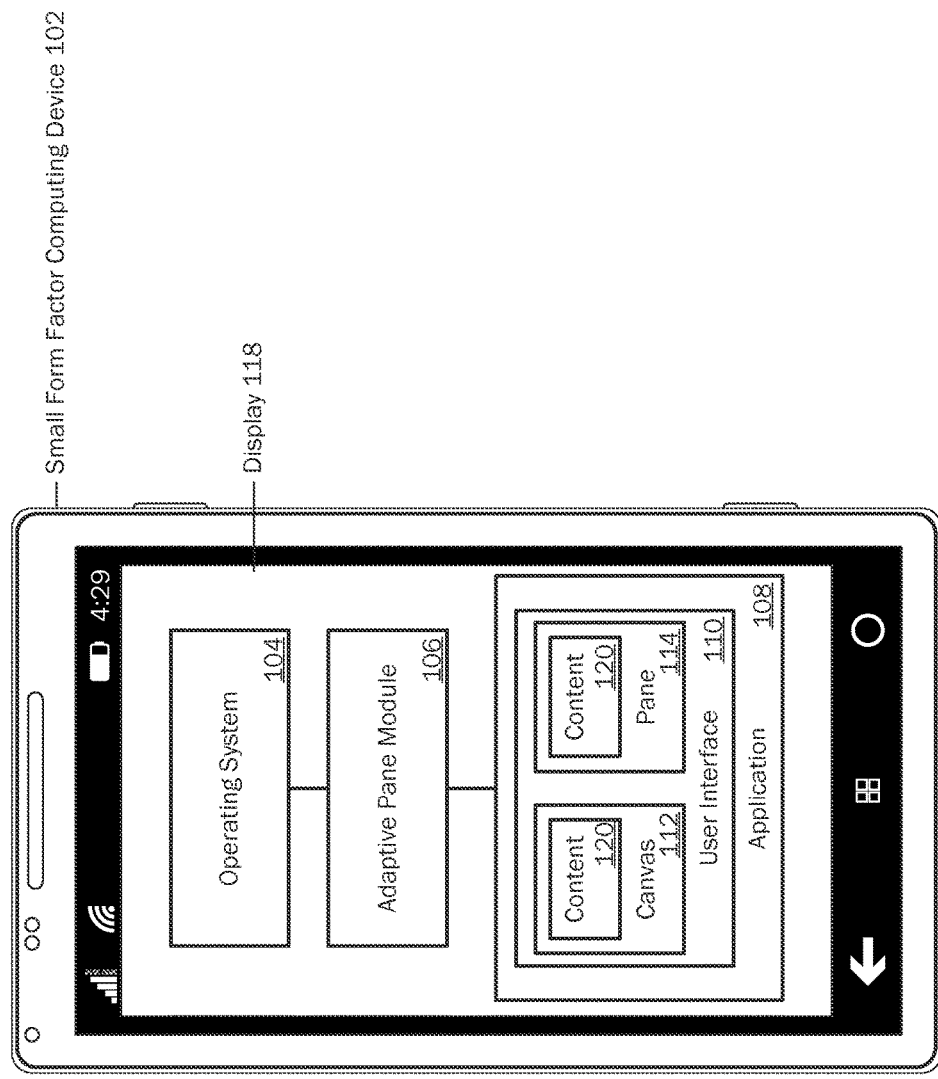
FIG. 1 is a block diagram illustrating a system for automatically managing panes in a user interface on a small form factor computing device.

FIG. 1 is a block diagram illustrating a system for automatically managing a pane in a user interface on a small form factor computing device 102. The system 100 includes an adaptive pane module 106 to manage the display of a pane 114 in a user interface 110 of an application 108 based on the display properties of the device being used (e.g., small form factor computing device 102 versus a tablet computing device, laptop computing device, desktop computing device, etc.), properties of the pane 114 (e.g., title, chrome, alignment type, entry behavior, width, etc.), and the current user interface properties (e.g., application user interface 110 size, canvas size, displayed keyboard, etc.). The adaptive pane module 106, user interface 110, and application 108 are executed on the small form factor computing device 102. The small form factor computing device 102 may be one of various types of computing devices (e.g., a mobile communication device, an entertainment appliance, a wearable device, or other type of small form factor computing device) for executing applications for performing a variety of tasks.

A user 116 utilizes the application 108 on the small form factor computing device 102 for a variety of tasks, for example, to write, calculate, draw, organize, prepare presentations, send and receive electronic mail, take and organize notes, make music, and the like. According to an aspect, applications 108 include thick client applications stored locally on the computing device. According to another aspect, applications 108 include thin client applications (i.e., web applications) that reside on a remote server and are accessible over a network, such as the Internet or an intranet. According to an aspect, a thin client application is hosted in a browser-controlled environment or coded in a browser-supported language and reliant on a common web browser to render the application 108 executable on the small form factor computing device 102. The small form factor computing device 102 is configured to receive content for presentation on a display 118. According to an aspect, the display is a touch screen display.

The application 108 is configured to enable a user 116 to use a pointing device (e.g., a pen/stylus, etc.) and/or to utilize sensors (e.g., touch sensor, gesture sensor, accelerometer, gyroscope, tilt sensor, etc.) on the small form factor computing device 102 to interact with content 120 via a number of input modes. According to an aspect, content 120 is displayed on an application canvas 112. According to another aspect, content 120 is displayed in a selectively displayable pane 114. According to another aspect, a plurality of selectable functionality controls and elements are displayed in a selectively displayable pane 114. The adaptive pane module 106 automatically controls the display of a pane 114 to provide a user interface that is visually and functionally optimized for a small form factor computing device 102.

According to aspects, automatically managing panes 114 increases computational efficiency and decreases an amount of time it takes to complete various tasks by providing a visually and functionally optimized user interface 110 for a small form factor computing device 102. Further, computing resources are conserved by reducing a number of inputs that must be processed to perform tasks such as manually managing panes 114.

Figure 2:
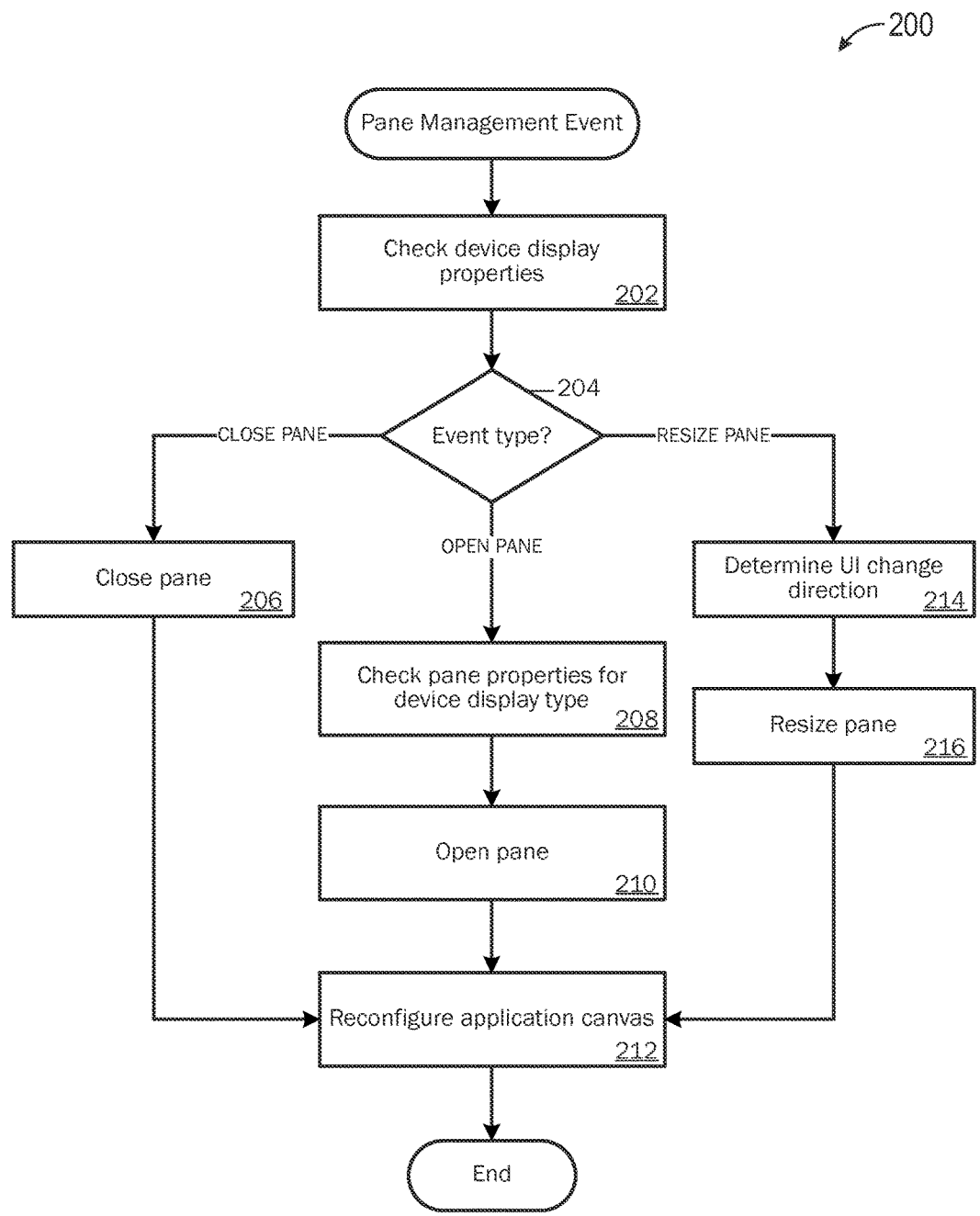
FIG. 2 is a flow chart showing general stages involved in an example method for automatically managing a pane in a user interface on a small form factor computing device.

FIG. 2 is a flow chart showing general stages involved in an example method 200 for automatically managing a pane in a user interface on a small form factor computing device 102. The method 200 begins with an event that affects pane management, such as opening or closing a pane 114, changing the orientation of the small form factor computing device 102, or other event. For example, selection of a functionality displayed in a document or in a user interface (UI) element triggers an open pane event. When such an event occurs, a size check operation 202 collects information about the screen size of the device 102. For example, the operating system 104 measures the size of the display 118, and provides information to the adaptive pane module 106 indicating the size of the display 118 and that the device is a small form factor computing device 102. In some examples, an application user interface 110 size (e.g., a size of an area available to the application UI 110) is identified and provided to the adaptive pane module 106. According to an aspect, in some examples, the size of the application user interface 110 is equal to the size of the display 118. In other examples, operating system UI elements (e.g., a back button, search button, home button, system tray, etc.) take up a portion of the display 118, and thus reduce the size of the application user interface 110. According to an aspect, the application 108 provides information to the adaptive pane module 106 indicating a protected canvas size specifying an application-specific minimum canvas size to ensure that a meaningful amount of user content remains visible. For example, if a call is made to open a specific pane 114, and the pane properties for the specific pane 114 govern that the specific pane 114 is to be displayed as a partial screen pane (i.e., covers a portion of the display 118), the size of the canvas 112 cannot be reduced below the protected canvas size. According to an aspect, the protected canvas size is specified in a single dimension (e.g., height). For example, a protected canvas height is specified to protect against encroachment by a partial screen pane 114.

The method 200 continues with a response that depends, at least in part, upon the type of event that occurs. A decision operation 204 determines the type of event that occurred (e.g., open pane, close pane, resize pane). If opening of a pane 114 is requested, a pane property check operation 208 runs through the user interface properties (e.g., whether a keyboard is to be displayed, etc.), pane properties (e.g., alignment type, entry behavior, title, chrome, and width), and pane contents.

Alignment type specifies whether a pane 114 is intended to be full screen or partial screen. According to an example, a partial screen pane is aligned to the bottom of the display 118. According to an aspect, with a small form factor computing device 102, the intent is to not subdivide the limited screen space unless it is beneficial to the user 116, for example, in instances where it is beneficial for the user 116 to see or access content 120 in the canvas 112 while the pane 114 is displayed.

Entry behavior specifies whether a pane 114 is intended to be persistent or transient. A persistent (i.e., sticky) pane is intended to coexist with the canvas 112 and is docked in the user interface 110. A persistent pane remains until manually dismissed by the user 116 (e.g., using a close widget or a commit/dismiss command) or programmatically closed by the application 108. A transient pane exists above the canvas 112. A transient (i.e., light dismiss or popover) pane remains until a selection is made, when the back button is used, or when the user 116 selects an area outside of the pane 114. According to an aspect, entry behavior influences treatment of the pane 114 by the adaptive pane module 106.

According to an aspect, a title property specifies whether a title bar for the pane 114 is displayed and the commands that are displayed in the title bar. For example, various pane header configurations are illustrated in FIGS. 3K-3Q.

According to another aspect, a chrome property specifies attributes of the application chrome (i.e., the visible graphical interface features of an application 108 including graphical elements that may be used to interact with the application). For example the chrome property may specify a size of a document title, which commands are displayed in the chrome (e.g., close command, back button, expand/collapse widget, etc.), padding, and whether a portion of the application chrome is moved off the user interface 110 to maximize space in the user interface 110 for the pane 114 and the canvas 112.

According to another aspect, a width property specifies for the pane 114 to adapt to the width of the application user interface 110. The pane property check operation 208 includes a determination of whether the new pane 114 may be added while preserving the protected canvas size. For example if the protected canvas size cannot be preserved, the new pane 114 may be opened as a full-screen pane.

Continuing with the method 200, an open pane operation 210 opens the new pane 114 as either a full screen pane or a partial screen pane according to the pane properties (e.g., alignment type, entry behavior, title, chrome, and width). For example, if the pane 114 is a partial screen pane, the partial screen pane is opened as either a persistent pane or a transient pane according to the entry behavior pane property. A canvas reconfiguration operation 212 resizes the canvas and reflows and/or zooms the content 120 as appropriate.

Figure 7:
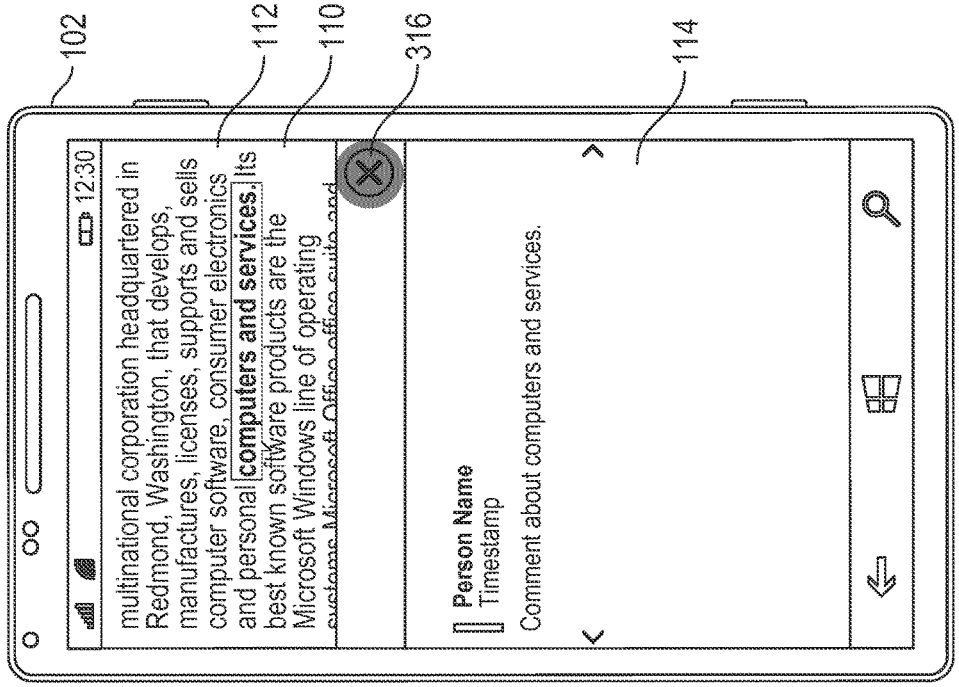
FIG. 7 is an illustration of an example pane close event via a selection of a close command in a persistent pane.
Figure 6:
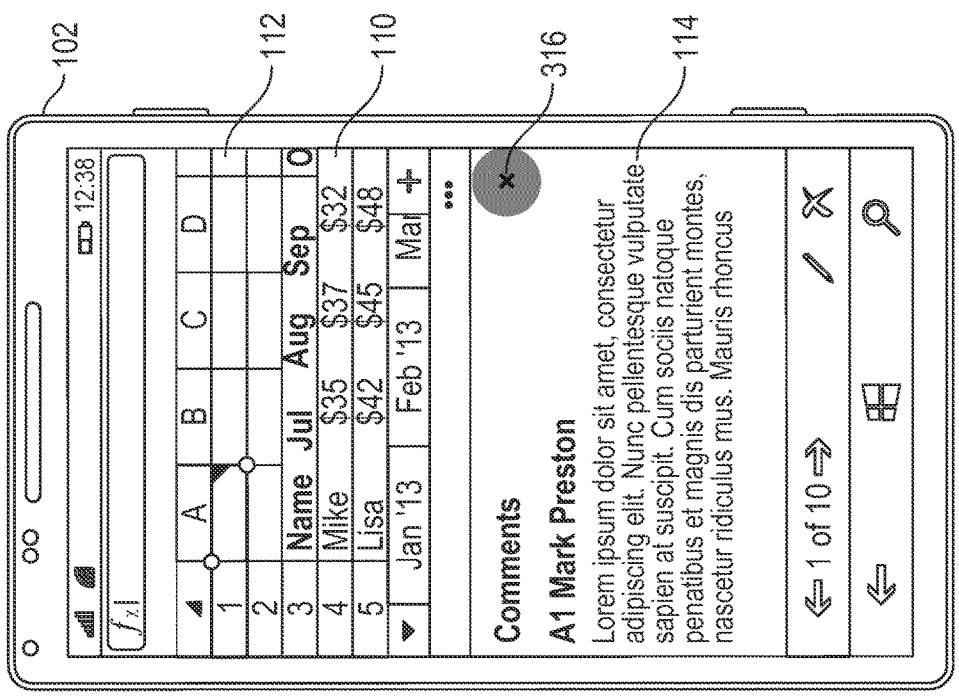
FIG. 6 is an illustration of an example pane close event via a selection of a close command in a persistent pane.

Returning to the event type decision 204, if a close pane event occurs, a close pane operation 206 closes the pane 114 freeing up space in the user interface 110. A close pane event occurs in response to an input from the user 116 or from the system. For example, a close event may occur when a user 116 selects a close command 316 pane property check operation 208, for example, as illustrated in FIGS. 6 and 7. According to another example, a close pane event occurs when a user 116 selects a cancel command 314, for example, as illustrated in FIG. 8. According to another example, a close pane event occurs when a user 116 selects a commit command 312, for example, as illustrated in FIG. 9. According to another example, a close pane event occurs when a user 116 selects a back/drill-out command 1002, for example, as illustrated in FIG. 10. According to another example, a close pane event occurs when a user 116 selects an operating system back command 1102, for example, as illustrated in FIG. 11. According to another example, a close pane event occurs when a user 116 selects in an area outside of a transient pane. According to another example, a close pane event occurs when the application 108 programmatically closes the pane 114. The method 200 continues to the canvas reconfiguration operation 212, and resizes the canvas 112 and reflows and/or zooms the content 120 as appropriate.

A table 1200 is illustrated in FIG. 12, which describes various close pane event scenarios. For example, in a pane 114 comprising text entry or multiple selections and where a second action is needed to complete a flow, a commit command 312 (e.g., "done" command, "insert" command, etc.) and a cancel command 314 is provided, such as in FIG. 8. Accordingly, the user 116 is enabled to either save or discard changes. As another example, in a pane 114 comprising text entry where a user 116 needs to navigate after making changes (e.g., entering a comment), only a commit command 312 may be displayed, such as in FIG. 9. As another example, in a pane 114 that includes insta-commit changes, such as settings selections, where the user 116 needs to navigate after making changes, a back/drill-out command 1002 may be displayed, for example, as illustrated in FIG. 10. As another example, in persistent pane 114, which may be a partial-screen pane or a full-screen pane, a close command 316 may be provided, such as in FIGS. 6 and 7.

Continuing with the method 200 illustrated in FIG. 2, after the close pane operation 206, a canvas reconfiguration operation 212 resizes the canvas and reflows and/or zooms the content 120 as appropriate.

Returning to the event type decision 204, if a user interface size change event occurs, the method 200 continues to a UI size change direction determination 214. A user interface size change event can occur independently of opening or closing a pane 114. According to an aspect, a user interface size change event is caused by reconfiguration of the display 118 (e.g., changing the orientation of the display 118). During the user interface size change direction determination, the adaptive pane module 106 determines whether the small form factor computing device 102 has been repositioned from a portrait orientation to a landscape orientation, or from a landscape orientation to a portrait orientation. The method 200 advances to a resize pane operation 216, where a currently displayed pane 114 is resized according to the user interface size change event. According to an aspect, the pane 114 adapts to the width of the application user interface 110. The pane 114 is displayed as either a full screen pane or a partial screen pane according to the pane properties. If the pane 114 is a partial screen pane, the partial screen pane is opened as either a persistent pane or a transient pane according to the pane properties. In some examples, sizing the pane 114 comprises maintaining a minimum size of the pane 114 by limiting the number of persistent panes to one persistent pane that can be displayed in the application user interface 110 at a time, wherein the size of the pane is a percentage of the size of the display 118.

The method 200 continues to a canvas reconfiguration operation 212, where the adaptive pane module 106 resizes the canvas 112 and reflows and/or zooms the content 120 as appropriate. An example of a user interface size change event is illustrated in FIG. 3J.

Figure 3E:
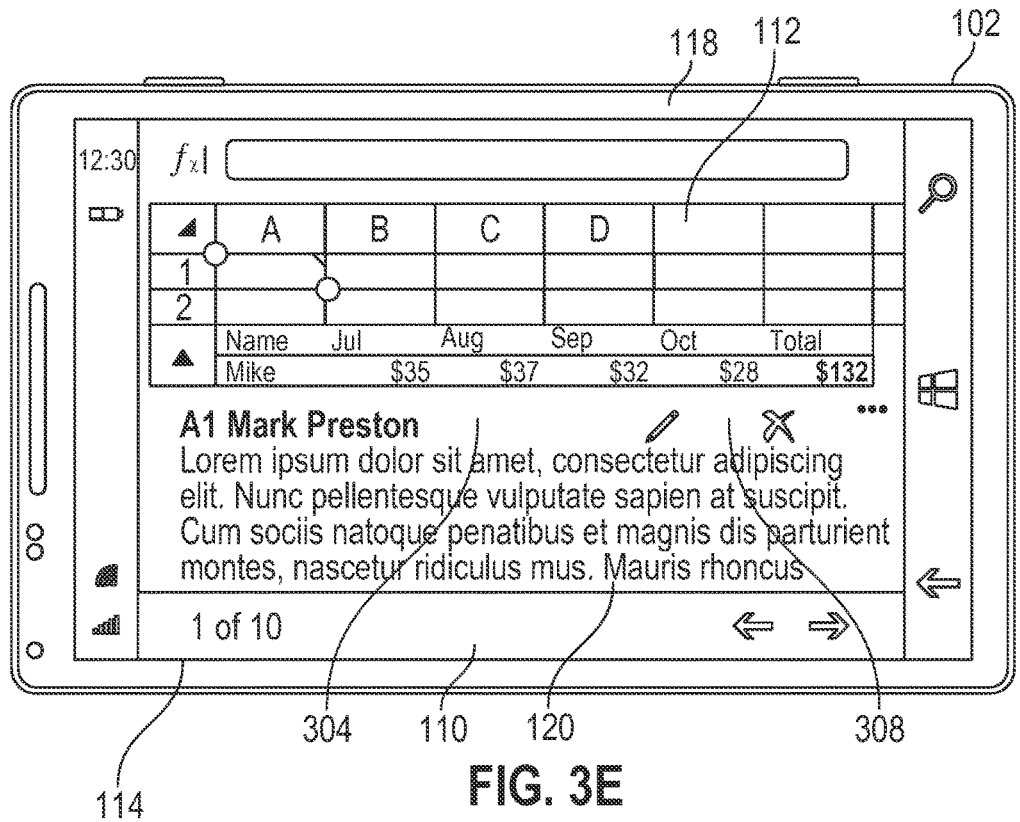
FIG. 3E is a screenshot illustration of an example partial screen pane displayed in a spreadsheet application user interface on a small form factor computing device in a landscape orientation.
Figure 3F:
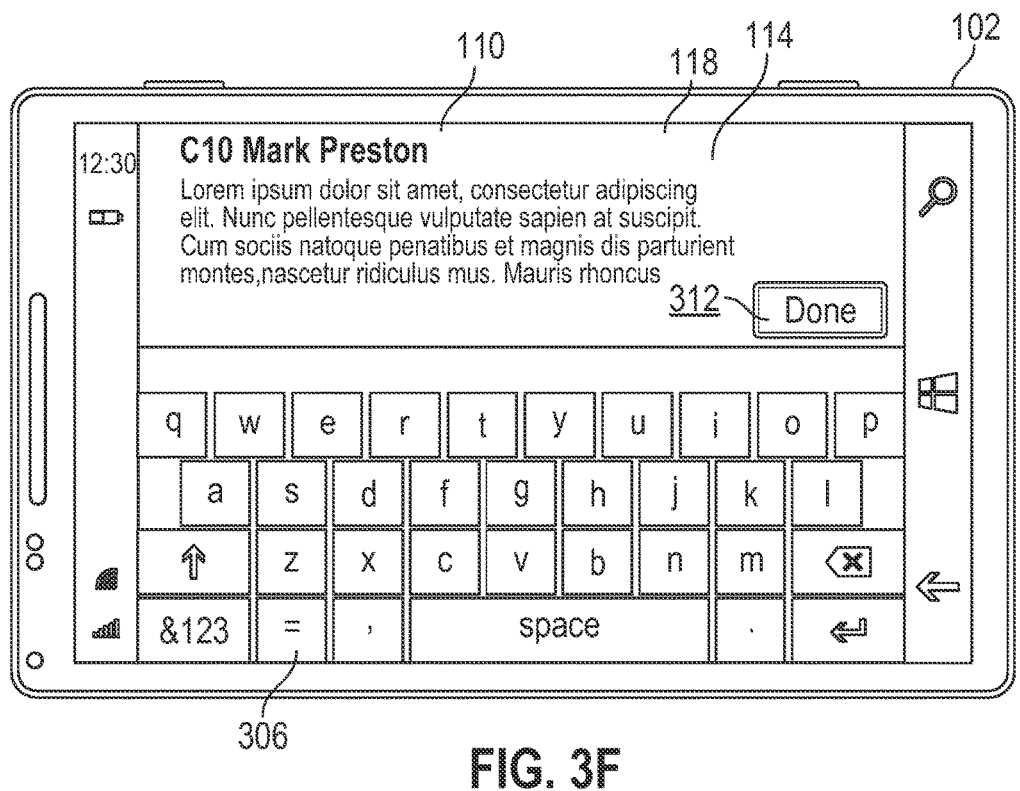
FIG. 3F is a screenshot illustration of an example full screen pane with a keyboard overlay displayed in a spreadsheet application user interface on a small form factor computing device in a landscape orientation.
Figure 3I:
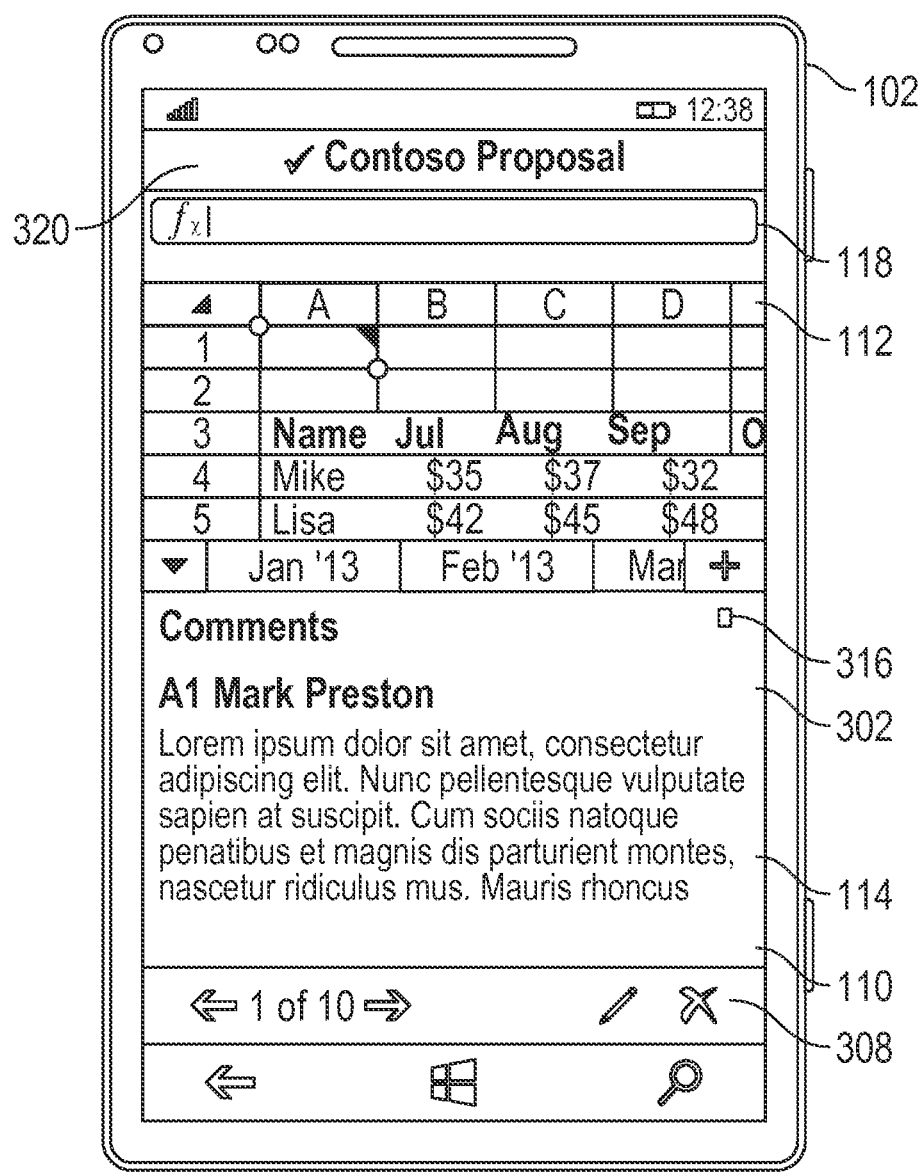
FIG. 3I is a screenshot illustration of an example partial screen pane displayed in a spreadsheet application user interface on a small form factor computing device.
Figure 3J:
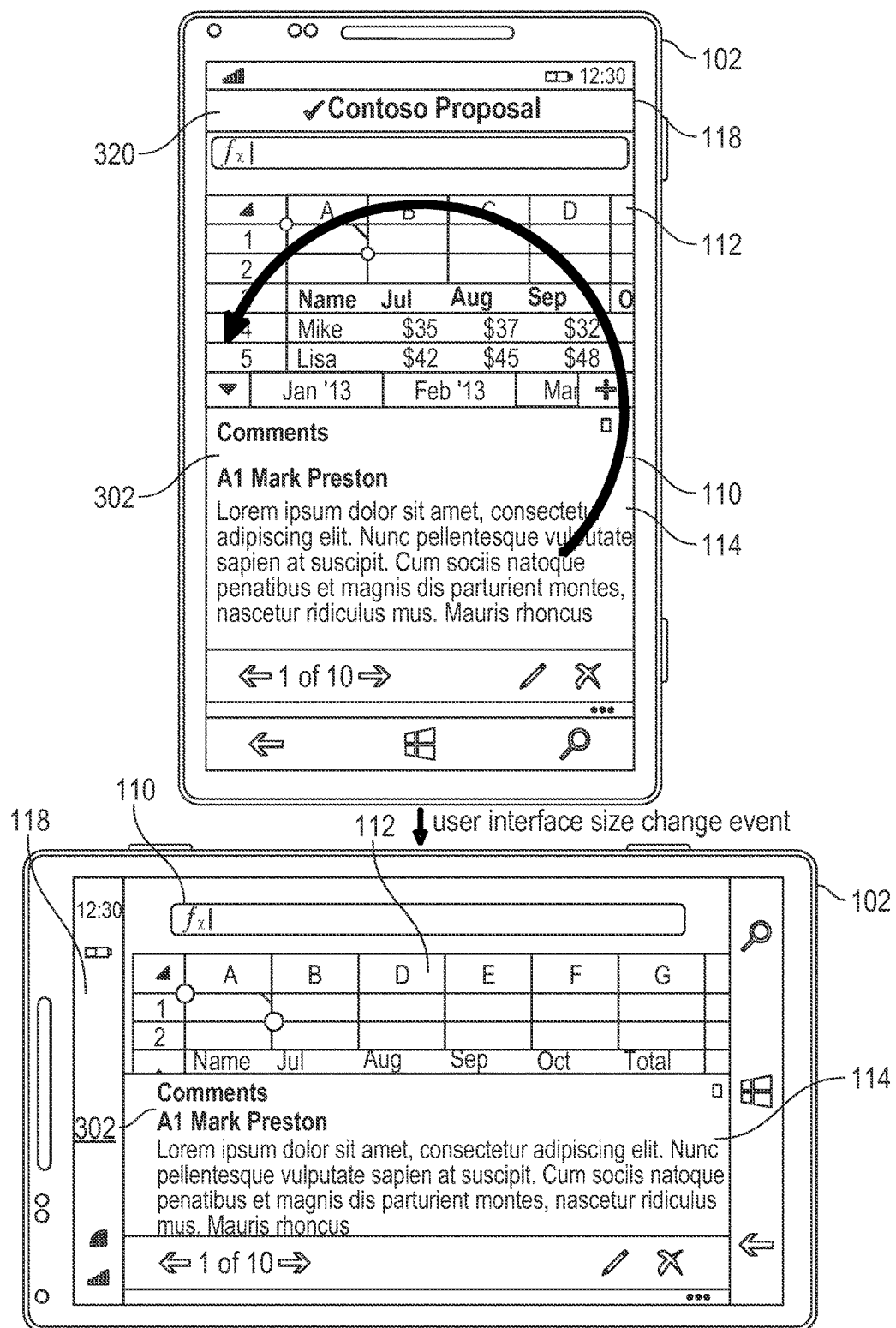
FIG. 3J is a screenshot illustration of an example partial screen pane displayed on a spreadsheet application user interface on a small form factor computing device prior to a user interface size change event (in a portrait orientation) and after the user interface size change event (in a landscape orientation)

Referring now to FIGS. 3A-3J, various screenshot illustrations of example panes 114 displayed in a user interface 110 on a small form factor computing device 102 are provided. According to an aspect and as illustrated in FIG. 3A, in response to a pane management event, in this example, an open pane event, the adaptive pane module 106 updates the application user interface 110 to display a pane 114 sized in accordance with the small form factor computing device 102 and a document (content 120) displayed in the canvas 112 sized in accordance with the small form factor computing device 102. For example, the open pane event is triggered by a selection of a content item (e.g., an indication of a feature or function) associated with the pane 114. In the illustrated example, the open pane event is caused by a selection of a text in the document displayed in the canvas 112, wherein the selection is associated with a comment. According to an aspect, the pane 114 includes content 120 and functionality for interaction therewith. In the illustrated example, the content 120 includes the comment associated with the selected text. As mentioned above, the adaptive pane module 106 updates the application user interface 110 to display the document (content 120) in the canvas 112 sized in accordance with the small form factor computing device 102. For example, the canvas 112 is resized to coexist with the pane 114 while maintaining the protected canvas size to provide contextual information relating to the content and functionality displayed in the pane 114. The pane 114 is sized to coexist with the canvas 112, for example, as a partial screen pane 302 aligned to the bottom portion of the user interface 110.

Additionally, the adaptive pane module 106 updates the application user interface 110 to display a pane header 304 comprising a plurality of quick commands 308 for functionalities associated with the pane 114 and displayed along the top edge of the pane 114. According to an aspect, the adaptive pane module 106 updates the application user interface 110 to display a palette hint command 318. Selection of a palette hint command 318 triggers an open pane event, where the adaptive pane module 106 updates the application user interface 110 to display a palette pane 324 (which are described below and are illustrated in FIGS. 21A, 21C, 22A, 22E, 23A-E, 24A-E, 25A-E, 26A-C, and 27C). In displaying a palette pane 324, the adaptive pane module 106 sizes the palette pane 324 in accordance with a small form factor computing device 102 and includes a display of palette items that may be selected by a user 116 to add a functionality, capability, or element to a document (i.e., content 120) displayed in a canvas 112. According to an aspect, a palette pane 324 may include one or more palette pane selection items, which when selected by a user 116, cause a display of a lower level or child palette pane 324 in a hierarchy of palette panes 324. A palette pane 324 may include only palette items, only palette pane selection items, or a combination of palette items and palette pane selection items.

According to an aspect and as illustrated in FIG. 3A, the adaptive pane module 106 includes functionality to eject a portion of the application chrome off the screen, for example, the application header 320, to provide maximal room for the application canvas 112 and the partial screen pane 302. According to an example, if a pane 114 is a persistent partial screen pane, the adaptive pane module 106 updates the application user interface 110 to resize the canvas 112 and eject the application header 320; if a pane 114 is a persistent full screen pane, the adaptive pane module 106 updates the application user interface 110 to cover the canvas 112 and the application header 320 with the full screen pane; and if a pane 114 is a transient partial screen pane, the adaptive pane module 106 updates the application user interface 110 to cover a bottom portion of the canvas with the partial screen pane 302, wherein the application header 320 remains displayed in the application user interface 110.

As illustrated in FIG. 3B, in response to a pane management event, in this example, an open pane event triggered by a selection of a content item relating to a functionality associated with the pane 114, the adaptive pane module 106 updates the application user interface 110 to display a pane 114 sized in accordance with the small form factor computing device 102. In the illustrated example, a user 116 selects to edit the comment displayed in the pane 114 illustrated in FIG. 3A, and the application user interface 110 is updated to display a full screen pane 310 with a keyboard 306 overlaying a portion of the pane enabling the user 116 to edit the comment. According to an aspect, the full screen pane 310 covers the canvas 112. As illustrated, the adaptive pane module 106 updates the application user interface 110 to display a pane header 304 comprising functionalities associated with the pane 114, for example, a commit command 312 and a cancel command 314.

The examples illustrated in FIGS. 3A and 3B include word processing application user interfaces 110. The examples illustrated in FIGS. 3C-3J include spreadsheet application user interfaces 110. As illustrated in FIG. 3C, in response to a pane management event, in this example, an open pane even triggered by a selection to view a comment associated with an element in the user interface (e.g., via a selection of a content item associated with a pane 114), the adaptive pane module 106 updates the application user interface 110 to display a pane 114 sized in accordance with the small form factor computing device 102, the pane 114 displaying content 120 (e.g., the comment) and functionalities (e.g., quick commands 308) for interaction therewith. In the illustrated example, the opened pane 114 is a partial screen pane 302 aligned to the bottom portion of the user interface 110 displayed in a portrait orientation. In updating the application user interface 110 to display the pane 114, the adaptive pane module 106 additionally resizes and reflows the canvas 112 to coexist with the pane 114 while maintaining the protected canvas size. Accordingly, the user interface 110 includes a display of contextual information relating to functional information displayed in the pane 114 (e.g., a portion of a spreadsheet including the element in the spreadsheet associated with the comment displayed in the pane 114). As illustrated, the application header 320 remains displayed along the top of the canvas 112. Additionally, the adaptive pane module 106 updates the application user interface 110 to display the pane header 304 comprising a plurality of quick commands 308 for functionalities associated with the comments pane 302.

As illustrated in FIG. 3D, in response to a pane management event, in this example, an open pane event triggered by a selection to interact with a functionality associated with the pane 114 (e.g., a user 116 selecting to edit the comment displayed in the pane 114 illustrated in FIG. 3C), the adaptive pane module 106 updates the application user interface 110 to display a pane 114 sized in accordance with the small form factor computing device 102. In the illustrated example, the application user interface 110 is updated to display a full screen pane 310 with a keyboard 306 overlaying a portion of the pane enabling the user 116 to edit the comment. According to an aspect, the full screen pane 310 covers the canvas 112. Additionally, a commit command 312 is displayed in the pane 114, which when selected, triggers a pane management event (i.e., a pane close event).

The examples illustrated in FIGS. 3E and 3F show the application user interface 110 displayed in a landscape orientation sized in accordance with the small form factor computing device 102. With reference now to FIG. 3E, in response to a pane management event, in this example, a pane open event triggered by a selection to view a comment associated with an element in the user interface, the adaptive pane module 106 updates the application user interface 110 to display a pane 114 sized in accordance with the small form factor computing device 102, the pane 114 displaying content 120 (e.g., the comment) and functionalities (e.g., quick commands 308) for interaction therewith. Like the example application user interfaces 110 displayed in a portrait orientation illustrated in FIGS. 3A-3D and described above, when the small form factor computing device 102 is in a landscape orientation, the user interface 110, including the pane 114 and the canvas 112, adapts to the width of the display 118. Additionally, the canvas 112 maintains a protected canvas size, and the pane 114 is a partial screen pane 302 aligned to the bottom portion of the user interface 110 and includes a pane header 304 comprising one or more quick commands 308 for functionalities associated with the pane 114. In the illustrated example, the application header 320 is pushed off the user interface 110 to provide maximal room for the application canvas 112 and the pane 114.

The example illustrated in FIG. 3F is similar to the example illustrated in FIG. 3D except oriented in a landscape orientation. In response to a pane management event, in this example, an open pane event triggered by a selection to interact with a functionality associated with the pane 114 (e.g., a user 116 selecting to edit the comment displayed in the pane 114 illustrated in FIG. 3E), the adaptive pane module 106 updates the application user interface 110 to display a pane 114 sized in accordance with the small form factor computing device 102. As described above with respect to FIG. 3E, when the small form factor computing device 102 is oriented in a landscape orientation, the adaptive pane module 106 updates the application user interface 110 to adapt to the width of the application user interface 110 in the display 118, the application user interface 110 including a full screen pane 310 covering the canvas 112 and a keyboard 306 overlaying a portion of the pane enabling the user 116 to edit the comment. Additionally, a commit command 312 is displayed in the pane 114, which when selected, causes a pane management event (i.e., a pane close event).

FIGS. 3G, 3H, and 3I include three examples of user interface 110 configurations generated by the adaptive pane module 106. In response to a pane management event (e.g., an open pane event), the adaptive pane module 106 updates the application user interface 110 to display the pane 114 sized in accordance with the small form factor computing device 102, the pane 114 displaying content 120 (e.g., a comment) and functionality for interacting with the content 120, and a canvas 112 displaying content 120 (e.g., a portion of a document) relating to the content displayed in the pane 114. The canvas 112 is sized in accordance with the small form factor computing device 102 and maintains a protected canvas size. In the examples illustrated in FIGS. 3G-3I, functionalities, such as quick commands 308, are displayed in an area along the bottom portion of the pane 114. In the examples illustrated in FIGS. 3G and 3I, the application header 320 is displayed in the canvas 112 and aligned to the top portion of the application 108. In FIG. 3H, the application header 320 is pushed off the screen to provide maximal room for the application canvas 112 and the pane 114.

As illustrated in FIG. 3J, in response to a user interface size change event triggered by changing the orientation of the small form factor computing device 102, the adaptive pane module 106 updates the application user interface 110 to display the canvas 112 and the pane 114 sized in accordance with the small form factor computing device 102 and adapted to the width of the application user interface 110 in the display 118. According to an aspect and as illustrated, in updating the application user interface 110 in response to the size change event, the adaptive pane module 106 ejects the application header 320 from the display 118 to maintain the protected canvas size while displaying the pane 114.

Figures 3K, 3L:
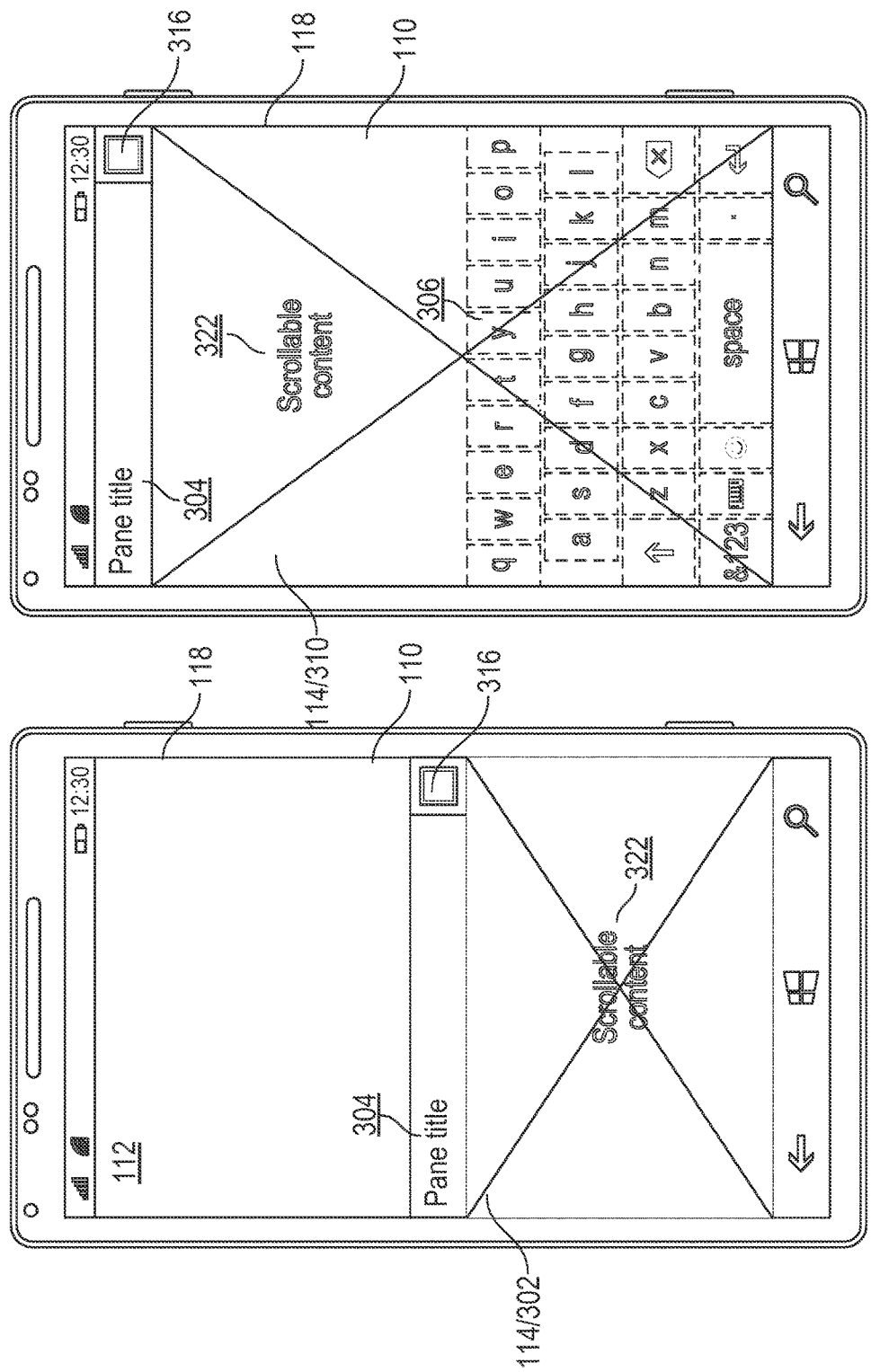
FIG. 3K is an illustration of an example partial screen pane displayed on a small form factor computing device in portrait orientation.
FIG. 3L is an illustration of an example full screen pane with a keyboard overlay displayed on a small form factor computing device in portrait orientation.

FIGS. 3K-3Q are illustrations of various examples of application user interfaces configurations. FIGS. 3K-3O show various example configurations of panes 114 sized in accordance with the small form factor computing device 102 in a portrait orientation. For example, the example illustrated in FIG. 3K shows a partial screen pane 302 coexisting with a canvas 112. The partial screen pane 302 is a persistent pane aligned to the bottom of the application user interface 110 and includes scrollable content 322 and a pane header 304 aligned to the top of the pane 114 and including a close command 316. The example illustrated in FIG. 3L shows a full screen pane 310 with a keyboard 306 overlay. The pane 114 includes a pane header 304 including a close command 316. The example illustrated in FIG. 3M shows a full screen pane 310 with a keyboard 306 overlay. The pane 114 includes a pane header 304 including a plurality of functionality commands, for example, a commit command 312 and a cancel command 314, similar to the example illustrated in FIG. 8.

Figure 3O:
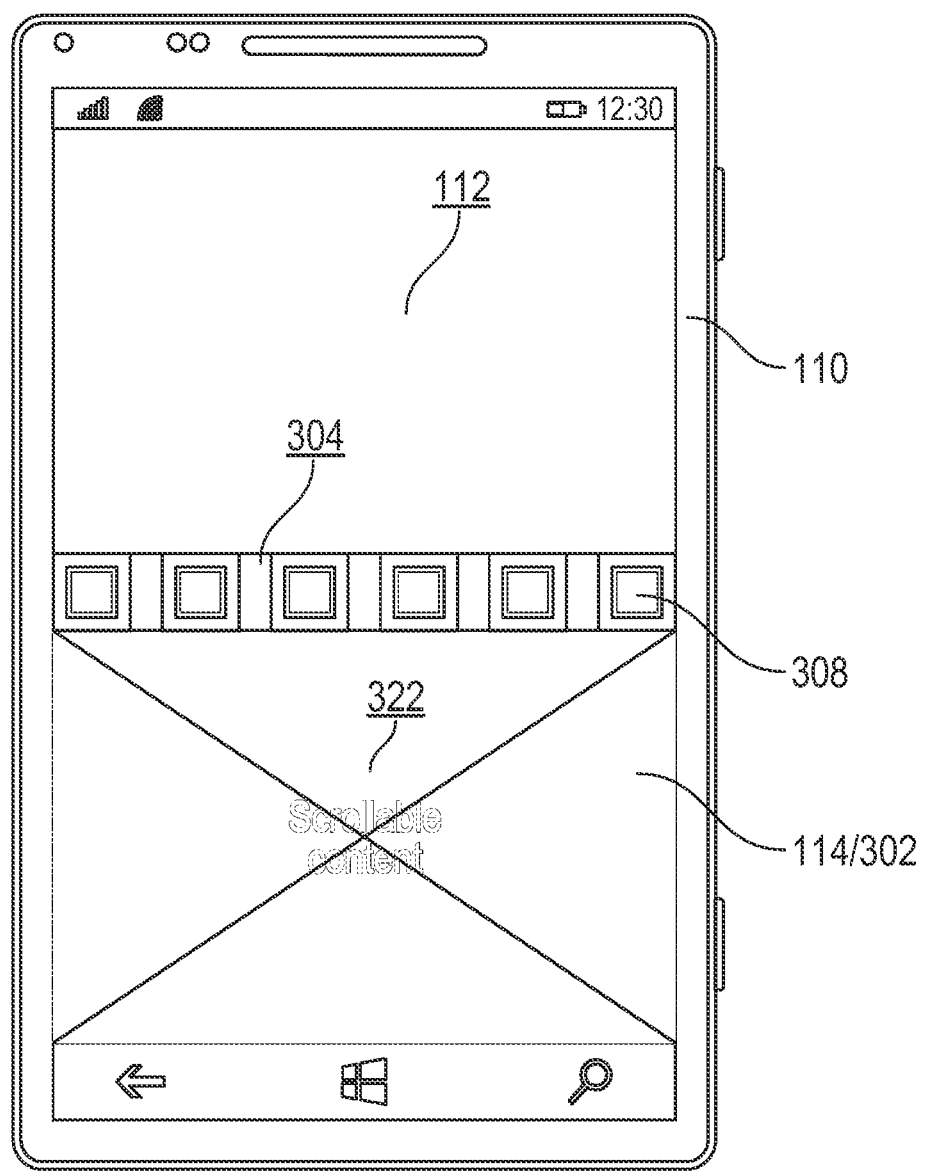
FIG. 3O is an illustration of an example partial screen pane displayed on a small form factor computing device in portrait orientation, wherein a plurality of quick commands are displayed in pane header.
Figure 3P:
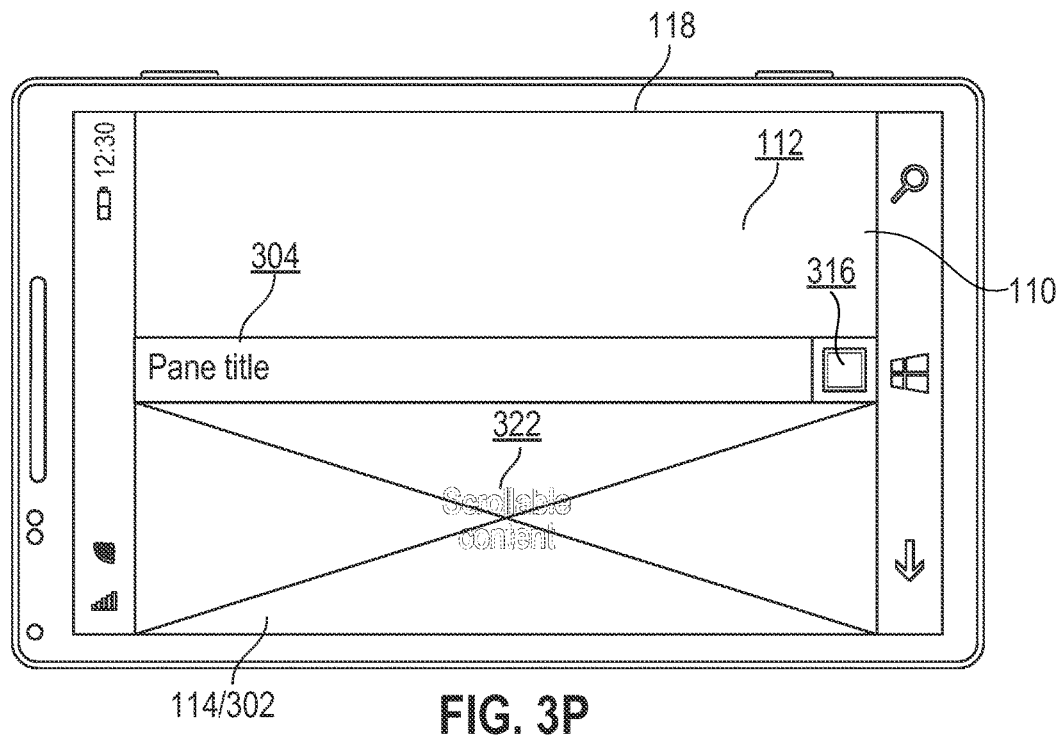
FIG. 3P is an illustration of an example partial screen pane displayed on a small form factor computing device in landscape orientation.
Figure 3Q:
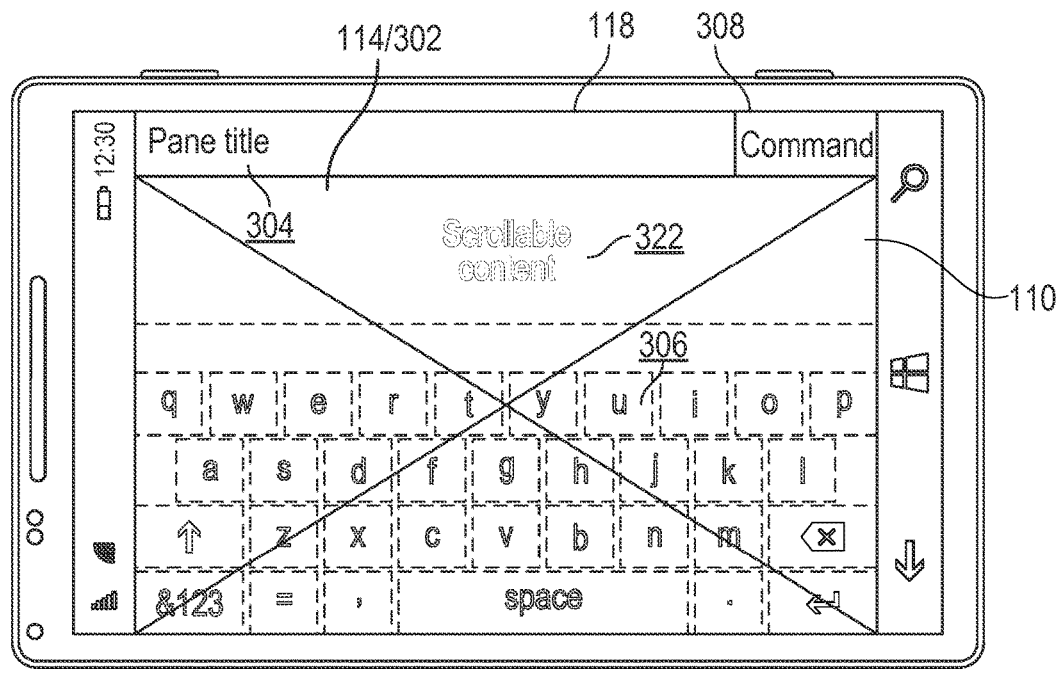
FIG. 3Q is an illustration of an example full screen pane with a keyboard overlay displayed on a small form factor computing device in landscape orientation.

The example illustrated in FIG. 3N shows a full screen pane 310 with a keyboard 306 overlay. The pane 114 includes a pane header 304 including a functionality command, for example, a commit command 312, similar to the example illustrated in FIG. 9. The example configuration illustrated in FIG. 3O shows a partial screen pane 302 including a pane header 304 comprising a plurality of quick commands 308 for functionalities associated with the pane. For example, the pane 114 may be a transient pane covering a portion of the canvas 112 until the pane is dismissed, similar to the example illustrated in FIG. 4. FIGS. 3P-3Q show various example configurations of panes 114 sized in accordance with the small form factor computing device 102 in a portrait orientation. According to an aspect, the canvas 112 and the pane 114 adapt to the width of the application user interface 110 in the display 118, and the contents 120 of the pane 114 and the canvas 112 reflow based on the rotation of the device 102. In FIG. 3P, the canvas 112 maintains a protected canvas size.

With reference now to FIG. 4, a screenshot illustration of an example application user interface 110 updated by the adaptive pane module 106 to display a partial screen pane 302 covering a portion of a canvas 112 is shown. According to an aspect, the pane 114 is displayed as a transient (i.e., light dismiss or popover) pane. In some examples, a transient pane remains displayed until a selection is made (e.g., a selection of an "explore" command 404 or a "define" command 406), when a back button is used, or when the user 116 selects an area outside of the pane 114. In other examples, a transient pane remains displayed after a selection is made. For example, in response to a selection made by a user 116 to view insights relating to content 120 displayed in the canvas 112, the adaptive pane module 106 updates the application user interface 110 to display a pane 114 sized in accordance with the small form factor computing device 102, the pane comprising content 120 relating to content displayed in the canvas 112 and functionality for interacting with the content 120. According to an aspect, the transient pane 114 is aligned to the bottom portion of the application user interface 110.

With reference now to FIG. 5, an example application user interface 110 comprising a canvas 112 and a pane 114 is illustrated. In the illustrated example, the pane 114 is a callout pane displayed as a partial screen pane 302 and sized in accordance with the small form factor computing device 102. According to an aspect, the adaptive pane module 106 updates the user interface 110 to display the callout pane 302 as a persistent pane that remains displayed until manually dismissed by a user 116 (e.g., using the close command 316 or a commit/dismiss command) or programmatically closed by the application 108. According to an example, a callout pane may include a gallery of selectable functionalities that can be applied to content 120 in the canvas 112.

FIGS. 6-11 illustrate various examples of how a pane close event can be invoked. For example, FIG. 6 is an example of a pane close event triggered via a selection of a close command 316 in a persistent pane 114 (e.g., a view comments pane) displayed in a spreadsheet application user interface 110; FIG. 7 is an example of a pane close event triggered via a selection of a close command 316 in a persistent pane 114 (e.g., a view comments pane) displayed in a word processing application user interface 110; FIG. 8 is an example of a pane close event triggered via a selection of a cancel command 314 in a full screen pane 310 (e.g., a hyperlink pane) with a keyboard 306 overlay; FIG. 9 is an example of a pane close event triggered via a selection of a commit command 312 in a full screen pane 310 (e.g., an edit comments pane) with a keyboard 306 overlay; FIG. 10 is an example of a pane close event triggered via a selection of a back or drill out command 1002 displayed in a full screen pane 310; and FIG. 11 is an example of a pane close event triggered via a selection of an operating system back command 1102.

In response to a pane close event, the adaptive pane module 106 updates the user interface 110 in accordance with which command(s) (e.g., commit command 312, cancel command 314, close command 316, back/drill-out command 1002, operating system back command 1102) are displayed and selected. For example, when a commit command 312 and a cancel command 314 are displayed in a pane 114, and the commit command 312 is selected, any changes made by the user 116 are saved, and the adaptive pane module 106 updates the user interface 110 to navigate back to a previous display. If the cancel command 314 is selected, any changes made by the user 116 are discarded, and the adaptive pane module 106 updates the user interface 110 to navigate back to a previous display. If an operating system back command 1102 is selected, any changes made by the user 116 are discarded, and the adaptive pane module 106 updates the user interface 110 to navigate back to a previous display.

According to another example, when only a commit command 312 is displayed, for example, a done command, and the commit command 312 is selected, any changes made by the user 116 are saved, and the adaptive pane module 106 updates the user interface 110 to navigate back to a previous display. If the operating system back command 1102 is selected, any changes made by the user 116 are not affected, and the adaptive pane module 106 updates the user interface 110 to navigate back to a previous display.

According to another example, when a back command 1002 is displayed and selected, the adaptive pane module 106 updates the user interface 110 to navigate back to a previous display. If the operating system back command 1102 is selected, any changes made by the user 116 are not affected, and the adaptive pane module 106 updates the user interface 110 to navigate back to a previous display.

According to another example, when a close command 316 is displayed and selected, the adaptive pane module 106 updates the user interface 110 to navigate back to a previous display. If the operating system back command 1102 is selected, any changes made by the user 116 are not affected, and the adaptive pane module 106 updates the user interface 110 to navigate back to a previous display.

Figure 14:
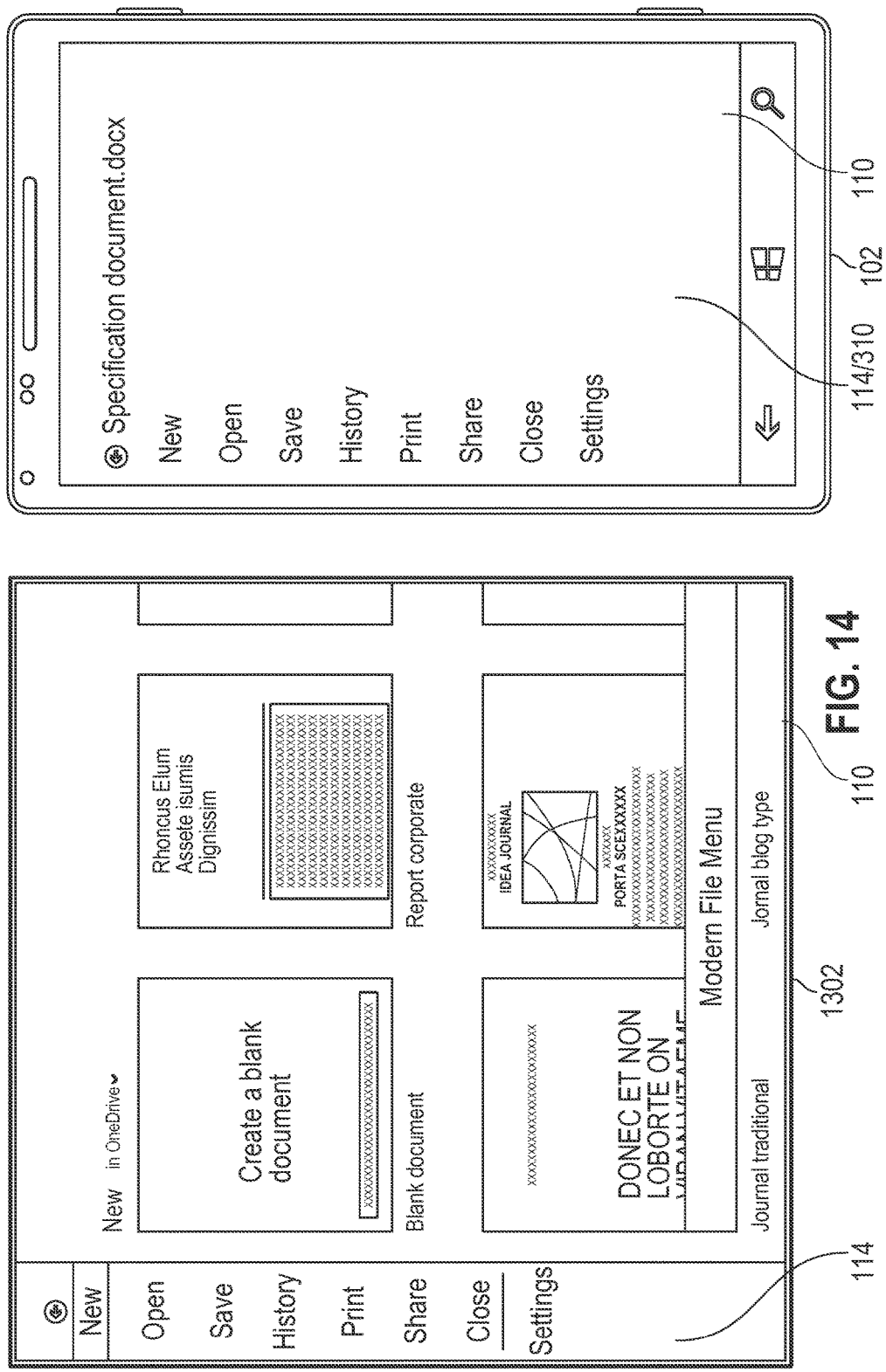
FIG. 14 is an illustration of an application or file menu displayed in a task pane on a tablet computing device versus in a full screen pane on a small form factor computing device.
Figure 15:
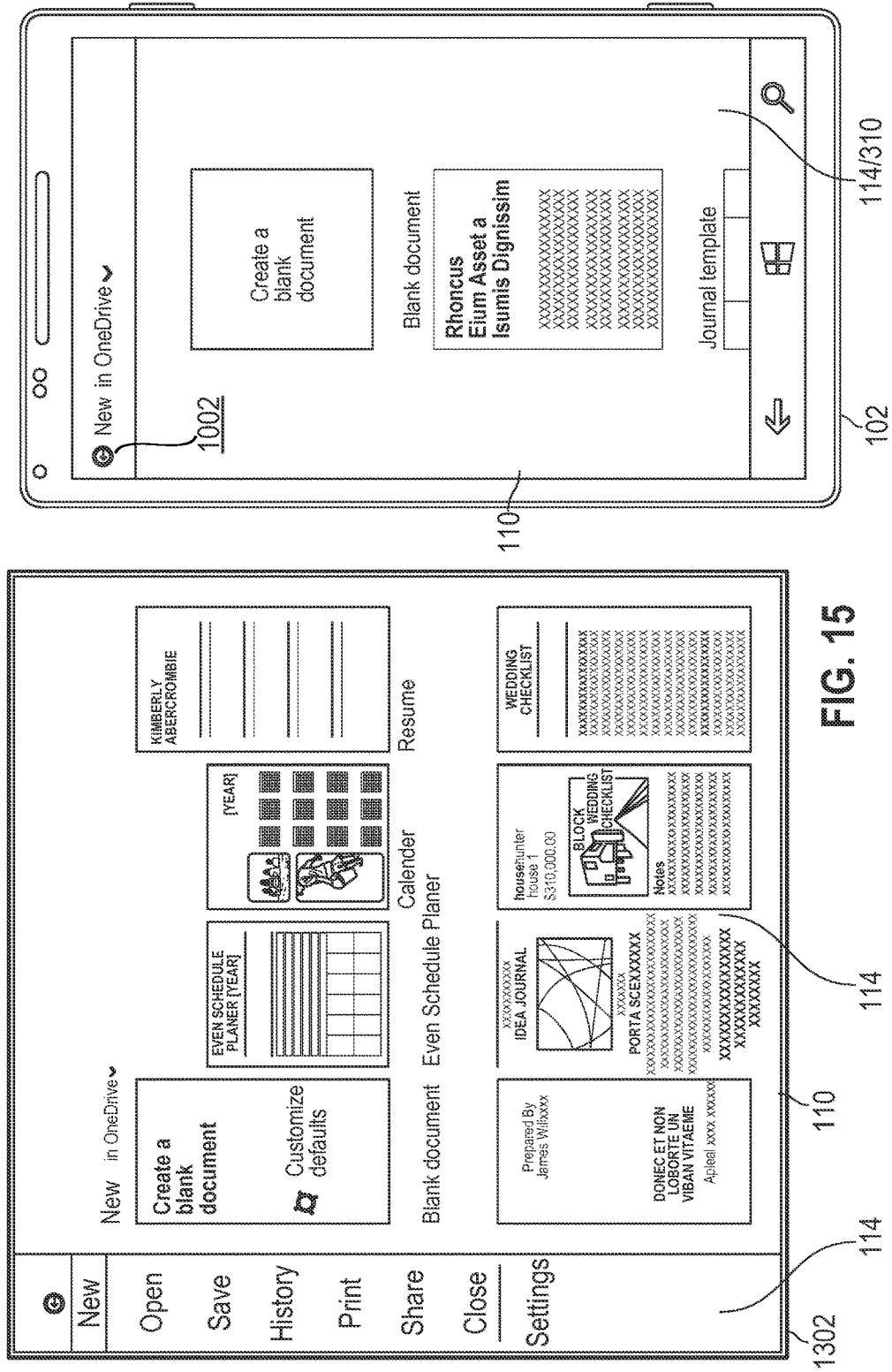
FIG. 15 is an illustration of a drilldown menu displayed in multiple panes on a tablet computing device versus in a single full screen pane on a small form factor computing device.
Figure 16:
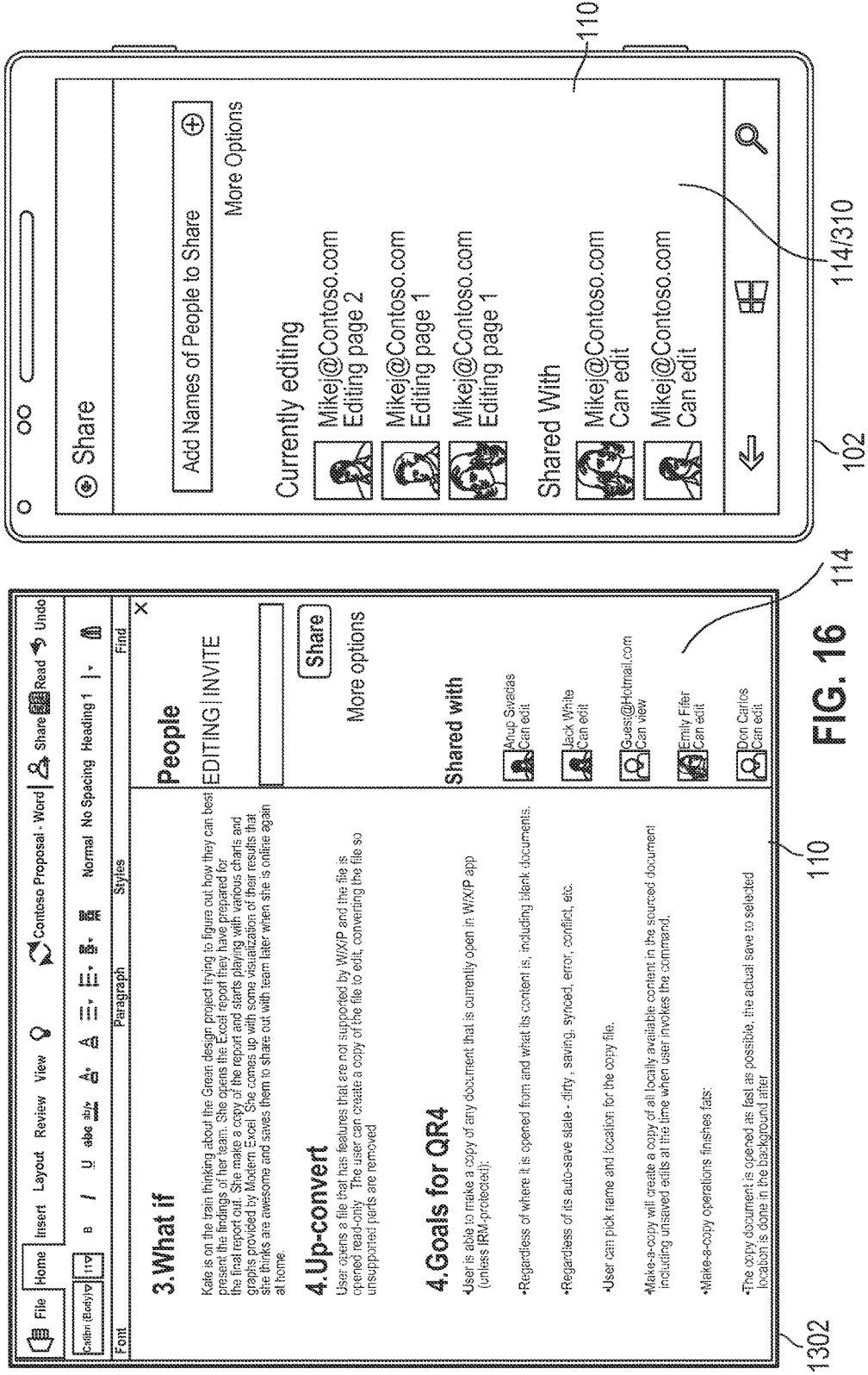
FIG. 16 is an illustration of an edit/share list displayed in a task pane on a tablet computing device versus in a full screen pane on a small form factor computing device.

FIGS. 13-17 show examples of how the adaptive pane module 106 manages the display of panes 114 on a tablet computing device 1302 as compared to on a small form factor computing device 102. For example, as illustrated in FIGS. 13, 14, and 16, a pane 114 displayed in a user interface 110 on a larger form factor computing device, such as a tablet computing device 1302, a laptop computing device, etc., may be aligned to a side of the user interface 110; whereas on a small form factor computing device 102, the adaptive pane module 106 updates the application user interface 110 to include a display of the pane 114 sized in accordance with the small form factor computing device 102, for example, as a full screen pane 310.

As illustrated in FIG. 15, multiple panes 114 may be displayed in a user interface 110 on a larger form factor computing device, such as a tablet computing device 1302, a laptop computing device, etc. For example, a drilldown menu may be displayed in a plurality of panes 114. In contrast, on a small form factor computing device 102, the adaptive pane module 106 updates the application user interface 110 to include a display of a single pane 114 sized in accordance with the small form factor computing device 102, for example, a single full screen pane 310 with a back/drillout button 1002.

As illustrated in FIGS. 16 and 17, in response to receiving an indication of an open pane event on a small form factor computing device 102, the adaptive pane module 106 updates the user interface 110 to display a pane 114 sized in accordance with the small form factor computing device 102. According to an aspect, when interaction with content 120 or functionality associated with the pane 114 includes input of information, for example, textual input, the adaptive pane module 106 updates the user interface 110 to display a keyboard 306 overlay as illustrated in FIG. 17.

Figure 18C:
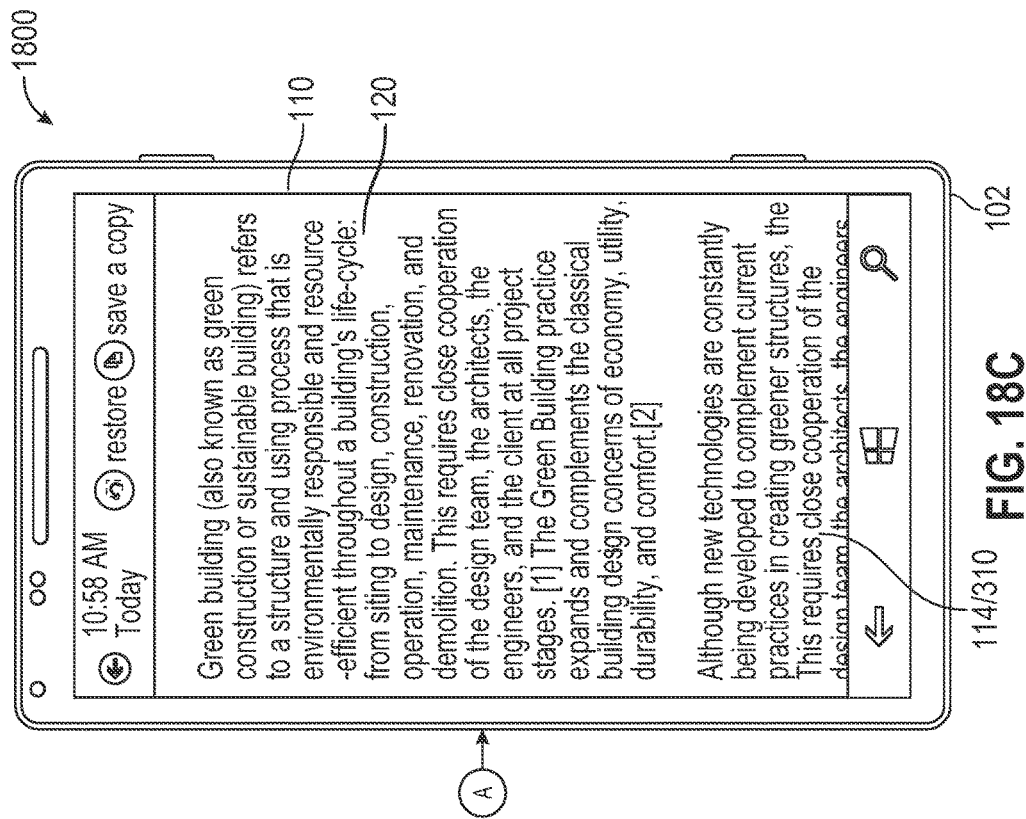

FIGS. 18-35 illustrate various example pane management sequences on a small form factor computing device 102. FIGS. 18A-C illustrate: a drill-in pane management sequence 1800 triggered by a selection to display contents of a history folder from a drilldown menu displayed in a full screen pane 310 (FIG. 18A); an update of the user interface 110 to display a lower level pane in a hierarchy of panes (i.e., a child pane of the example pane illustrated in FIG. 18A) as full screen pane 310 including content 120 associated with the selection and functionality for interacting with the content 120 (FIG. 18B); selection of a document item from the history folder (i.e., content 120) displayed in a full screen pane 310 (FIG. 18B), and an update of the user interface 110 to display the selected document item (i.e., content 120) in a full screen pane 310 (FIG. 18C).

FIGS. 19A-F illustrate: an example pane management sequence 1900 triggered by a selection to edit a comment (i.e., content 120) displayed in a partial screen (view comments) pane 302 coexisting with a canvas 112 in the user interface 110 (FIG. 19A); an update of the user interface 110 to display a full screen pane 310 including content 120 (e.g., comment) and functionality associated with interacting with the content 120, for example, including a keyboard overlay 306 for enabling a user 116 to edit/add a comment (FIG. 19B); selection of a palette hint command 318 (FIG. 19C); an update of the user interface 110 to display a palette pane 324 sized according to the small form factor computing device 102 and coexisting with the full screen pane 310 in the user interface 110 (FIG. 19D); a selection of a commit command 312 (FIG. 19E); a commitment of changes made, and an update of the user interface 110 to display a partial screen (view comments) pane 302 coexisting with a canvas 112 in the user interface 110 (FIG. 19F).

FIGS. 20A-D illustrate: an example pane management sequence 2000 triggered by a selection to reply to a comment via a selection of a quick command 308 in a partial screen (view comments) pane 302 coexisting with a canvas 112 (FIG. 20A); an update of the user interface 110 to display a full screen pane 310 including content 120 (e.g., the comment and a reply to the comment) and functionality associated with interacting with the content 120, for example, including a keyboard 306 overlay for enabling a user 116 to input a reply to the comment (FIG. 20B); a selection of an operating system back command 1102 (FIG. 20B); an update of the user interface 110 to drop the keyboard 306 overlay (FIG. 20C); another selection of the operating system back command 1102 (FIG. 20C); saving the new comment; and an update of the user interface 110 to display the partial screen (view comments) pane 302 coexisting with the canvas 112 (FIG. 20D), the partial screen pane 302 including a display of the new comment.

FIGS. 21A-C illustrate: an example pane management sequence 2100 triggered by a selection of a palette item 2102 displayed in a palette pane 324, for example, an insert tab for inserting a hyperlink in a document (i.e., content 120) displayed in the canvas 112 (FIG. 21A); an update of the user interface 110 to display a full screen pane 310 including content 120 and functionality associated with the pane 114/310 (e.g., fields for entering text and a URL (universal resource locator) associated with the hyperlink to be inserted into the document, a keyboard 306 overlay for enabling a user 116 to input text and the URL, etc.) (FIG. 21B); a selection of a commit command 312 (FIG. 21B); insertion of the hyperlink into the document; and an update of the user interface 110 to display the canvas 112 coexisting with the palette pane 324 (FIG. 21C).

Figure 22E:
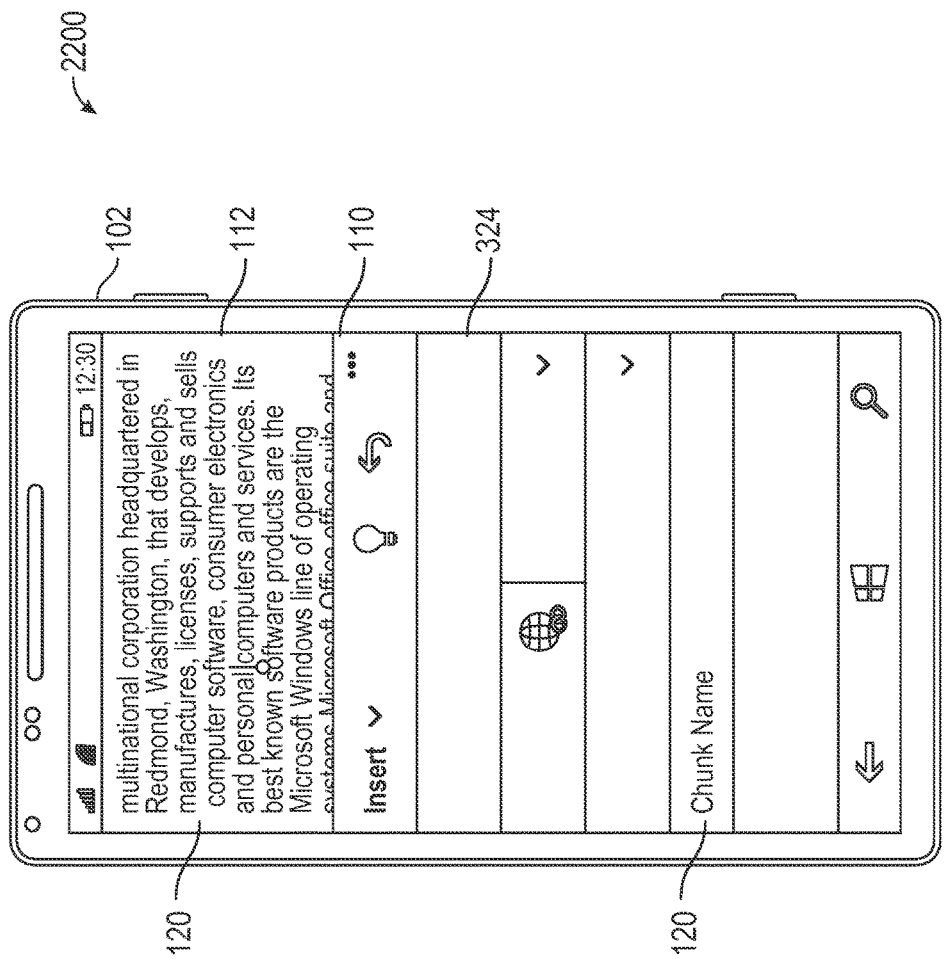

FIGS. 22A-E illustrate: an example pane management sequence 2200 triggered by a selection of a palette item 2102 displayed in a palette pane 324 to insert a hyperlink into a document (i.e., content 120) displayed in the canvas 112 (FIG. 22A); an update of the user interface 110 to display a full screen pane 310 including content 120 and functionality associated with the pane 114/310 (e.g., fields for entering text and a URL (universal resource locator) associated with the hyperlink to be inserted into the document, a keyboard 306 overlay for enabling a user 116 to input text and the URL, etc.) (FIG. 22B); receiving input from a user 116 and a selection of the operating system back command 1102 (FIG. 22C); an update of the user interface 110 to drop the keyboard 306 (FIG. 22D) from display; another selection of the operating system back command 1102 (FIG. 22D); discarding changes made by the user 116 and an update of the user interface 110 to display the canvas 112 coexisting with the palette pane 324 (FIG. 22E).

FIGS. 23A-F illustrate: an example pane management sequence 2300 triggered by a selection of a palette pane selection item 2304 (e.g., a size item) displayed in a palette pane 324, wherein in the illustrated example, the palette pane selection item 2304 includes functionalities for modifying the size of an element 2302 (e.g., a shape) displayed in the canvas 112 (FIG. 23A); an update of the user interface 110 to drill in or display a next level palette pane 324 (i.e., a child palette pane) in a hierarchy of palette panes 324, wherein in the next level palette pane 324 includes a plurality of palette items 2102 associated with functionalities for modifying the size of the element 2302 (FIG. 23B); a selection of a palette item 2102 (FIG. 23B); an update of the user interface 110 to display a keyboard 306 in the user interface 110 and to shift the palette pane 324 above the keyboard 306 in the user interface 110 (FIG. 23C); receiving input from the user 116 and a selection of the operating system back command 1102 (FIG. 23D); saving the changes made by the user 116 and updating the user interface 110 to modify the size of the element 2302 in the canvas 112 according to the input received from the user 116, dropping the keyboard 306, and shifting the palette pane 324 below the canvas 112 (FIG. 23E); a selection of the operating system back command 1102 (FIG. 23E); and an update of the user interface 110 to close the palette pane 324, resize the canvas 112 in accordance with the small form factor computing device 102, and reflow the contents 120 of the canvas 112 (FIG. 23F).

Figure 24B:
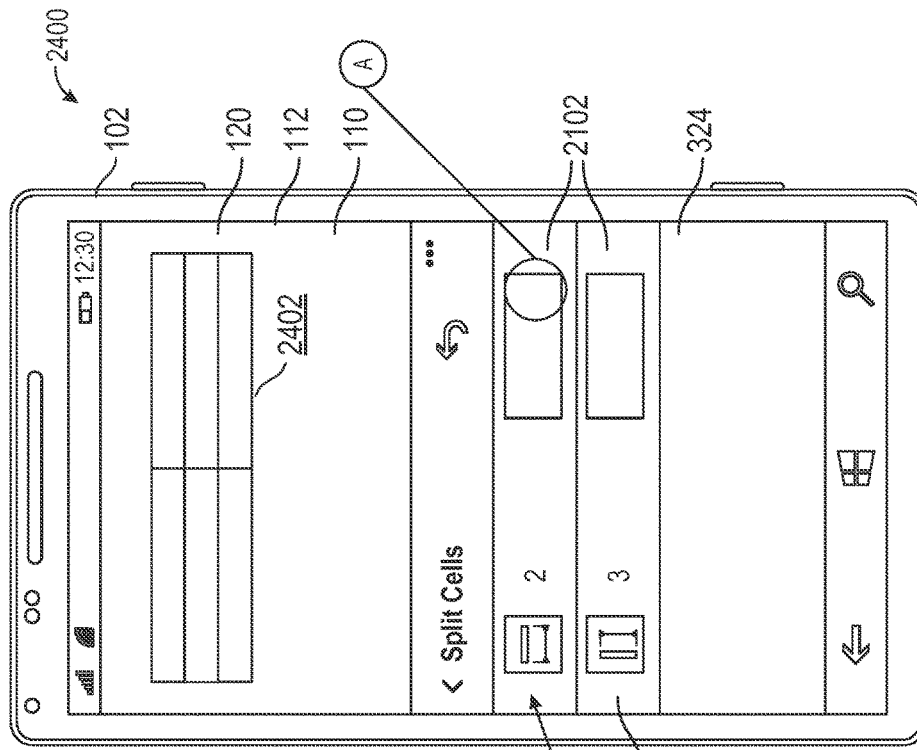
Figure 24A:
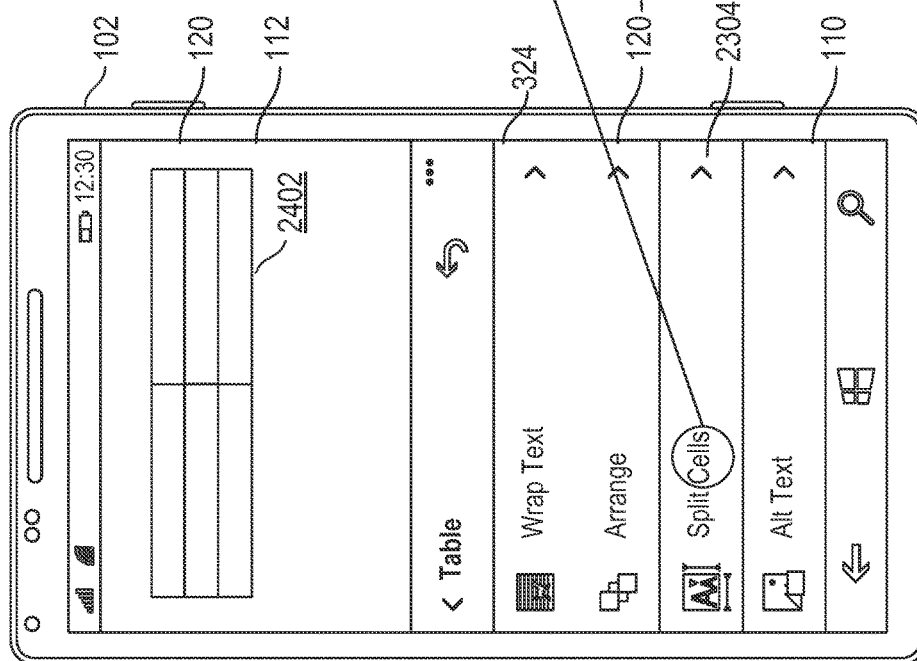

FIGS. 24A-F illustrate: an example pane management sequence 2400 triggered by a selection of a palette pane selection item 2304 (e.g., a split cells item) displayed in a palette pane 324, wherein in the illustrated example, the palette pane selection item 2304 includes functionalities for splitting cells of an element 2402 (e.g., a table) displayed in the canvas 112 (FIG. 24A); an update of the user interface 110 to drill in or display a next level palette pane 324 (i.e., a child palette pane) in a hierarchy of palette panes 324, wherein in the next level palette pane 324 includes a plurality of palette items 2102 associated with functionalities for splitting the cells in the table (i.e., element 2402) (FIG. 24B); a selection of a palette item 2102 (FIG. 24B); an update of the user interface 110 to display a keyboard 306 in the user interface 110 and to shift the palette pane 324 above the keyboard 306 in the user interface 110 (FIG. 24C); receiving input from the user 116 and a selection of a commit command 312 (FIG. 24D); saving the changes made by the user 116 and updating the user interface 110 to modify the element 2402 displayed in the canvas 112 according to the input received from the user 116, dropping the keyboard 306, and shifting the palette pane 324 below the canvas 112 (FIG. 24E); a selection of the operating system back command 1102 (FIG. 24E); and an update of the user interface 110 to close the palette pane 324, resize the canvas 112 in accordance with the small form factor computing device 102, and reflow the contents 120 of the canvas 112 (FIG. 24F).

Figure 25E:
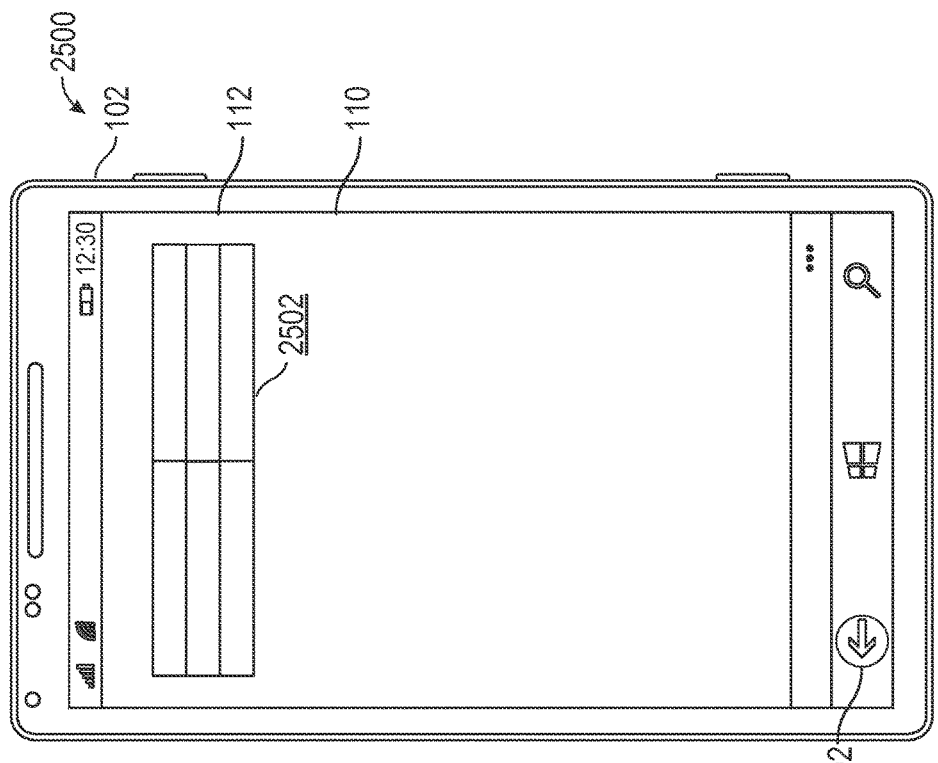
Figure 25F:
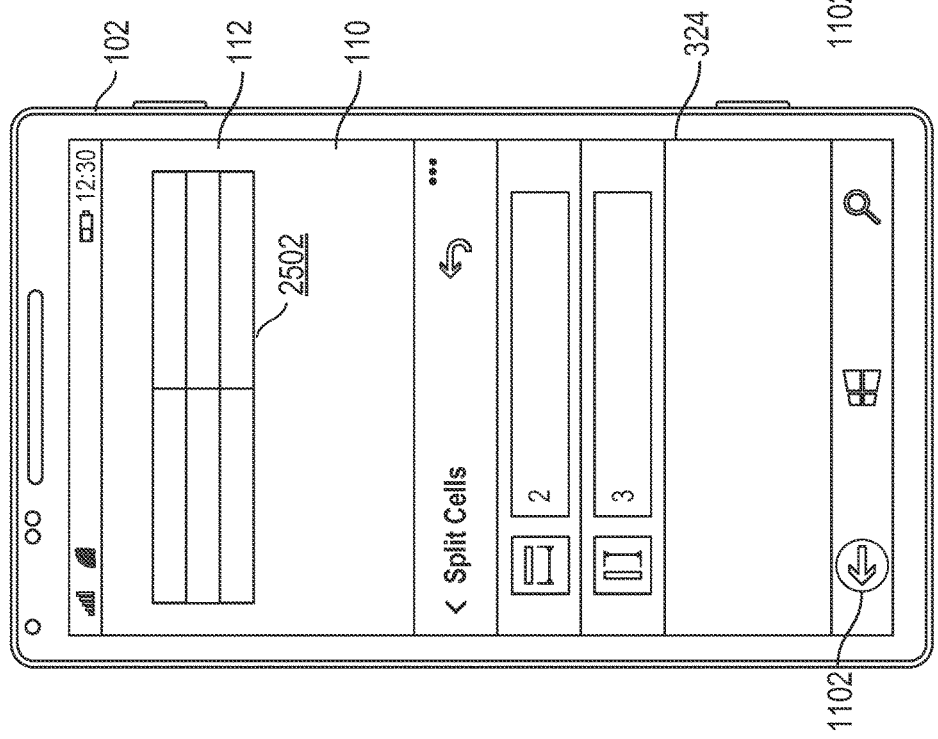

FIGS. 25A-F illustrate: an example pane management sequence 2500 triggered by a selection of a palette pane selection item 2304 (e.g., a split cells item) displayed in a palette pane 324, wherein in the illustrated example, the palette pane selection item 2304 includes functionalities for splitting cells of an element 2502 (e.g., a table) displayed in the canvas 112 (FIG. 25A); an update of the user interface 110 to drill in or display a next level palette pane 324 (i.e., a child palette pane) in a hierarchy of palette panes 324, wherein in the next level palette pane 324 includes a plurality of palette items 2102 associated with functionalities for splitting the cells in the table (i.e., element 2502); a selection of a palette item 2102 (FIG. 25B); an update of the user interface 110 to display a keyboard 306 in the user interface 110 and to shift the palette pane 324 above the keyboard 306 in the user interface 110 (FIG. 25C); receiving input from the user 116 and a selection of the operating system back command 1102 (FIG. 25D); a selection of the operating system back command 1102 and updating the user interface 110 to drop the keyboard 306 (FIG. 25D); another selection of the operating system back command 1102, discarding changes made by the user 116, and updating the user interface 110 to shift the palette pane 324 below the canvas 112 (FIG. 25E); and another selection of the operating system back command 1102, and an update of the user interface 110 to close the palette pane 324, resize the canvas 112 in accordance with the small form factor computing device 102, and reflow the contents 120 of the canvas 112 (FIG. 25F).

Figure 26C:
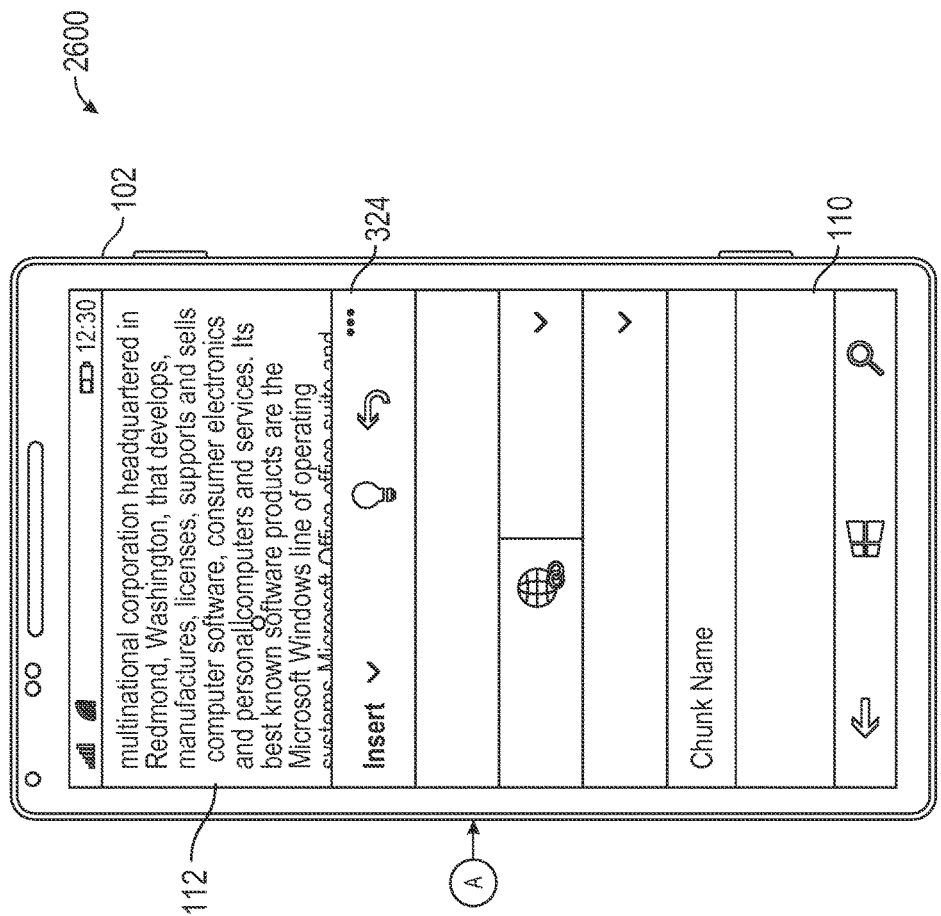

FIGS. 26A-C illustrate: an example pane management sequence 2600 triggered by a selection of a palette item 2102 displayed in a palette pane 324, wherein in the illustrated example, the palette item 2102 is associated with a functionality for inserting a hyperlink into a document (i.e., content 120) displayed in the canvas 112 (FIG. 26A); an update of the user interface 110 to display a full screen pane 310 including content 120 and functionality associated with the pane 114/310 (e.g., fields for entering text and a URL (universal resource locator) associated with the hyperlink to be inserted into the document, a keyboard 306 overlay for enabling a user 116 to input text and the URL, etc.) (FIG. 26B); a selection of a cancel command 314 (FIG. 26B); and updating the user interface 110 to the previous state, where the keyboard 306 is dropped, and the palette pane 324 is displayed below the canvas 112 in the user interface 110 (FIG. 26C).

Figure 27C:
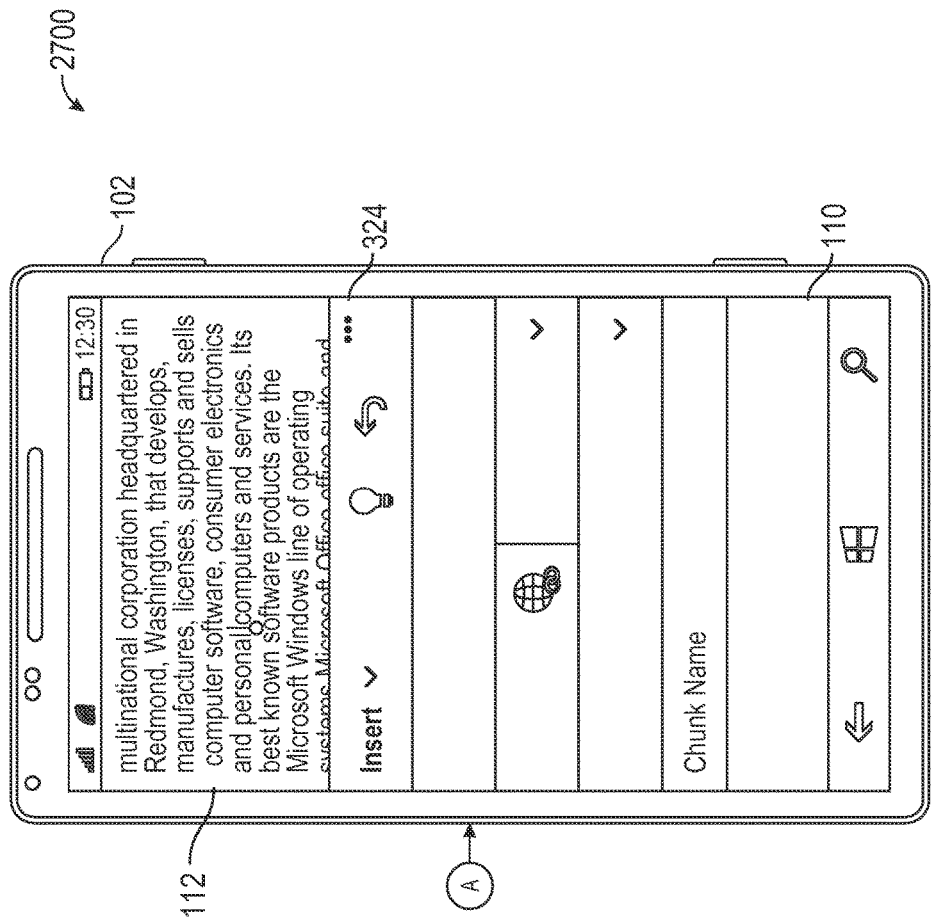

FIGS. 27A-C illustrate: an example pane management sequence 2700 triggered by an input of text in an editable text box displayed in a full screen pane 310 and a selection of the operating system back command 1102 (FIG. 27A); an update of the user interface 110 to drop the keyboard 306 (FIG. 27B); another selection of the operating system back command 1102 (FIG. 27B); discarding the changes (i.e., input), and an update of the user interface 110 to the previous state, where a palette pane 324 is displayed below the canvas 112 in the user interface 110 (FIG. 27C).

Figure 28C:
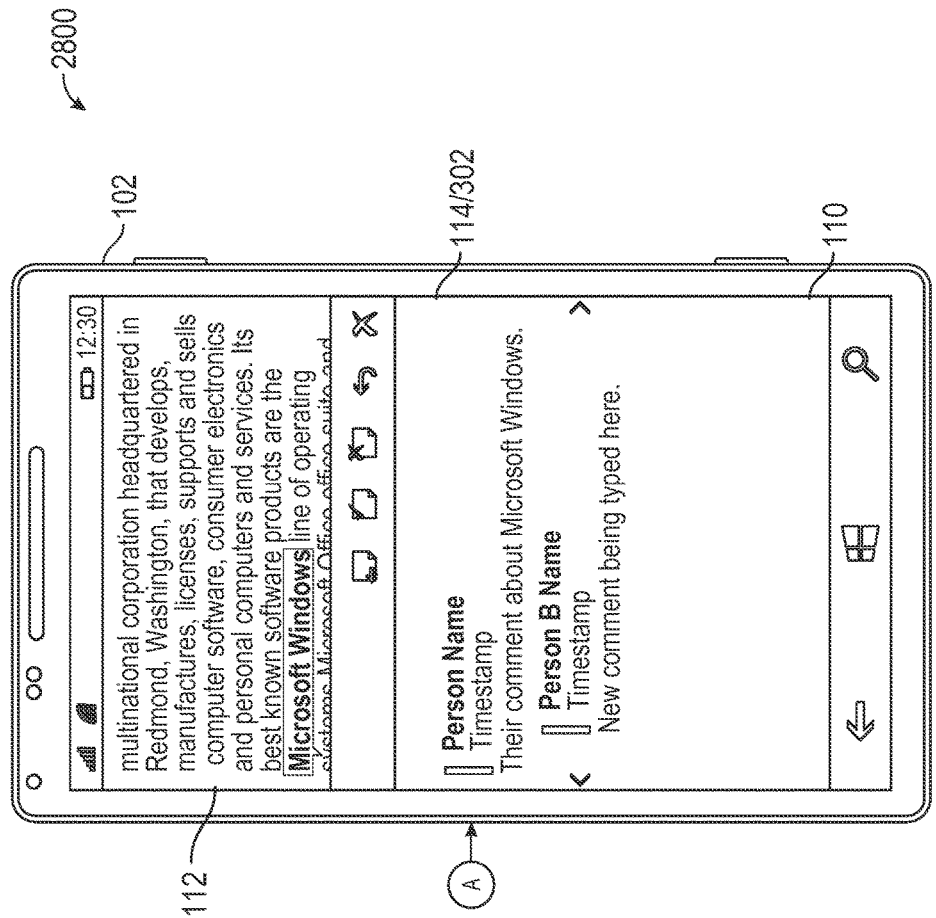

FIGS. 28A-C illustrate: an example pane management sequence 2800 triggered by a selection of content 120 (e.g., a comment) displayed in a partial screen pane 302 (FIG. 28A); an update of the user interface 110 to display a full screen pane 310 including content 120 (e.g., the comment and a reply to the comment) and functionality associated with interacting with the content 120, for example, including a keyboard 306 overlay for enabling a user 116 to input a reply to the comment (FIG. 28B); receiving input from a user 116 and a selection of a commit command 312 (FIG. 28B); saving the new comment; and an update of the user interface 110 to display the partial screen (view comments) pane 302 coexisting with the canvas 112 (FIG. 28C), the partial screen pane 302 including a display of the new comment.

FIGS. 29A-D illustrate: an example pane management sequence 2900 triggered by a selection of content 120 (e.g., a comment) displayed in a partial screen pane 302 (FIG. 28A); an update of the user interface 110 to display a full screen pane 310 including content 120 (e.g., the comment and a reply to the comment) and functionality associated with interacting with the content 120, for example, including a keyboard 306 overlay for enabling a user 116 to input a reply to the comment (FIG. 29B); receiving input from a user 116 and a selection of the operating system back command 1102 (FIG. 29B); an update of the user interface 110 to drop the keyboard 306 overlay (FIG. 29C); another selection of the operating system back command 1102 (FIG. 29C); saving the new comment; and an update of the user interface 110 to display the partial screen (view comments) pane 302 coexisting with the canvas 112 (FIG. 29D), the partial screen pane 302 including a display of the new comment.

Figure 30C:
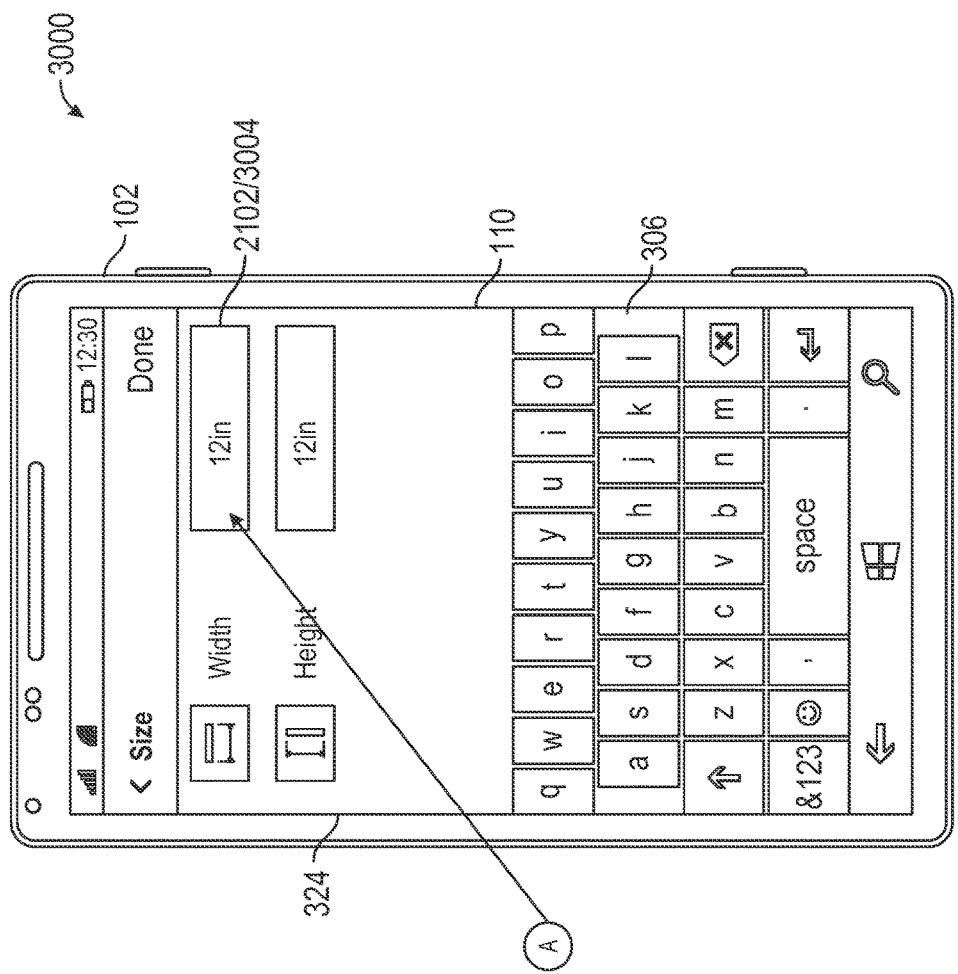

According to an aspect and as illustrated in the example pane management sequence 3000 in FIGS. 30A-C, when a user 116 selects a palette item 2102 associated with a functionality for receiving textual (or numerical) input, for example, an editable text box 3002, the adaptive pane module 106 updates the user interface 110 to display the palette 324 above a keyboard 306.

Figure 31A:
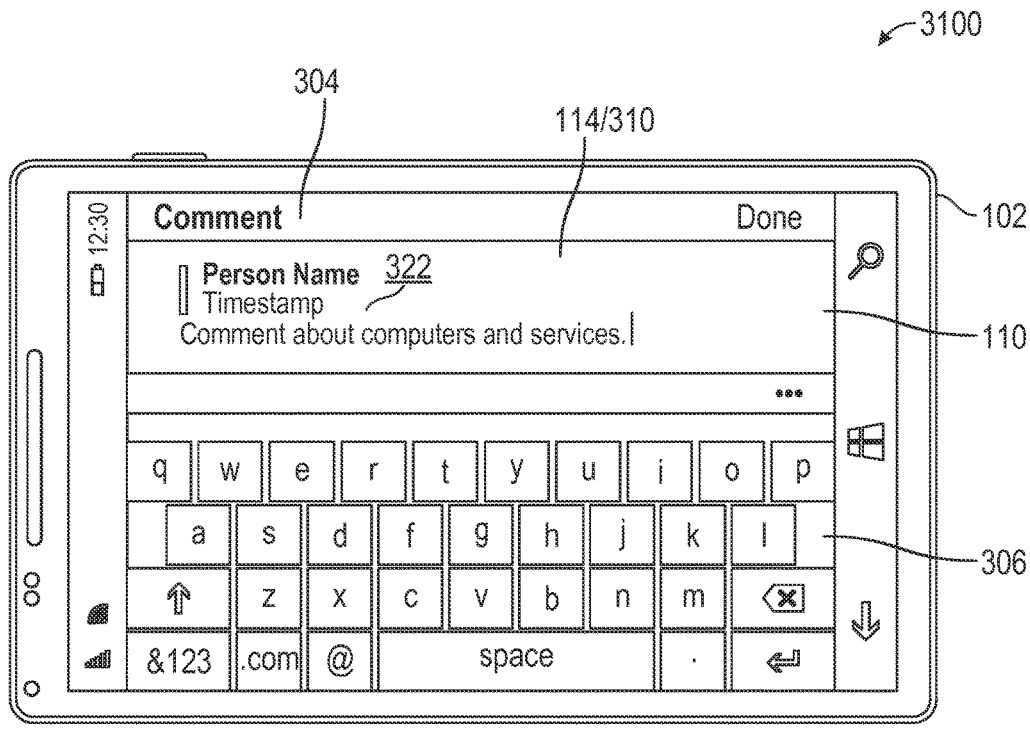
FIGS. 31A-B illustrate a pane management sequence associated with scrolling content in a scrollable content area on a small form factor computing device.
Figure 31B:
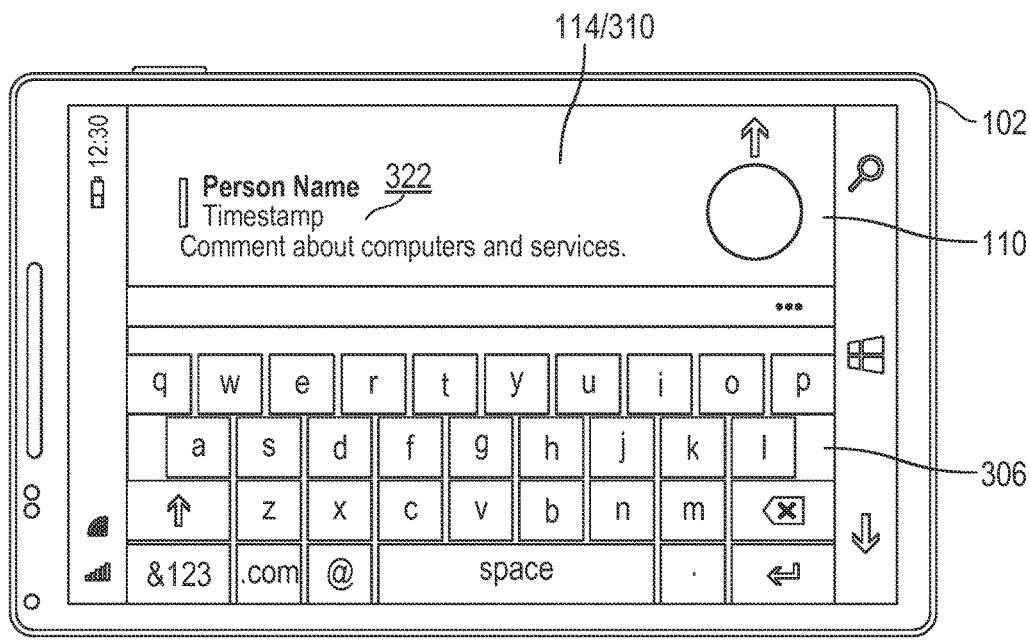
Figure 32:
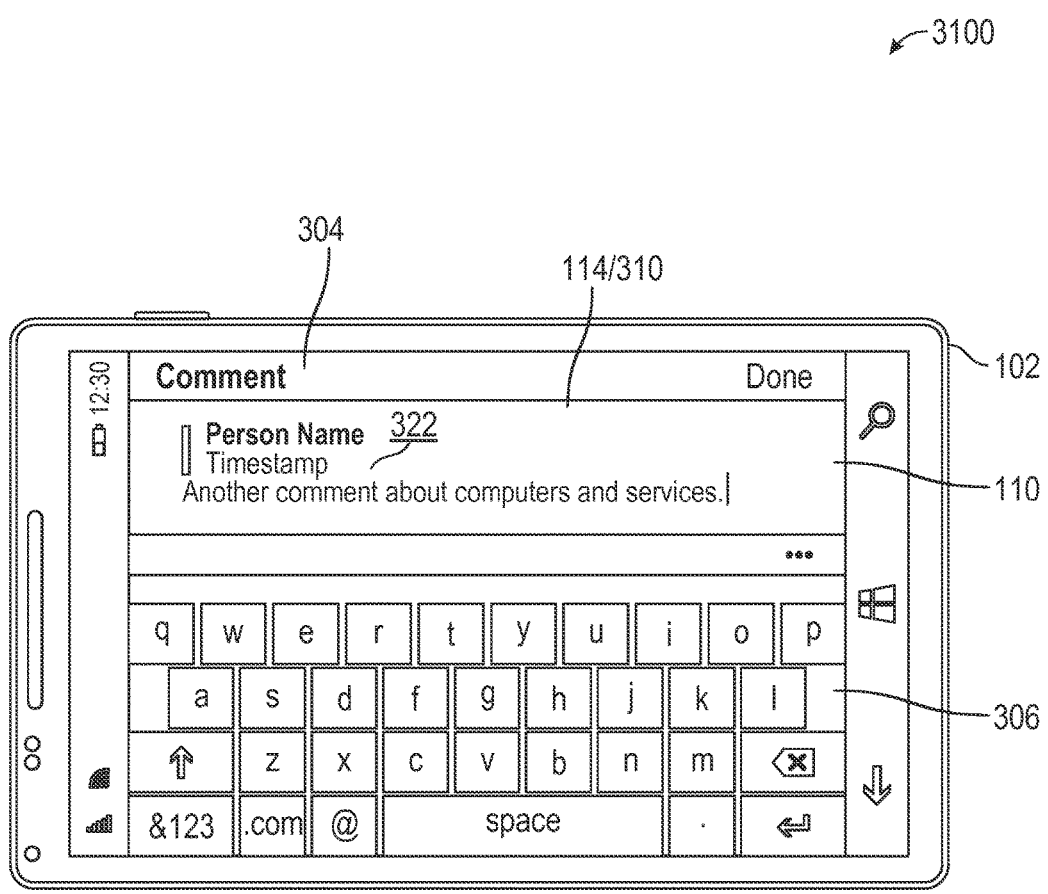
FIG. 32 illustrates a pane management sequence associated with scrolling content in a scrollable content area on a small form factor computing device.

FIGS. 31A-B and 32 illustrate an example pane management sequence 3100 in response to a user 116 scrolling scrollable content 322 in a pane 114. According to an aspect and as illustrated in FIGS. 31A-B and 32, when a small form factor computing device 102 is in a landscape orientation and a user 116 is scrolling scrollable content 322 displayed in a pane 114, the adaptive pane module 106 collapses the pane header 304 (FIG. 31B). When the scrolling stops, the adaptive pane module 106 updates the user interface 110 to display the pane header 304 (FIG. 32).

Figures 33A, 33B:
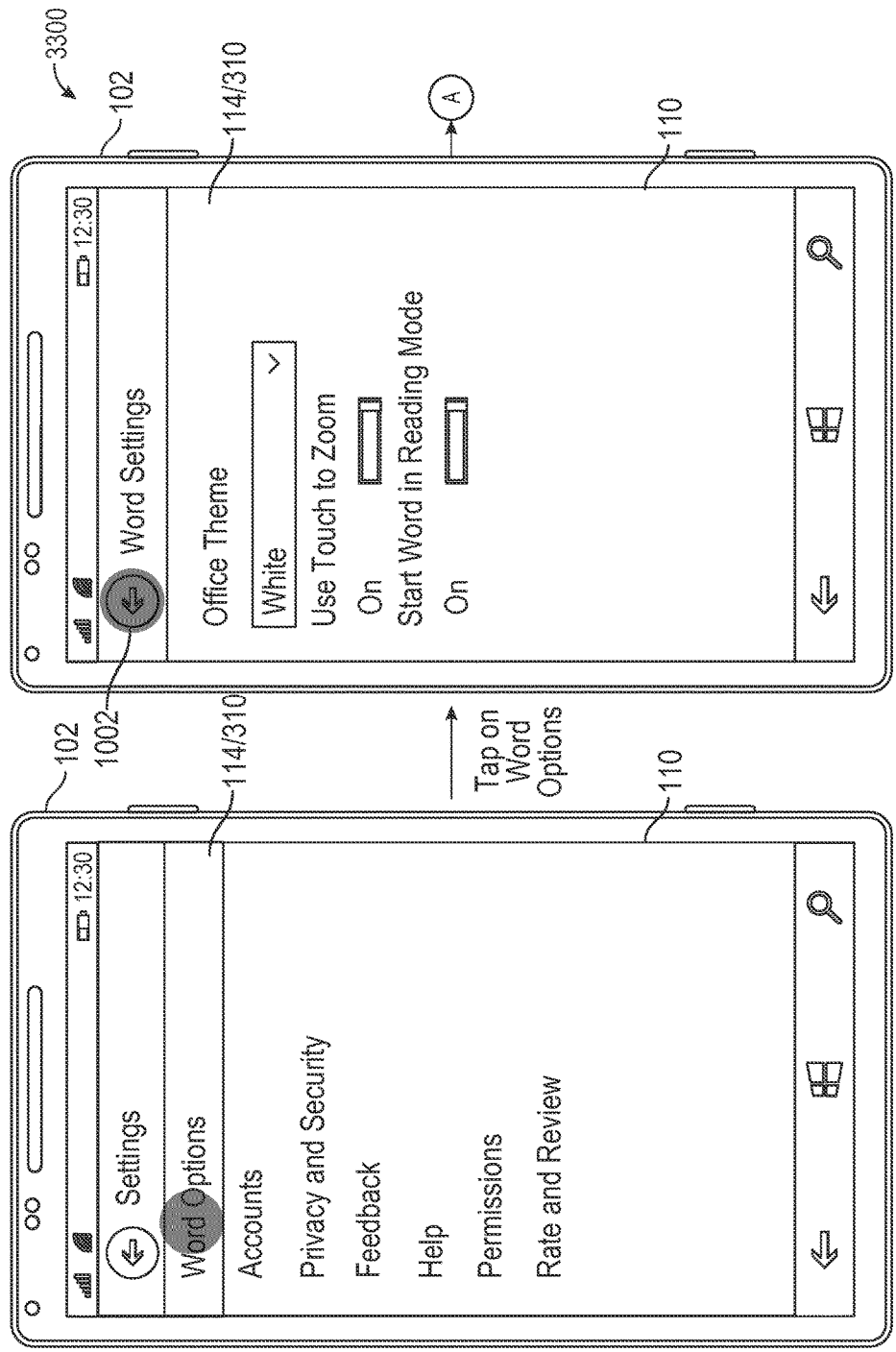

FIGS. 33A-C illustrate an example pane management sequence 3300 in response to a selection of a back command 1002. According to an aspect, selection of a back command 1002 navigates a user 116 back to a previous display regardless of whether or not a keyboard 306 is displayed in the user interface 110. For example and as illustrated in FIGS. 33A-C, selections made in specific pane types, such as a pane displaying a settings menu, are instantly saved. In response to a selection of the back command 1002 (FIG. 33B), the adaptive pane module 106 updates the user interface 110 to display the previously displayed pane 114 (FIG. 33C).

Figure 34C:
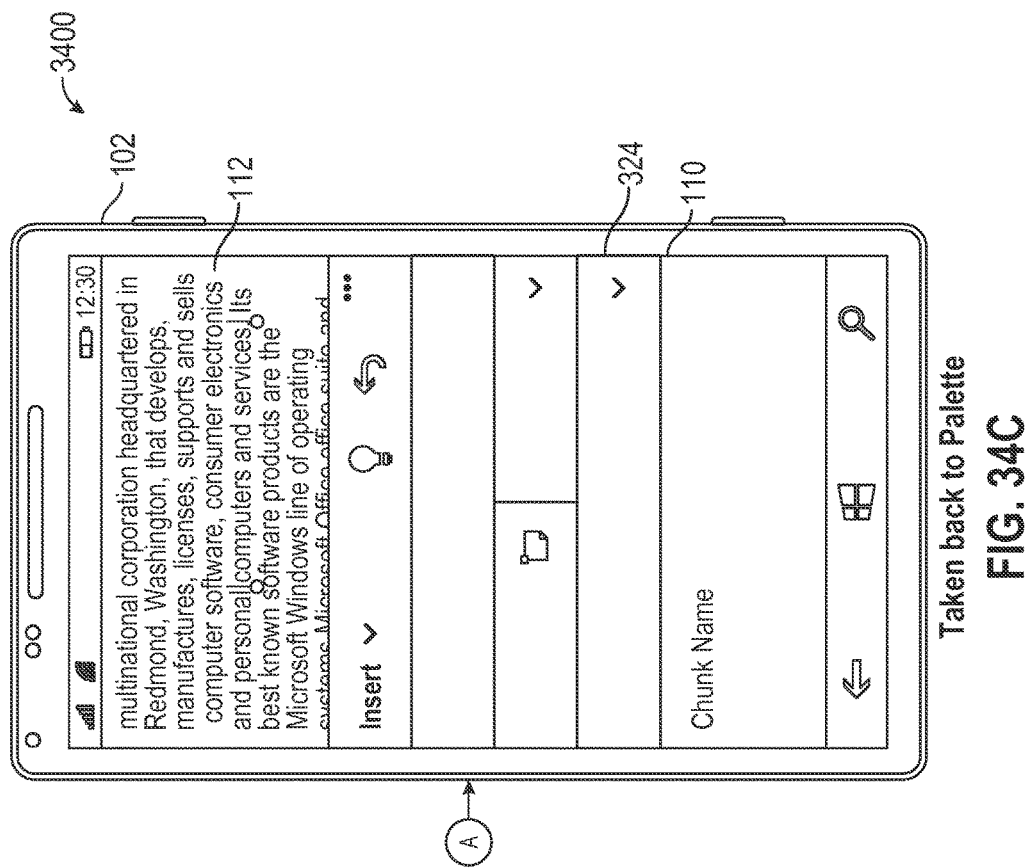

FIGS. 34A-C illustrate an example pane management sequence 3400 in response to a selection of a close command 316. According to an aspect, selection of a close command 316 navigates a user 116 back to a previous display. For example and as illustrated in FIGS. 34A-C, in response to a selection of the close command 316 displayed in a pane 114 (FIG. 34B), the adaptive pane module 106 updates the user interface 110 to display the previously displayed palette 324 (FIG. 34C).

Figure 35:
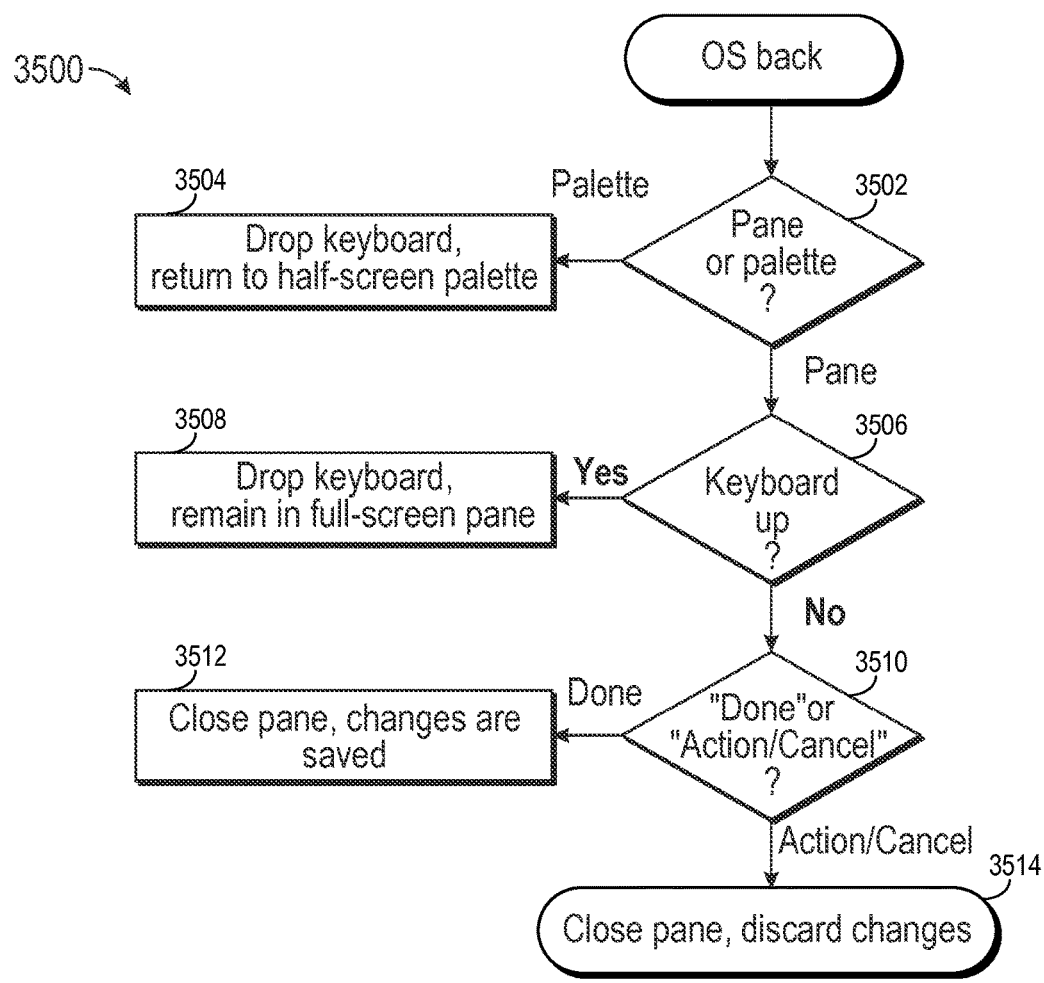
FIG. 35 is a flow chart showing general stages involved in an example method for an example pane close event via a selection of an operating system back command on a small form factor computing device.

FIG. 35 is a flow chart showing general stages involved in an example method 3500 for managing a pane close event on a small form factor computing device 102 triggered by a selection of an operating system back command 1002. The method 3500 starts with a selection of the operating system back command 1002.

In response to the selection of the operating system back command 1002, a decision operation 3502 determines whether a pane 114 or a palette pane 324 is displayed in the user interface 110. If the user interface 110 includes a palette pane 324 and a keyboard 306 is displayed, a keyboard drop operation 3504 drops the keyboard 306, and updates the user interface 110 to display the palette pane 324 as a partial screen palette.

If the decision operation 3502 determines that the user interface 110 includes a pane 114, a decision operation 3506 determines whether the keyboard 306 is displayed. If the keyboard 306 is displayed, a keyboard drop operation 3508 drops the keyboard 306, and updates the user interface 110 to display the portion of the full screen pane 310 previously covered by the keyboard 306. If the decision operation 3506 determines that the keyboard 306 is not displayed, a decision operation 3510 determines whether the pane 114 comprises a commit command 312 (e.g., a "done" command) or an action and cancel command 314. If the pane 114 includes a commit command 312 (e.g., a "done" command), a close pane operation 3512 closes the pane 114 and saves any changes that were made. If the decision operation 3510 determines that the pane 114 includes an action and cancel command 314, a close pane operation 3514 closes the pane 114 and discards the any changes.

According to examples, pane configuration in a user interface of an application displayed on a small form factor computing device 102 is provided, a method for pane configuration comprising: displaying an application user interface 110 comprising functionality to interact with a document and a canvas 112 to display the document, wherein the functionality is displayed in an application header 320 or in the canvas 112; receiving a selection of a functionality; and in response to the selection of the functionality, updating the application user interface 110 by: generating a pane 114 including content 120 and functionality for interaction therewith; sizing the pane 114 in accordance with the small form factor computing device 102 to maintain a minimum size of the canvas 112 for providing contextual information relating to the content 120 displayed in the pane 114; and displaying the pane 114 sized for the small form factor computing device 102.

In some examples, sizing the pane 114 comprises maintaining a minimum size of the pane 114 by limiting the number of persistent panes to one persistent pane that can be displayed in the application user interface 110 at a time, wherein the size of the pane is a percentage of the size of the display 118.

While examples have been described in the general context of program modules that execute in conjunction with an application program that runs on an operating system on a computer, those skilled in the art will recognize that examples may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which aspects are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 36:
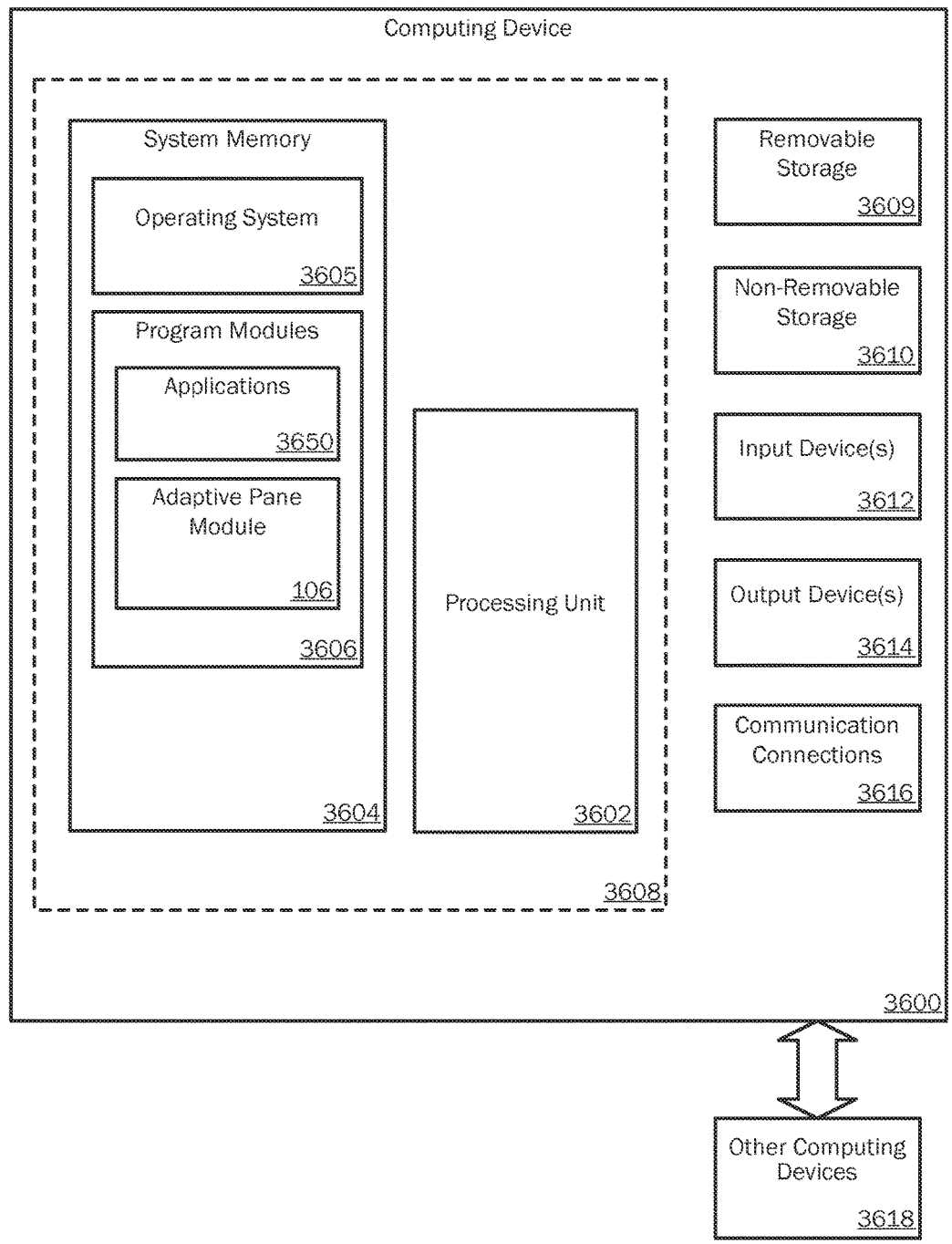
FIG. 36 is a block diagram illustrating one example of the physical components of a computing device.
Figure 37A:
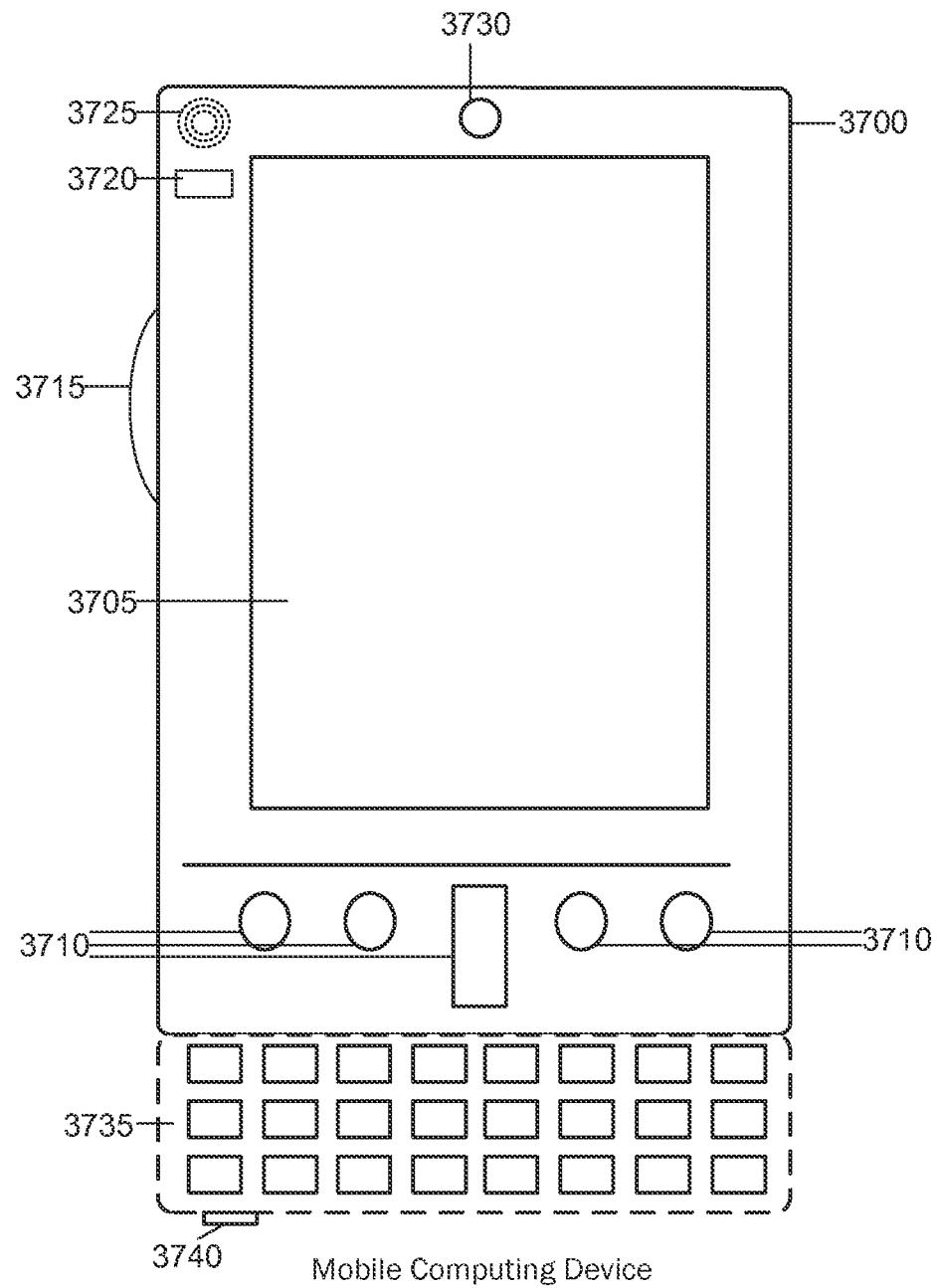
FIGS. 37A and 37B are simplified block diagrams of a mobile computing device.
Figure 37B:
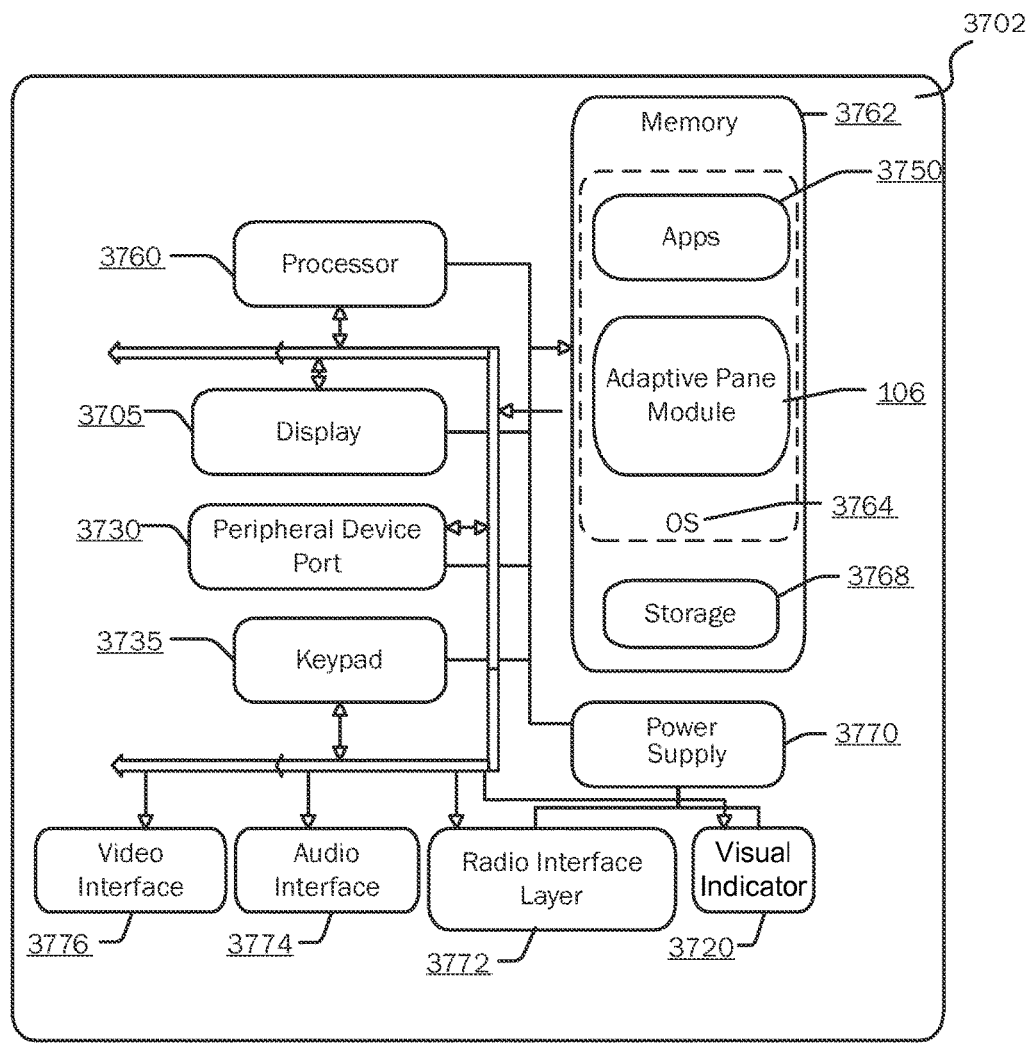
Figure 38:
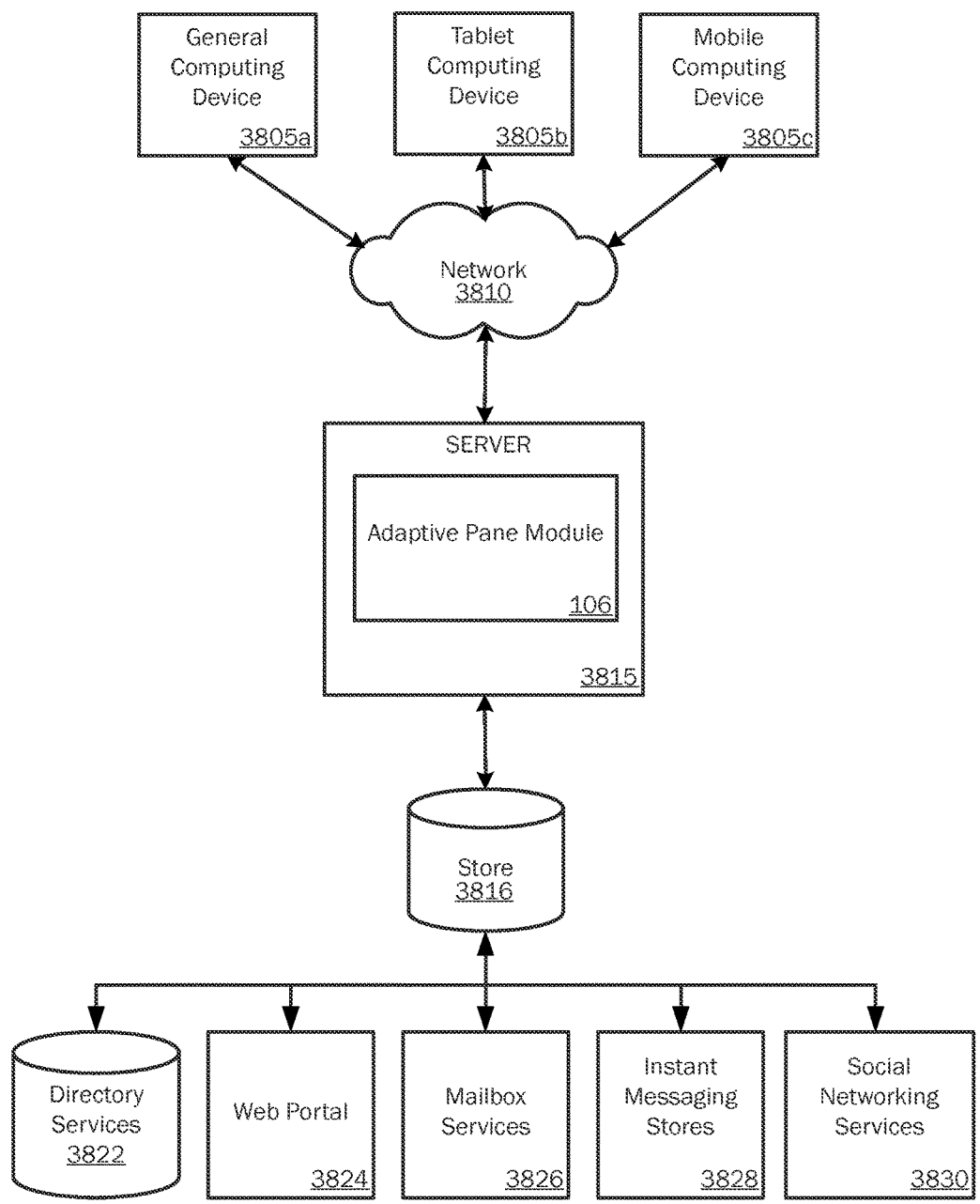
FIG. 38 is a simplified block diagram of a distributed computing system.

FIG. 36-38 and the associated descriptions provide a discussion of a variety of operating environments in which examples are practiced. However, the devices and systems illustrated and discussed with respect to FIGS. 36-38 are for purposes of example and illustration and are not limiting of a vast number of computing device configurations that are utilized for practicing examples, described herein.

FIG. 36 is a block diagram illustrating physical components (i.e., hardware) of a computing device 3600 with which examples of the present disclosure are be practiced. In a basic configuration, the computing device 3600 includes at least one processing unit 3602 and a system memory 3604. According to an aspect, depending on the configuration and type of computing device, the system memory 3604 comprises, but is not limited to, volatile storage (e.g., random access memory), non-volatile storage (e.g., read-only memory), flash memory, or any combination of such memories. According to an aspect, the system memory 3604 includes an operating system 3605 and one or more program modules 3606 suitable for running software applications 3650. According to an aspect, the system memory 3604 includes the adaptive pane module 106. The operating system 3605, for example, is suitable for controlling the operation of the computing device 3600. Furthermore, examples are practiced in conjunction with a graphics library, other operating systems, or any other application program, and is not limited to any particular application or system. This basic configuration is illustrated in FIG. 36 by those components within a dashed line 3608. According to an aspect, the computing device 3600 has additional features or functionality. For example, according to an aspect, the computing device 3600 includes additional data storage devices (removable and/or non-removable) such as, for example, magnetic disks, optical disks, or tape. Such additional storage is illustrated in FIG. 36 by a removable storage device 3609 and a non-removable storage device 3610.

As stated above, according to an aspect, a number of program modules and data files are stored in the system memory 3604. While executing on the processing unit 3602, the program modules 3606 (e.g., adaptive pane module 106) performs processes including, but not limited to, one or more of the stages of the method 200 illustrated in FIG. 2. According to an aspect, other program modules are used in accordance with examples and include applications such as electronic mail and contacts applications, word processing applications, spreadsheet applications, database applications, slide presentation applications, drawing or computer-aided application programs, web browser applications, etc.

According to an aspect, examples are practiced in an electrical circuit comprising discrete electronic elements, packaged or integrated electronic chips containing logic gates, a circuit utilizing a microprocessor, or on a single chip containing electronic elements or microprocessors. For example, examples are practiced via a system-on-a-chip (SOC) where each or many of the components illustrated in FIG. 36 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 3600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, examples are practiced within a general purpose computer or in any other circuits or systems.

According to an aspect, the computing device 3600 has one or more input device(s) 3612 such as a keyboard, a mouse, a pen, a sound input device, a touch input device, etc. The output device(s) 3614 such as a display, speakers, a printer, etc. are also included according to an aspect. The aforementioned devices are examples and others may be used. According to an aspect, the computing device 3600 includes one or more communication connections 3616 allowing communications with other computing devices 3618. Examples of suitable communication connections 3616 include, but are not limited to, RF transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 3604, the removable storage device 3609, and the non-removable storage device 3610 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 3600. According to an aspect, any such computer storage media is part of the computing device 3600. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 37A and 37B illustrate a mobile computing device 3700, for example, a mobile telephone, a smart phone, a tablet personal computer, a laptop computer, and the like, with which examples may be practiced. With reference to FIG. 37A, an example of a mobile computing device 3700 for implementing the aspects is illustrated. In a basic configuration, the mobile computing device 3700 is a handheld computer having both input elements and output elements. The mobile computing device 3700 typically includes a display 3705 and one or more input buttons 3710 that allow the user to enter information into the mobile computing device 3700. According to an aspect, the display 3705 of the mobile computing device 3700 functions as an input device (e.g., a touch screen display). If included, an optional side input element 3715 allows further user input. According to an aspect, the side input element 3715 is a rotary switch, a button, or any other type of manual input element. In alternative examples, mobile computing device 3700 incorporates more or less input elements. For example, the display 3705 may not be a touch screen in some examples. In alternative examples, the mobile computing device 3700 is a portable phone system, such as a cellular phone. According to an aspect, the mobile computing device 3700 includes an optional keypad 3735. According to an aspect, the optional keypad 3735 is a physical keypad. According to another aspect, the optional keypad 3735 is a "soft" keypad generated on the touch screen display. In various aspects, the output elements include the display 3705 for showing a graphical user interface (GUI), a visual indicator 3720 (e.g., a light emitting diode), and/or an audio transducer 3725 (e.g., a speaker). In some examples, the mobile computing device 3700 incorporates a vibration transducer for providing the user with tactile feedback. In yet another example, the mobile computing device 3700 incorporates input and/or output ports, such as an audio input (e.g., a microphone jack), an audio output (e.g., a headphone jack), and a video output (e.g., a HDMI port) for sending signals to or receiving signals from an external device.

FIG. 37B is a block diagram illustrating the architecture of one example of a mobile computing device. That is, the mobile computing device 3700 incorporates a system (i.e., an architecture) 3702 to implement some examples. In one example, the system 3702 is implemented as a "smart phone" capable of running one or more applications (e.g., browser, e-mail, calendaring, contact managers, messaging clients, games, and media clients/players). In some examples, the system 3702 is integrated as a computing device, such as an integrated personal digital assistant (PDA) and wireless phone.

According to an aspect, one or more application programs 3750 are loaded into the memory 3762 and run on or in association with the operating system 3764. Examples of the application programs include phone dialer programs, e-mail programs, personal information management (PIM) programs, word processing programs, spreadsheet programs, Internet browser programs, messaging programs, and so forth. According to an aspect, the adaptive pane module 106 is loaded into memory 3762. The system 3702 also includes a non-volatile storage area 3768 within the memory 3762. The non-volatile storage area 3768 is used to store persistent information that should not be lost if the system 3702 is powered down. The application programs 3750 may use and store information in the non-volatile storage area 3768, such as e-mail or other messages used by an e-mail application, and the like. A synchronization application (not shown) also resides on the system 3702 and is programmed to interact with a corresponding synchronization application resident on a host computer to keep the information stored in the non-volatile storage area 3768 synchronized with corresponding information stored at the host computer. As should be appreciated, other applications may be loaded into the memory 3762 and run on the mobile computing device 3700.

According to an aspect, the system 3702 has a power supply 3770, which is implemented as one or more batteries. According to an aspect, the power supply 3770 further includes an external power source, such as an AC adapter or a powered docking cradle that supplements or recharges the batteries.

According to an aspect, the system 3702 includes a radio 3772 that performs the function of transmitting and receiving radio frequency communications. The radio 3772 facilitates wireless connectivity between the system 3702 and the "outside world," via a communications carrier or service provider. Transmissions to and from the radio 3772 are conducted under control of the operating system 3764. In other words, communications received by the radio 3772 may be disseminated to the application programs 3750 via the operating system 3764, and vice versa.

According to an aspect, the visual indicator 3720 is used to provide visual notifications and/or an audio interface 3774 is used for producing audible notifications via the audio transducer 3725. In the illustrated example, the visual indicator 3720 is a light emitting diode (LED) and the audio transducer 3725 is a speaker. These devices may be directly coupled to the power supply 3770 so that when activated, they remain on for a duration dictated by the notification mechanism even though the processor 3760 and other components might shut down for conserving battery power. The LED may be programmed to remain on indefinitely until the user takes action to indicate the powered-on status of the device. The audio interface 3774 is used to provide audible signals to and receive audible signals from the user. For example, in addition to being coupled to the audio transducer 3725, the audio interface 3774 may also be coupled to a microphone to receive audible input, such as to facilitate a telephone conversation. According to an aspect, the system 3702 further includes a video interface 3776 that enables an operation of an on-board camera 3730 to record still images, video stream, and the like.

According to an aspect, a mobile computing device 3700 implementing the system 3702 has additional features or functionality. For example, the mobile computing device 3700 includes additional data storage devices (removable and/or non-removable) such as, magnetic disks, optical disks, or tape. Such additional storage is illustrated in FIG. 37B by the non-volatile storage area 3768.

According to an aspect, data/information generated or captured by the mobile computing device 3700 and stored via the system 3702 is stored locally on the mobile computing device 3700, as described above. According to another aspect, the data is stored on any number of storage media that is accessible by the device via the radio 3772 or via a wired connection between the mobile computing device 3700 and a separate computing device associated with the mobile computing device 3700, for example, a server computer in a distributed computing network, such as the Internet. As should be appreciated such data/information is accessible via the mobile computing device 3700 via the radio 3772 or via a distributed computing network. Similarly, according to an aspect, such data/information is readily transferred between computing devices for storage and use according to well-known data/information transfer and storage means, including electronic mail and collaborative data/information sharing systems. In yet another example, the mobile computing device 3700 incorporates peripheral device port 3740, such as an audio input (e.g., a microphone jack), an audio output (e.g., a headphone jack), and a video output (e.g., a HDMI port) for sending signals to or receiving signals from an external device.

FIG. 38 illustrates one example of the architecture of a system for automatically managing a pane in a user interface on a small form factor computing device as described above. Content developed, interacted with, or edited in association with the adaptive pane module 106 is enabled to be stored in different communication channels or other storage types. For example, various documents may be stored using a directory service 3822, a web portal 3824, a mailbox service 3826, an instant messaging store 3828, or a social networking site 3830. The adaptive pane module 106 is operable to use any of these types of systems or the like for automatically managing a pane in a user interface on a small form factor computing device, as described herein. According to an aspect, a server 3815 provides the adaptive pane module 106 to clients 3805*a,b,c*. As one example, the server 3815 is a web server providing the adaptive pane module 106 over the web. The server 3815 provides the adaptive pane module 106 over the web to clients 3805 through a network 3810. By way of example, the client computing device is implemented and embodied in a personal computer 3805*a*, a tablet computing device 3805*b* or a mobile computing device 3805*c* (e.g., a smart phone), or other computing device. Any of these examples of the client computing device are operable to obtain content from the store 3816.

Examples are described above with reference to block diagrams and/or operational illustrations of methods, systems, and computer program products according to examples. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope in any way. The aspects, examples, and details provided in this application are considered sufficient to convey possession and enable others to make and use the best mode. The claims should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

What is claimed is:

1. A method of managing a pane configuration in a user interface of an application displayed on a small form factor computing device, the method comprising:
    displaying an application user interface that includes one or more options to interact with a document, wherein the user interface is displayed on a display of the small form factor computing device, wherein, when the user interface is displayed, the user interface is defined by a top edge and an opposing bottom edge, and by a left edge and an opposing right edge, and wherein at least a portion of the document is displayed in the user interface;
    receiving a selection of one option; and
    in response to the selection of the one option, generating only one pane for display including one or more functionalities associated with the selected one option, wherein the only one pane is displayable only as a full pane that covers the document or as a partial pane that leaves a portion of the document exposed, the full or partial pane being anchored to one edge and having a width extending between the top and bottom edge or between the left and right edge,
    wherein, when the selected one option does not include a possibility for text entry, the only one pane is displayed as the partial pane, and
    wherein, when the selected one option does include the possibility for text entry, the only one pane is displayed as the full pane with a keyboard overlay; and
    displaying within the application user interface the only one pane, wherein the application user interface only ever displays one pane at a time.

2. The method of claim 1, further comprising sizing the one pane in accordance with the small form factor computing device to maintain a minimum pane size that is a specified percentage of the size of the display of the small form factor computing device.

3. The method of claim 2, wherein sizing the one pane in accordance with the small form factor computing device comprises displaying the one pane below the portion of the document, the pane displayed as a persistent pane and comprising a pane header including a close command.

4. The method of claim 3, further comprising displaying one or more quick command functionalities in the pane header.

5. The method of claim 3, further comprising updating the application user interface to remove an application header from display when displaying the pane as the persistent pane.

6. The method of claim 3, further comprising including a display of a palette hint command in the one pane.

7. The method of claim 6, further comprising:
    receiving a selection of the palette hint command or a functionality displayed in the one pane associated with a palette pane; and
    in response to the selection:
        updating the application user interface by generating the palette pane that comprises the one pane, the palette pane including one or more palette pane selection items;
        sizing the palette pane in accordance with the small form factor computing device; and
        displaying the palette pane as a partial screen palette pane;

receiving a selection of a palette pane selection item; and
in response to the selection, updating the application user interface by displaying a child palette pane as the one pane from a hierarchy of palette panes.

8. The method of claim 7, further comprising:
receiving a selection of an operating system back command;
in response to the selection:
  navigating to a previous palette pane from the hierarchy of palette panes; and
  updating the application user interface by displaying the previous palette pane as the one pane from the hierarchy of palette panes.

9. The method of claim 3, further comprising:
receiving a selection of the close command or an operating system back command; and
in response to the selection, updating the application user interface by closing the one pane.

10. The method of claim 3, further comprising:
receiving a selection of a functionality displayed in the one pane; and
in response to the selection, updating the application user interface by displaying:
  a new one pane sized in accordance with the small form factor computing device, the new one pane displayed as a full screen pane and including content and functionality for interaction therewith.

11. The method of claim 10, further comprising:
receiving an indication of a selection to scroll content in the one pane; and
in response to the selection, updating the application user interface to remove the pane header from the one pane until an indication of a termination of the scrolling is received.

12. The method of claim 1, wherein, when the displayed one pane is a partial pane, the exposed portion of the document has a width extending between the top and bottom edge or between the left and right edge of the user interface.

13. The method of claim 1, wherein the only one pane includes one of exactly four closing options to close the only one pane, wherein the exactly four closing options include: a commit and cancel closing option, a commit only closing option, a back closing option and a close only closing option.

14. The method of claim 13, wherein, when the only one pane includes a text entry option, the only one pane includes a closing option selected from the group consisting of:
  (a) a commit and cancel closing option wherein an option to save or discard a text entry is provided, and wherein a selection of either the option to save or discard closes the only one pane; and
  (b) a commit only closing option wherein only an option to save a text entry is provided and wherein a selection to save the text entry closes the only one pane.

15. The method of claim 14, wherein, when the only one pane includes a settings entry option, the only one pane includes a back closing option that when selected saves a change made to a setting, closes the only one pane and displays an immediately previous user interface display.

16. The method of claim 15, wherein, when the only one pane is a partial pane, the only one pane includes a close only closing option which when selected operates only to close the partial pane.

17. A small form factor computing device for managing a pane configuration in a user interface of an application displayed on the small form factor computing device, the small form factor computing device comprising:
a processor, a memory, and an output device for presenting a visual output to a user, the visual output comprising the user interface of the application, the processor executing instructions stored in the memory, which causes the processor to:
  display an application user interface including one or more options to interact with a document, wherein the user interface is displayed on a display of the small form factor computing device, wherein, when the user interface is displayed, the user interface is defined by a top edge and an opposing bottom edge, and by a left edge and an opposing right edge, and wherein at least a portion of the document is displayed in the user interface;
  receive a selection of one option; and
  in response to the selection of the one option, generate only one pane for display including one or more functionalities associated with the selected one option, wherein the only one pane is displayable only as a full pane that covers the document or as a partial pane that leaves a portion of the document exposed, the full or partial pane being anchored to one edge and having a width extending between the top and bottom edge or between the left and right edge,
  wherein, when the selected one option does not include a possibility for text entry, the only one pane is displayed as the partial pane,
  and when the selected one option does include the possibility for text entry the only one pane is displayed as the full pane with a keyboard overlay; and
  display within the application user interface the only one pane, wherein the application user interface only ever displays one pane at a time.

18. The computing device of claim 17, wherein the processor is further caused to size the one pane in accordance with the small form factor computing device and maintain a minimum pane size, wherein the minimum pane size is a specified percentage of the size of the display of the small form factor computing device.

19. An article of manufacture in the form of computer storage media, the computer storage media containing instructions that when executed by a small form factor computing device, cause the small form factor computing device to perform:
displaying an application user interface that includes one or more options to interact with a document, wherein the user interface is displayed on a display of the small form factor computing device, wherein, when the user interface is displayed, the user interface is defined by a top edge and an opposing bottom edge, and by a left edge and an opposing right edge, and wherein at least a portion of the document is displayed in the user interface;
receiving a selection of one option; and
in response to the selection of the one option, generating only one pane for display including one or more functionalities associated with the selected one option, wherein the only one pane is displayable only as a full pane that covers the document or as a partial pane that leaves a portion of the document exposed, the full or partial pane being anchored to one edge and having a width extending between the top and bottom edge or between the left and right edge,
wherein, when the selected one option does not include a possibility for text entry, the only one pane is displayed as the partial pane, and when the selected one option does include the possibility for text entry the only one pane is displayed as the full pane with a keyboard overlay; and displaying within the application user interface the only one pane, wherein the application user interface only ever displays one pane at a time.

* * * * *